United States Patent
Massa et al.

(10) Patent No.: US 8,850,007 B2
(45) Date of Patent: *Sep. 30, 2014

(54) CONSISTENT CLUSTER OPERATIONAL DATA IN A SERVER CLUSTER USING A QUORUM OF REPLICAS

(75) Inventors: Michael T. Massa, Seattle, WA (US);
David A. Dion, Bothell, WA (US);
Rajsekhar Das, Kirkland, WA (US);
Rushabh A. Doshi, Redmond, WA (US);
David B. Lomet, Redmond, WA (US);
Gor N. Nishanov, Redmond, WA (US);
Philip A. Bernstein, Bellevue, WA (US);
Rod N. Gamache, Sammamish, WA (US); Rohit Jain, Sammamish, WA (US); Sunita Shrivastava, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/156,315

(22) Filed: Jun. 8, 2011

(65) Prior Publication Data

US 2011/0238813 A1    Sep. 29, 2011

Related U.S. Application Data

(63) Continuation of application No. 12/815,373, filed on Jun. 14, 2010, now Pat. No. 7,984,155, which is a continuation of application No. 11/225,222, filed on Sep. 12, 2005, now Pat. No. 7,774,469, which is a continuation-in-part of application No. 11/203,489, filed on Aug. 12, 2005, now abandoned, which is a continuation of application No. 09/895,810, filed on Jul. 2, 2001, now Pat. No. 6,938,084, which is a continuation-in-part of application No. 09/277,450, filed on Mar. 26, 1999, now Pat. No. 6,401,120.

(51) Int. Cl.
G06F 15/173 (2006.01)
G06F 11/08 (2006.01)
G06F 11/18 (2006.01)
G06F 11/14 (2006.01)
G06F 11/20 (2006.01)
G06F 17/30 (2006.01)
G06F 11/16 (2006.01)

(52) U.S. Cl.
CPC ........ *G06F 17/30575* (2013.01); *G06F 11/181* (2013.01); *G06F 11/1471* (2013.01); *G06F 2201/82* (2013.01); *G06F 11/1482* (2013.01); *G06F 11/1479* (2013.01); *G06F 11/2023* (2013.01); *G06F 11/182* (2013.01); *G06F 11/2035* (2013.01); *G06F 11/1662* (2013.01); *G06F 11/2058* (2013.01)
USPC .............. 709/225; 709/226; 714/1; 714/4.11; 714/6.23

(58) Field of Classification Search
CPC ............ G06F 11/1471; G06F 11/1479; G06F 11/1482; G06F 11/2023; G06F 11/181; G06F 117/2058; G06F 17/30575
USPC ............. 709/225–226; 714/1, 4.1, 6.22, 6.23, 714/6.3
See application file for complete search history.

(56) References Cited

U.S. PATENT DOCUMENTS

| | | | |
|---|---|---|---|
| 5,280,611 A | 1/1994 | Mohan | |
| 5,280,627 A | 1/1994 | Flaherty et al. | |
| 5,404,527 A | 4/1995 | Irwin et al. | |
| 5,499,367 A | 3/1996 | Bamford | |
| 5,553,239 A | 9/1996 | Heath et al. | |
| 5,659,748 A | 8/1997 | Kennedy | |
| 5,666,486 A * | 9/1997 | Alfieri et al. | 709/217 |
| 5,673,384 A | 9/1997 | Hepner et al. | |
| 5,701,480 A | 12/1997 | Raz | |
| 5,727,206 A | 3/1998 | Fish et al. | |
| 5,754,821 A | 5/1998 | Cripe et al. | |
| 5,781,910 A | 7/1998 | Gostanian et al. | |
| 5,790,773 A * | 8/1998 | DeKoning et al. | 714/6.22 |
| 5,805,920 A * | 9/1998 | Sprenkle et al. | 710/1 |
| 5,828,876 A | 10/1998 | Fish et al. | |
| 5,828,889 A | 10/1998 | Moiin et al. | |
| 5,835,784 A | 11/1998 | Gillespie et al. | |

| | | |
|---|---|---|
| 5,870,763 A | 2/1999 | Lomet |
| 5,892,913 A | 4/1999 | Adiga et al. |
| 5,893,086 A | 4/1999 | Schmuck et al. |
| 5,909,540 A | 6/1999 | Carter et al. |
| 5,917,998 A | 6/1999 | Cabrera et al. |
| 5,918,229 A | 6/1999 | Davis et al. |
| 5,927,050 A | 7/1999 | Houck et al. |
| 5,940,838 A | 8/1999 | Schmuck et al. |
| 5,946,686 A | 8/1999 | Schmuck et al. |
| 5,948,109 A | 9/1999 | Moiin et al. |
| 5,974,547 A | 10/1999 | Klimenko |
| 5,996,075 A | 11/1999 | Matena |
| 5,999,712 A | 12/1999 | Moiin et al. |
| 5,999,947 A | 12/1999 | Zollinger |
| 6,014,669 A * | 1/2000 | Slaughter et al. ............ 707/610 |
| 6,038,677 A * | 3/2000 | Lawlor et al. .................. 714/4.1 |
| 6,061,740 A | 5/2000 | Ferguson et al. |
| 6,073,221 A | 6/2000 | Beal |
| 6,108,699 A | 8/2000 | Moiin |
| 6,108,781 A | 8/2000 | Jayakumar |
| 6,151,688 A | 11/2000 | Wipfel |
| 6,163,855 A * | 12/2000 | Shrivastava et al. ........... 714/4.4 |
| 6,173,293 B1 * | 1/2001 | Thekkath et al. ..................... 1/1 |
| 6,178,529 B1 | 1/2001 | Short |
| 6,182,117 B1 | 1/2001 | Christie |
| 6,182,197 B1 * | 1/2001 | Dias et al. ..................... 711/151 |
| 6,185,601 B1 * | 2/2001 | Wolff ............................ 709/203 |
| 6,185,695 B1 | 2/2001 | Murphy |
| 6,192,401 B1 | 2/2001 | Modiri |
| 6,240,414 B1 | 5/2001 | Beizer |
| 6,243,702 B1 | 6/2001 | Bamford |
| 6,243,715 B1 | 6/2001 | Bogantz |
| 6,243,744 B1 * | 6/2001 | Snaman et al. ............... 709/220 |
| 6,243,814 B1 | 6/2001 | Matena |
| 6,279,032 B1 * | 8/2001 | Short et al. .................... 709/209 |
| 6,286,056 B1 | 9/2001 | Edgar et al. |
| 6,301,462 B1 | 10/2001 | Freeman et al. |
| 6,308,283 B1 | 10/2001 | Galipeau |
| 6,311,217 B1 * | 10/2001 | Ehlinger et al. ............. 709/226 |
| 6,314,526 B1 | 11/2001 | Arendt et al. |
| 6,336,171 B1 * | 1/2002 | Coskrey, IV .................. 711/152 |
| 6,360,331 B2 * | 3/2002 | Vert et al. ........................ 714/4.4 |
| 6,363,495 B1 * | 3/2002 | MacKenzie et al. ........... 714/4.5 |
| 6,370,571 B1 * | 4/2002 | Medin, Jr. ..................... 709/218 |
| 6,389,550 B1 * | 5/2002 | Carter ............................... 714/1 |
| 6,397,348 B1 * | 5/2002 | Styczinski ................... 714/6.12 |
| 6,401,120 B1 | 6/2002 | Gamache et al. |
| 6,421,711 B1 * | 7/2002 | Blumenau et al. ............ 709/213 |
| 6,427,163 B1 * | 7/2002 | Arendt et al. ................. 709/201 |
| 6,438,705 B1 * | 8/2002 | Chao et al. .................... 714/4.11 |
| 6,449,641 B1 * | 9/2002 | Moiin et al. .................. 709/220 |
| 6,449,734 B1 | 9/2002 | Shrivastava |
| 6,453,426 B1 | 9/2002 | Gamache |
| 6,463,532 B1 | 10/2002 | Reuter et al. |
| 6,487,622 B1 | 11/2002 | Coskrey, IV et al. |
| 6,490,610 B1 | 12/2002 | Rizvi |
| 6,549,934 B1 | 4/2003 | Peterson |
| 6,553,387 B1 | 4/2003 | Cabrera et al. |
| 6,594,698 B1 | 7/2003 | Chow |
| 6,654,902 B1 | 11/2003 | Brunelle et al. |
| 6,662,219 B1 | 12/2003 | Nishanov et al. |
| 6,681,251 B1 | 1/2004 | Leymann et al. |
| 6,691,139 B2 | 2/2004 | Ganesh et al. |
| 6,701,332 B1 | 3/2004 | Vella |
| 6,701,453 B2 | 3/2004 | Chrabaszcz |
| 6,738,872 B2 | 5/2004 | Van Huben |
| 6,807,557 B1 | 10/2004 | Novaes et al. |
| 6,938,084 B2 | 8/2005 | Gamache |
| 7,120,821 B1 | 10/2006 | Skinner |
| 7,277,952 B2 | 10/2007 | Nishanov |
| 7,774,469 B2 | 8/2010 | Massa |
| 7,984,155 B2 | 7/2011 | Massa |
| 2001/0008019 A1 | 7/2001 | Vert |
| 2001/0014097 A1 | 8/2001 | Beck et al. |
| 2002/0199113 A1 | 12/2002 | Pfister et al. |
| 2006/0036896 A1 | 2/2006 | Gamache |
| 2011/0238842 A1 | 9/2011 | Massa |

FOREIGN PATENT DOCUMENTS

| | | |
|---|---|---|
| EP | 0750256 A2 | 12/1996 |
| EP | 0760503 A1 | 3/1997 |
| EP | 0887731 A1 | 12/1998 |

OTHER PUBLICATIONS

Gafni, et al., "Disk paxos", Compaq Systems Research Center, Jul. 4, 2000, pp. 1-43.(The corresponding document was previously submitted in connection with parent U.S. Appl. No. 09/895,810 and is not being resubmitted herewith per 37 CFR 1.98(d).).

Basagni, Stefano, "Distributed Clustering for Ad Hoc Networks", Center for Advanced Telecommunications Systems ad Services, Erik Jonsson School of Engineering and Computer Science, 1999.(The corresponding document was previously submitted in connection with parent U.S. Appl. No. 09/895,810 and is not being resubmitted herewith per 37 CFR 1.98(d).).

Chandra, Tushar Deepak, et al., "On the Impossibility of Group Membership", INRIA, Research Report No. 2782, Jan. 1996, pp. 1-11.(The corresponding document was previously submitted in connection with parent U.S. Appl. No. 09/895,810 and is not being resubmitted herewith per 37 CFR 1.98(d).).

"Sun Cluster 2.2", Sun Microsystems, Inc., Retrieved at <<http://www.sun.com/software/solaris/ds/ds-suncluster/index.html>>, Printed Oct. 26, 1999.(The corresponding document was previously submitted in connection with parent U.S. Appl. No. 09/895,810 and is not being resubmitted herewith per 37 CFR 1.98(d).).

Cheung, Shun Yan, et al., "Multi-Dimensional Voting: A General Method for Implementing Synchronization in Distributed Systems", School of Information and Computer Science, Georgia Institute of Technology, Distributed Computing Systems, Jun. 1990, pp. 362-369.(The corresponding document was previously submitted in connection with parent U.S. Appl. No. 09/895,810 and is not being resubmitted herewith per 37 CFR 1.98(d).).

Sun Microsystems, "Sun Cluster Architecture: A White Paper", Cluster Computing, Dec. 1999, pp. 331-338.(The corresponding document was previously submitted in connection with parent U.S. Appl. No. 09/895,810 and is not being resubmitted herewith per 37 CFR 1.98(d).).

Vogels, Werner, et al., "The Design and Architecture of the Microsoft Cluster Service", 28th Annual International Symposium on Fault-Tolerant Computing, Digest of Papers, Munich, Jun. 23, 1998, pp. 422-431.(The corresponding document was previously submitted in connection with parent U.S. Appl. No. 09/895,810 and is not being resubmitted herewith per 37 CFR 1.98(d).).

Gamache, Rod, et al., "Windows NT Clustering Service", Oct. 1998, pp. 55-62.(The corresponding document was previously submitted in connection with parent U.S. Appl. No. 09/895,810 and is not being resubmitted herewith per 37 CFR 1.98(d).).

PCT International Search Report with Mailing Date of May 10, 2002.(The corresponding document was previously submitted in connection with parent U.S. Appl. No. 09/895,810 and is not being resubmitted herewith per 37 CFR 1.98(d).).

Holton, et al., "XFS: A Next Generation Journalled 64-Bit Filesystem With Guaranteed Rate I/O", SiliconGraphics, Mar. 15, 1999.(The corresponding document was previously submitted in connection with parent U.S. Appl. No. 09/895,810 and is not being resubmitted herewith per 37 CFR 1.98(d).).

Oki, et al., "Viewstamped Replication: A New Primary Copy Method of Support Highly-Available Distributed Systems", Proc 7th ACM Symp on Princ of Distributed Computing, 1988.

Carr, Richard, "The Tandem Global Update Pratocol", Tandem Systems Review, vol. 1, No. 2, Jun. 1995, pp. 11 74-85.

Gifford, David K., "Weighted Voting for Replicated Data", 1979, pp. 150-159.

Lamport, Leslie, "A Fast Mutual Exclusion Aigorithm, Digital Equipment Corporation", Nov. 14, 1985.

Lamport, Leslie, "The Part-Time Parliament", Digital Equipment Corporation, Sep. 1, 1989.

Bernstein, "Replicated Data", Concurrency Contral and Recovery in Database Systems, Chapter 8, Addison-Wesley Publishing Company, 1987, pp. 265-311.

Golding, "Fault-tolerant replication management in large-scale distributed storage systems", The Eighteenth Symposium on Reliable Distributed Systems, Oct. 19-22, 1999.

EP Communication for Application No. 00916146.4-2211, Reference EP22464-034/iw, Sep. 4, 2007.

EP Communication for Application No. 00916146.4-2211, Reference EP22464-034/iw, Apr. 28, 2010.

EP Communication for Application No. 00916146.4-2211, Reference EP22464-034/iw, Nov. 4, 2010.

Son, "Replicated Data Management in Distributed Database Systems", ACM SIGMOD Record, vol. 17, No. 4, Dec. 1988.

\* cited by examiner

*Primary Examiner* — Catherine Thiaw

(74) *Attorney, Agent, or Firm* — Henry Gabryjelski; Kate Drakos; Micky Minhas

(57) ABSTRACT

A method and system for increasing server cluster availability by requiring at a minimum only one node and a quorum replica set of replica members to form and operate a cluster. Replica members maintain cluster operational data. A cluster operates when one node possesses a majority of replica members, which ensures that any new or surviving cluster includes consistent cluster operational data via at least one replica member from the immediately prior cluster. Arbitration provides exclusive ownership by one node of the replica members, including at cluster formation, and when the owning node fails. Arbitration uses a fast mutual exclusion algorithm and a reservation mechanism to challenge for and defend the exclusive reservation of each member. A quorum replica set algorithm brings members online and offline with data consistency, including updating unreconciled replica members, and ensures consistent read and update operations.

20 Claims, 35 Drawing Sheets

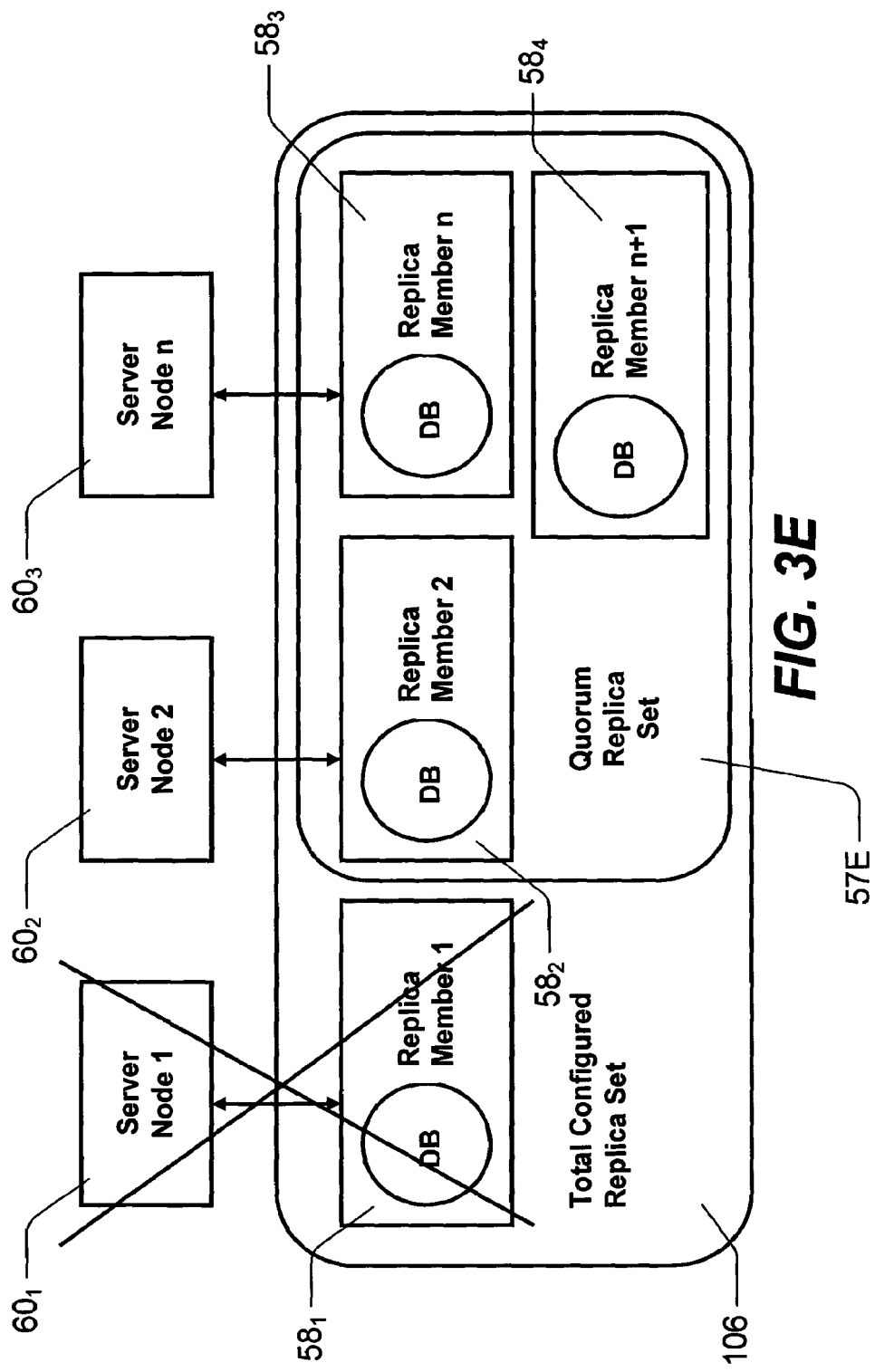

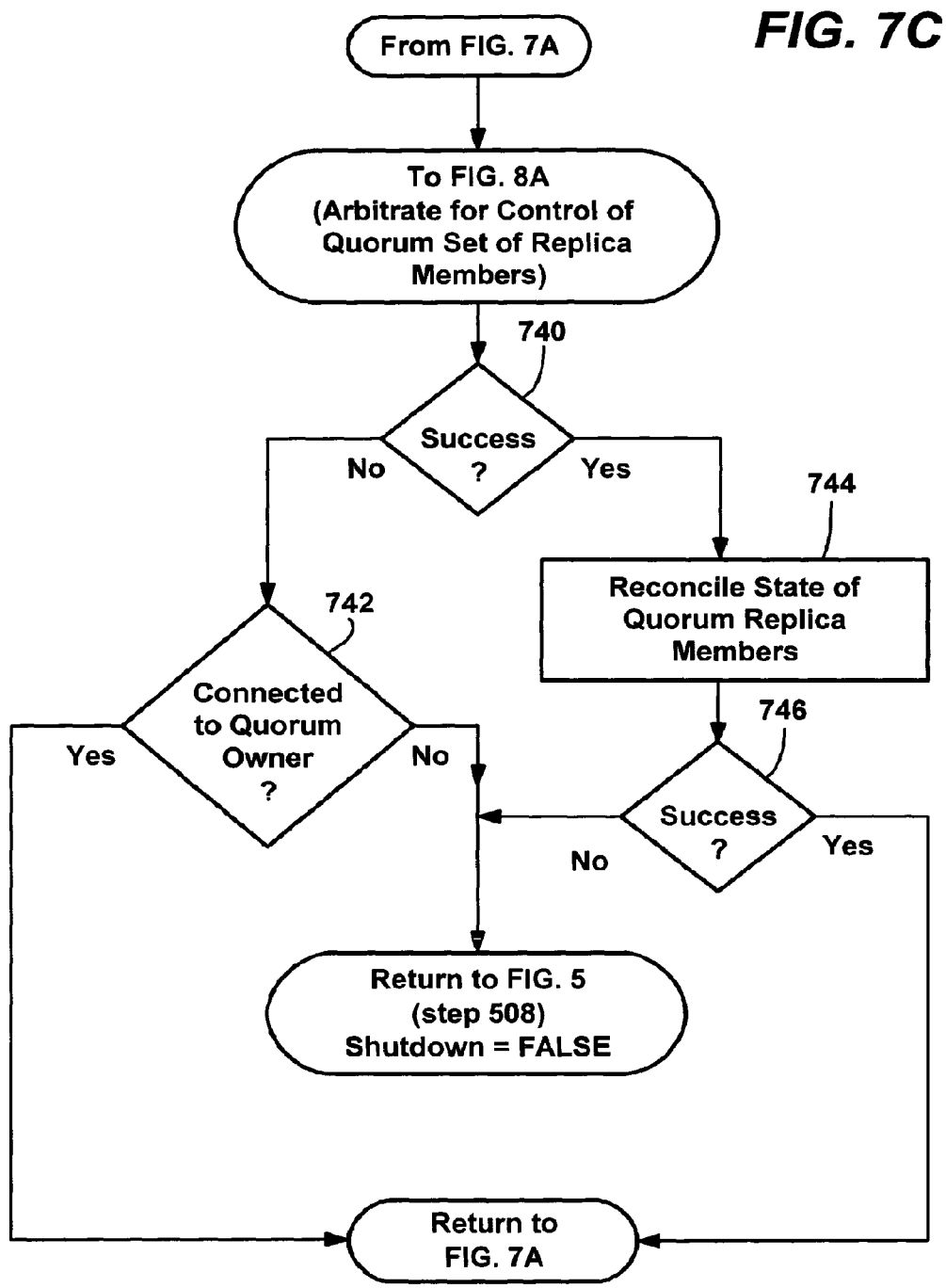

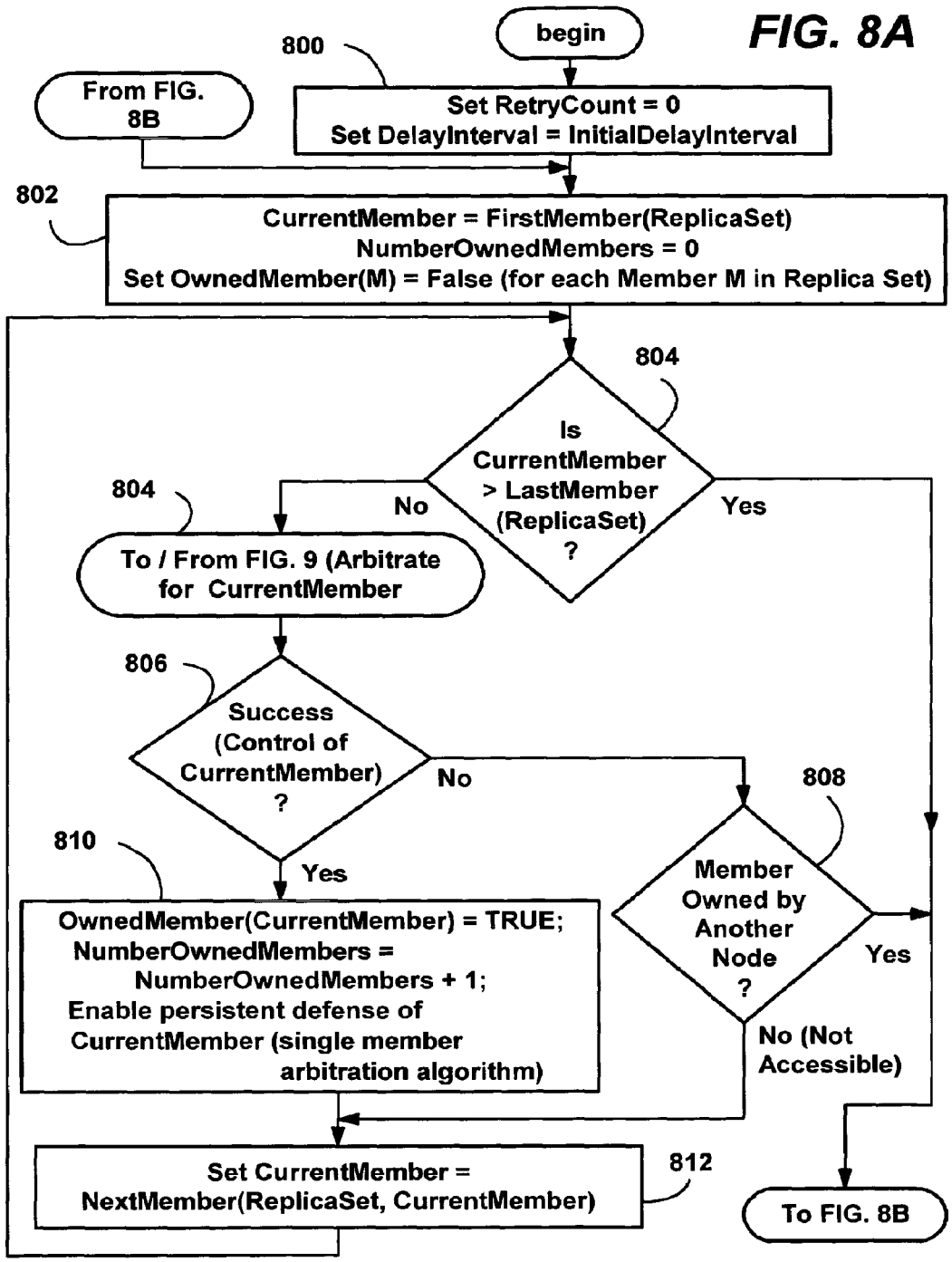

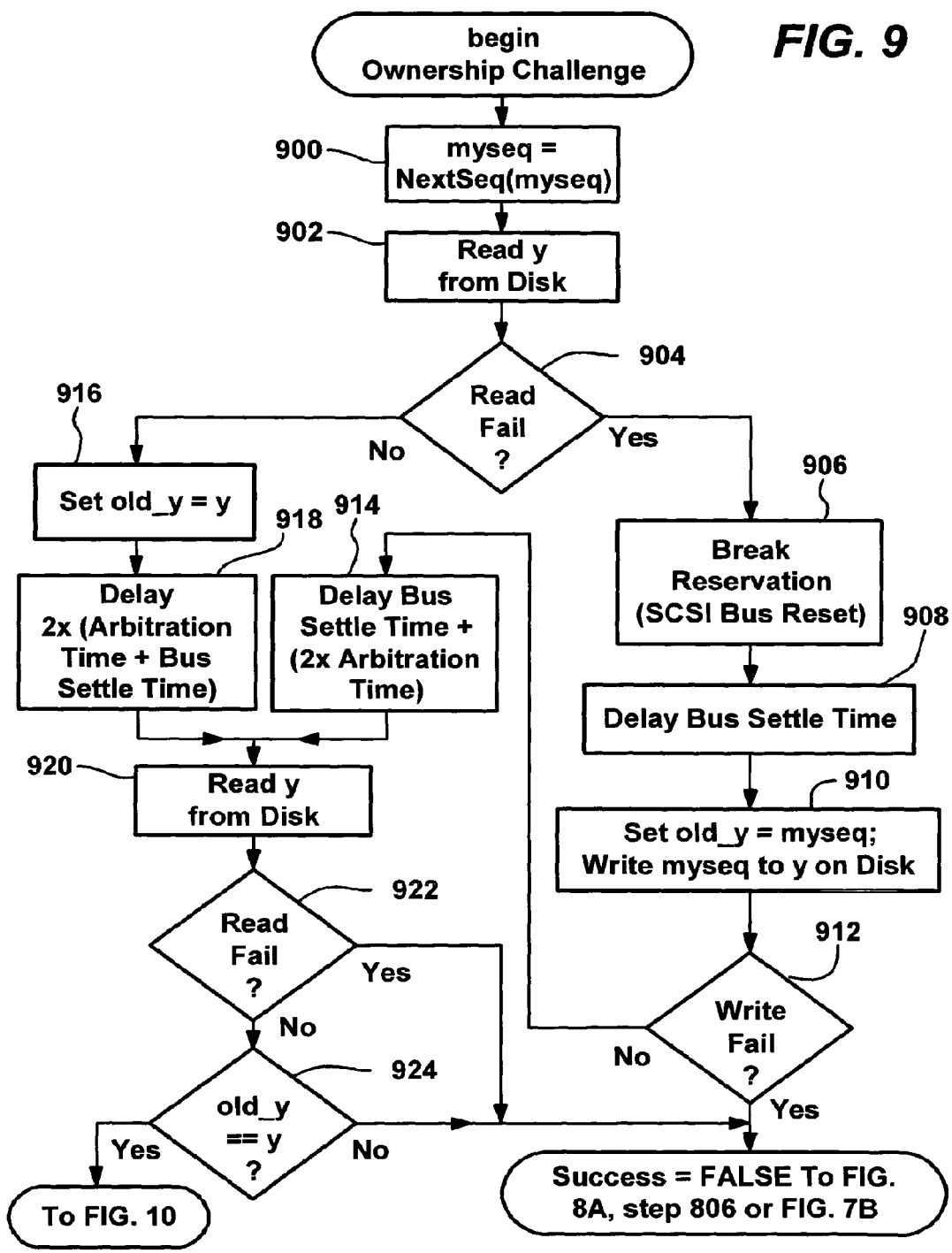

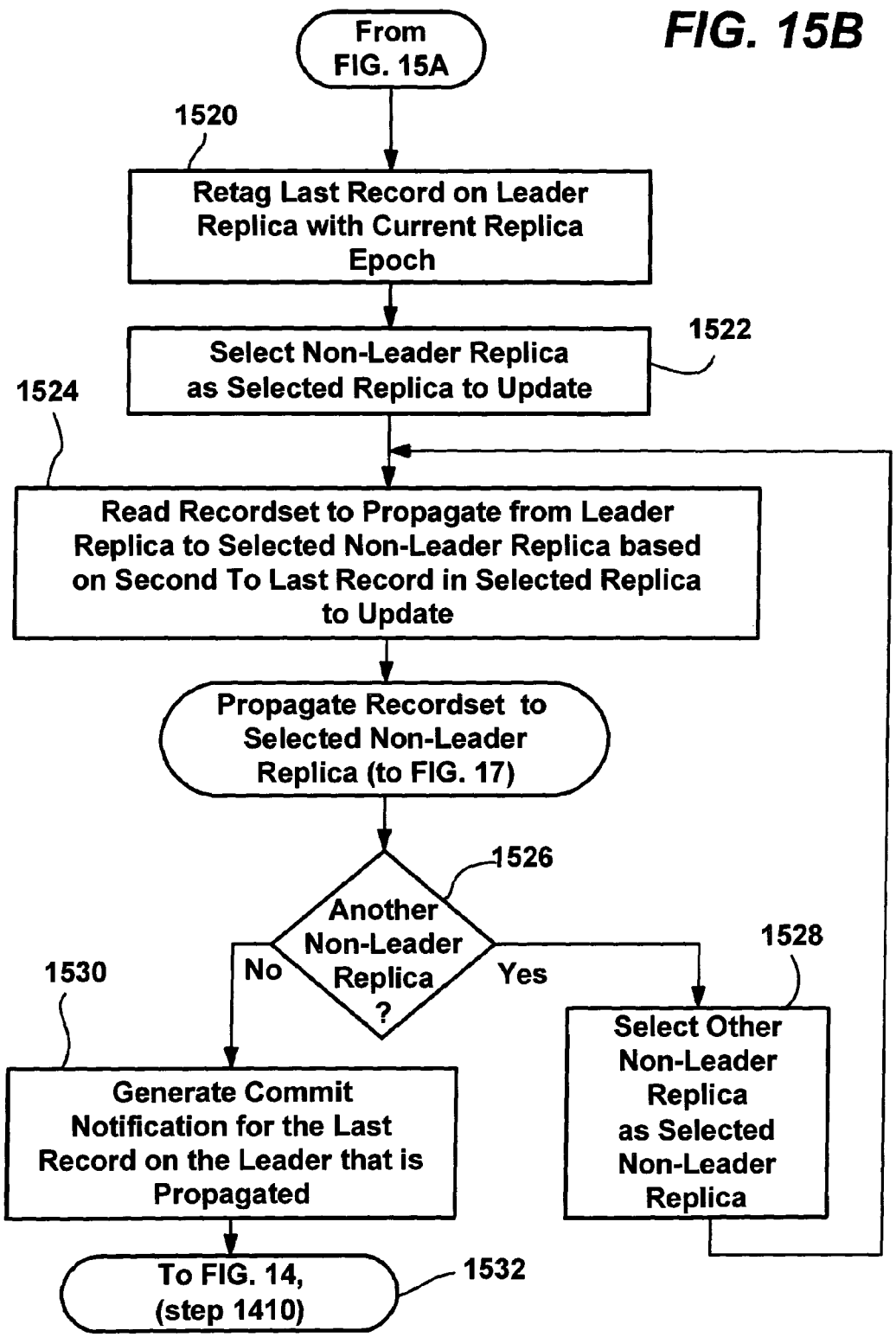

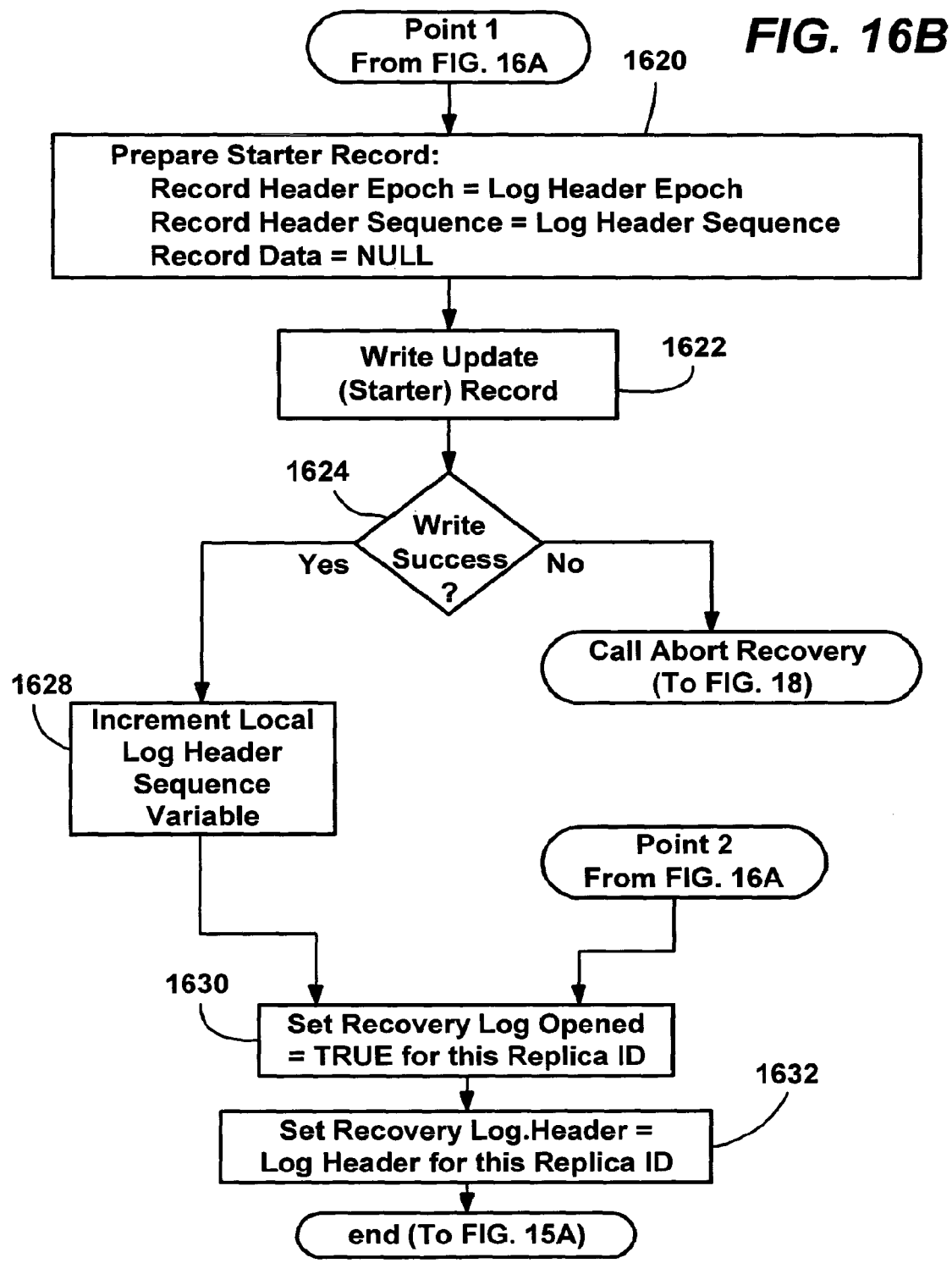

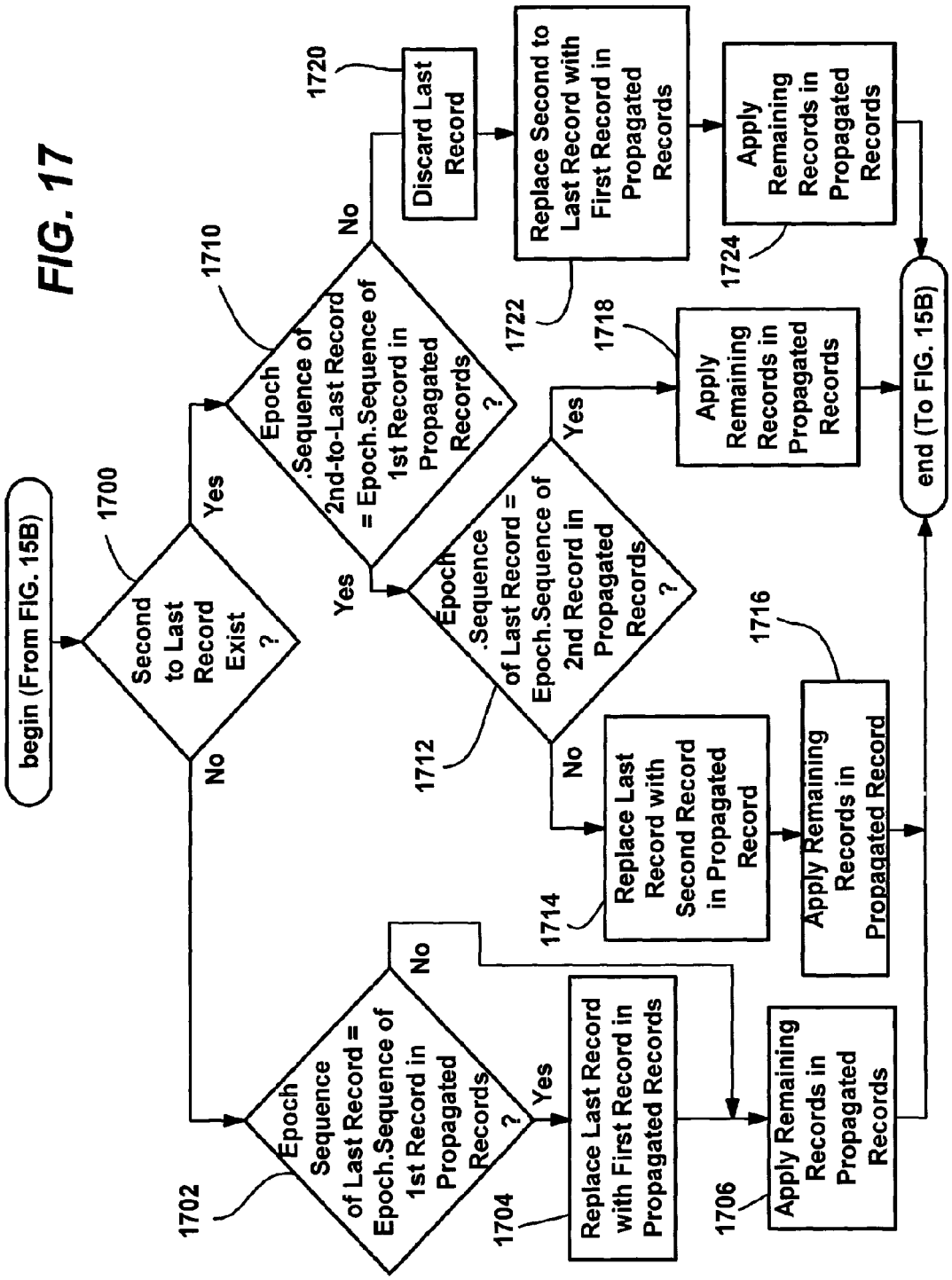

CONSISTENT CLUSTER OPERATIONAL DATA IN A SERVER CLUSTER USING A QUORUM OF REPLICAS

CROSS-REFERENCE TO RELATED APPLICATION

This Application is a continuation of U.S. patent application Ser. No. 12/815,373, filed Jun. 14, 2010, which is a continuation of U.S. patent application Ser. No. 11/225,222, filed Sep. 12, 2005, which is a continuation-in-part of U.S. patent application Ser. No. 11/203,489, filed Aug. 12, 2005, which is a continuation of U.S. Pat. No. 6,938,084, filed Jul. 2, 2001, which is a continuation-in-part of U.S. Pat. No. 6,401,120, filed Mar. 26, 1999, each of which is incorporated herein by reference in its entirety.

BACKGROUND

A server cluster ordinarily is a group of at least two independent servers connected by a network and utilized as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server.

Other benefits of clusters include the ability for administrators to inspect the status of cluster resources, and accordingly balance workloads among different servers in the cluster to improve performance. Such manageability also provides administrators with the ability to update one server in a cluster without taking important data and applications offline for the duration of the maintenance activity. As can be appreciated, server clusters are used in critical database management, file and intranet data sharing, messaging, general business applications and the like.

When operating a server cluster, the cluster operational data (i.e., state) of any prior incarnation of a cluster needs to be known to the subsequent incarnation of a cluster, otherwise critical data may be lost. For example, if a bank's financial transaction data are recorded in one cluster, but a new cluster starts up without the previous cluster's operational data, the financial transactions may be lost. To avoid this, prior clustering technology required that each node (server) of a cluster possess its own replica of the cluster operational data on a private storage thereof, and that a majority of possible nodes (along with their private storage device) of a cluster be operational in order to start and maintain a cluster.

However, requiring a quorum of nodes has the drawback that a majority of the possible nodes of a cluster have to be operational in order to have a cluster. A recent improvement described in U.S. patent application Ser. No. 08/963,050, entitled "Method and System for Quorum Resource Arbitration in a Server Cluster," assigned to the same assignee of the present invention, provides the cluster operational data on a single quorum device, typically a storage device, for which cluster nodes arbitrate for exclusive ownership. Because the correct cluster operational data is on the quorum device, a cluster may be formed as long as a node of that cluster has ownership of the quorum device. Also, this ensures that only one unique incarnation of a cluster can exist at any given time, since only one node can exclusively own the quorum device. The single quorum device solution increases cluster availability, since at a minimum, only one node and the quorum device are needed to have an operational cluster. While this is a significant improvement over requiring a majority of nodes to have a cluster, a single quorum device is inherently not reliable, and thus to increase cluster availability, expensive hardware-based solutions are presently employed to provide highly-reliable single quorum device for storage of the operational data. The cost of the highly-reliable storage device is a major portion of the cluster expense.

SUMMARY

Briefly, the present invention provides a method and system wherein at least three storage devices (replica members) are configured to maintain the cluster operational data, and wherein the replica members may be independent from any given node (independent replica member), or directly attached to a node as local storage (local replica member). A cluster may operate as long as either 1) one node possesses a quorum (e.g., a simple majority) of configured independent replica members, or 2) one or more communicating nodes possess a quorum (e.g., a simple majority) of configured replica members among those that are independent, local, or a combination of both. For example, in a cluster having three replica members configured, at least two replica members need to be available and controlled by a node to have an operational cluster. Because a replica member can be controlled by only one node at a time, only one unique incarnation of a cluster can exist at any given time, since only one node may possess a quorum of members. The quorum requirement further ensures that a new or surviving cluster has at least one replica member that belonged to the immediately prior cluster and is thus correct with respect to the cluster operational data.

A quorum arbitration algorithm is provided, by which any number of nodes may arbitrate for exclusive ownership of the independent replica members (or a single quorum device). Note that the arbitration process described in the algorithms generally applies to the members of the replica set that are independent of any cluster node, since any local replica members directly attached to a node tend to be, by definition, controlled by the node to which they are attached. The quorum arbitration algorithm ensures that only one node may have possession of the independent replica members in the quorum replica set when a cluster is formed, and also enables another node to represent the cluster when a node having exclusive possession of the quorum replica members fails. Arbitration may thus occur when a node first starts up, including when there is no cluster yet established because of a simultaneous startup of the cluster's nodes. Arbitration also occurs when a node loses contact with the owner of the quorum replica set, such as when the owner of the replica set fails or the communication link is broken, as described below.

In one implementation, arbitration is based on challenging (or defending) for an exclusive reservation of each independent replica member, and a method for releasing an exclusive reservation is provided. In this implementation, the arbitration process leverages the SCSI command set in order for systems to exclusively reserve the SCSI replica members' resources and break any other system's reservation thereof. A preferred mechanism for breaking a reservation is the SCSI bus reset, while a preferred mechanism for providing orderly mutual exclusion is based on a modified fast mutual exclusion algorithm in combination with the SCSI reserve command. Control of the cluster is achieved when a quorum of replica members is obtained by a node. The algorithm enables any number of nodes to arbitrate for any number of replica members (or for a single quorum device).

A quorum replica set algorithm is also provided herein to ensure the consistency of data across replica members in the face of replica or node failures. The quorum replica set algorithm provides a database that is both fault tolerant and strongly consistent. The quorum replica set algorithm ensures that changes that were committed in a previous incarnation of the cluster remain committed in the new incarnation of the cluster. Among other things, the quorum replica set algorithm maintains the consistency of data across the replica set as replica members become available (online) or unavailable (offline) to the set. To this end, the quorum replica set algorithm includes a recovery process that determines the most up-to-date replica member from among those in the quorum, and reconciles the states of the available members by propagating the data of that most up-to-date replica member to the other replica members when needed to ensure consistency throughout the replica set. For example, the quorum replica set algorithm propagates the data to update replica members following a cluster failure and restart of the cluster, when a replica member becomes available for use in the replica set (upon the failure and recovery of one or more members), or a change in node ownership of the replica set. The quorum replica set algorithm also handles reads and updates in a manner that maintains consistency, such as by preventing further updates when less than a majority of replica members are successfully written during an update.

The method and system of the present invention require only a small number of relatively inexpensive components to form a cluster, thereby increasing availability relative to a quorum of nodes solution, while lowering cost and increasing reliability relative to a single quorum device solution.

Other benefits and advantages will become apparent from the following detailed description when taken in conjunction with the drawings, in which:

BRIEF DESCRIPTION OF THE DRAWINGS

FIGS. 3A-3E are block diagrams representing a server cluster having a plurality of replica members therein for storing cluster operational data in accordance with one aspect of the present invention wherein various cluster components fail over time;

FIGS. 7A-7C comprise a flow diagram representing general steps taken by a node when operating in a cluster in accordance with one aspect of the present invention;

FIGS. 8A-8B comprise a flow diagram representing general steps taken by a node to attempt to gain control over a quorum replica set of replica members in accordance with one aspect of the present invention;

FIGS. 9 and 10 are flow diagrams generally representing steps taken to arbitrate for control of a replica member in accordance with one aspect of the present invention;

FIGS. 15A-15B comprise a flow diagram generally representing recovery steps taken by the quorum replica set algorithm to make a quorum replica set consistent in accordance with one aspect of the present invention;

FIGS. 16A-16B comprise a flow diagram generally representing steps taken by the quorum replica set algorithm during recovery to initialize a replica member's log in accordance with one aspect of the present invention;

FIG. 17 is a flow diagram generally representing steps taken by the quorum replica set algorithm during recovery to reconcile the update logs of the replica members in accordance with one aspect of the present invention;

DETAILED DESCRIPTION

Exemplary Operating Environment

Figure 1:
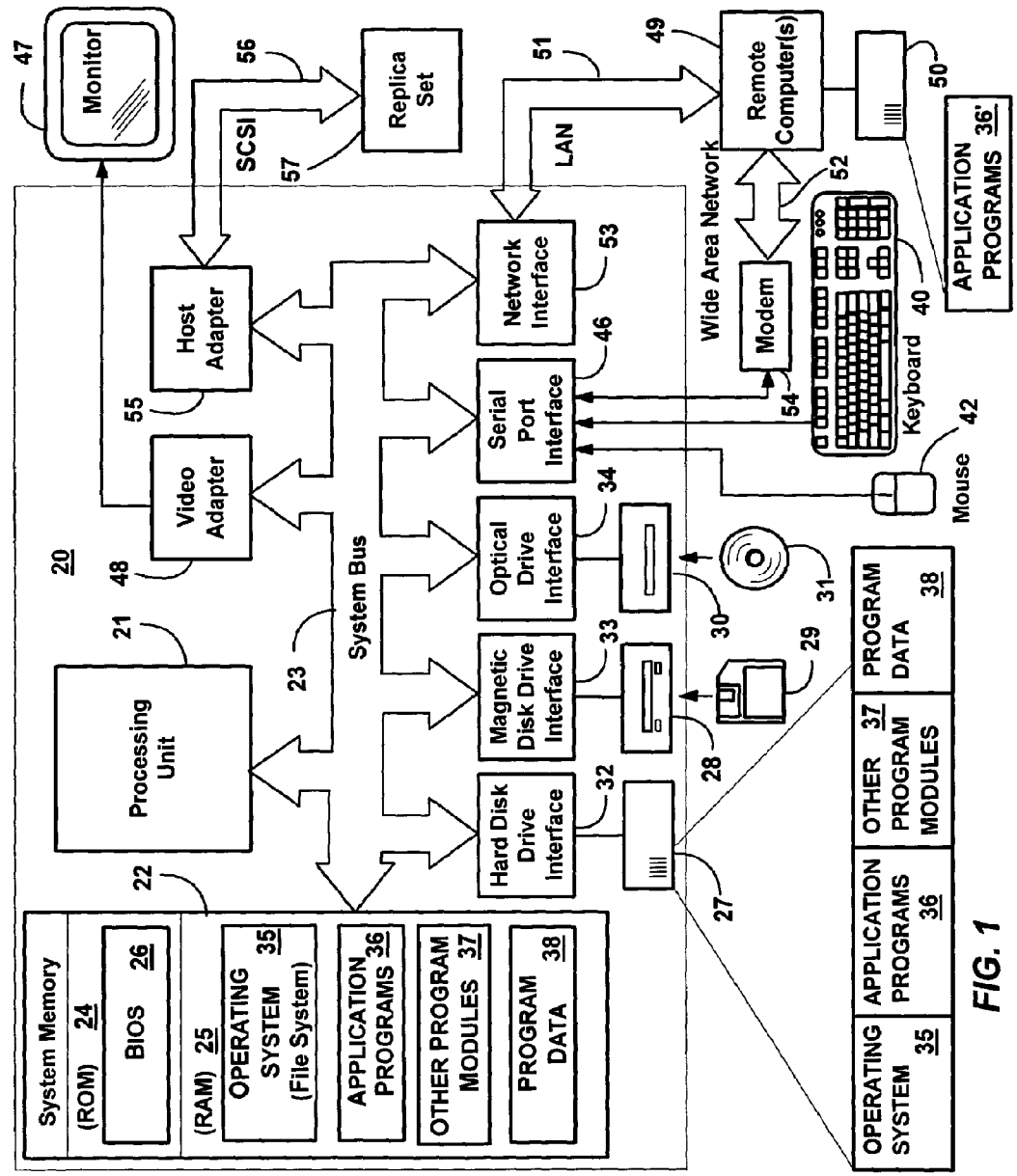
FIG. 1 is a block diagram representing a computer system into which the present invention may be incorporated.

FIG. 1 and the following discussion are intended to provide a brief general description of a suitable computing environment in which the invention may be implemented.

Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. The term "computer-readable media" as used herein refers to a statutory article of manufacture that is not a signal or carrier wave per se.

A number of program modules may be stored on the hard disk, magnetic disk 29, optical disk 31, ROM 24 or RAM 25, including an operating system 35 (which may be considered as including or operatively connected to a file system), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. The computer system 20 may also be connected to system area networks (SANS, not shown). Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 3A:
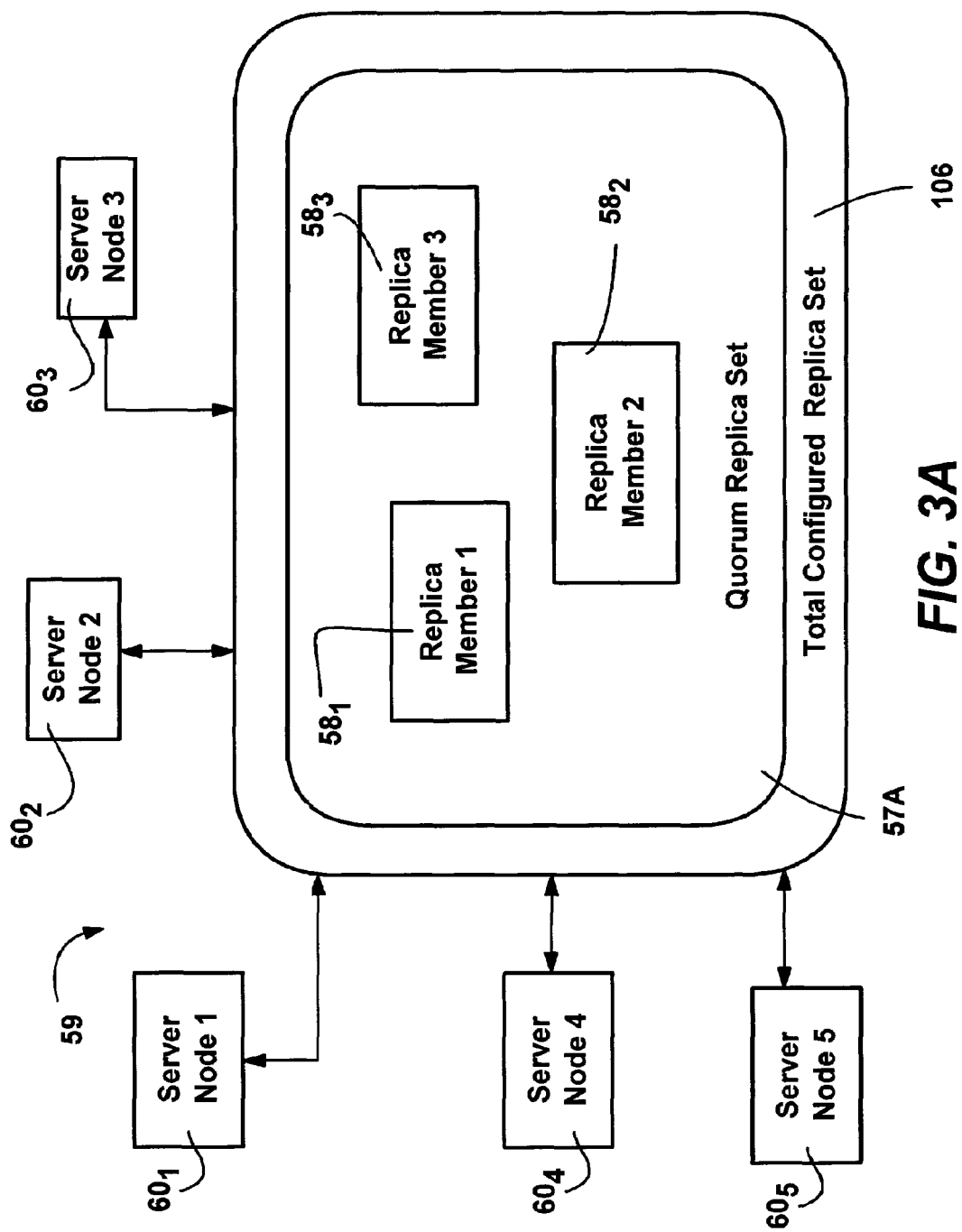

A preferred system 20 further includes a host adapter 55 or the like which connects the system bus 23 to a SCSI (Small Computer Systems Interface) bus 56 for communicating with a quorum replica set 57 (FIG. 3A) comprising one or more persistent memory storage devices, referred to herein as replica members (e.g., $58_1$-$58_3$ of FIG. 3A). Other ways of connecting cluster systems to storage devices, including Fibre Channel, are equivalent. Indeed, one alternative way to connect storage devices is via a network connection, as described in U.S. patent application Ser. No. 09/260,194 entitled "Method and System for Remote Access of Computer Devices," assigned to the assignee of the present invention.

As used herein, an "independent replica member" is a storage device that is not integral to any specific node, but rather is separate from any node of the cluster and accessible to nodes in the cluster at various times. In other words, an independent replica member can operate in a cluster regardless of which node or nodes are in that particular incarnation thereof. Each independent replica member may be a simple disk, or some or all of them may be a hardware-based redundant array of devices, or the like, although as will become apparent, a benefit of the present invention is that such hardware-based redundancy is unnecessary. Note that any number of independent replica members may be configured in a given cluster configuration, however for purposes of simplicity only three are shown in FIG. 3A. In any event, as shown in FIG. 3A, the computer system 20 (FIG. 1) may comprise the node $60_1$ of a cluster 59, while one of the remote computers 49 (FIG. 1) may be similarly connected to the SCSI bus 56 (FIG. 1) and comprise the node $60_2$, and so on.

As used herein, a "local replica member" is a storage device that is integral to a specific node, and is thus controlled by that node to which it is a part. Other nodes may communicate with a local replica member through the node which controls it. Such a node is considered a "communicating node." Each local replica member may be a simple disk, or it may be a hardware-based redundant array of devices, or the like. A node may include zero or more local replica members. In one example there tends to one local replica member per node.

Quorum may be achieved using a replica set composed of local replica members, independent replica members, or a combination of both local and independent replica members. FIG. 3C illustrates quorum achieved using a combination of both local and independent replica members where all components are functioning properly. FIG. 3D shows quorum maintained in the face of failure of one of the independent replica members. FIG. 3E shows quorum maintained despite failure of one of the nodes and the local replica member to which it is attached.

The term "replica member" as used herein without further qualification by either "local" or "independent" generally refers to an independent replica member.

Cluster Service Components

Figure 2:
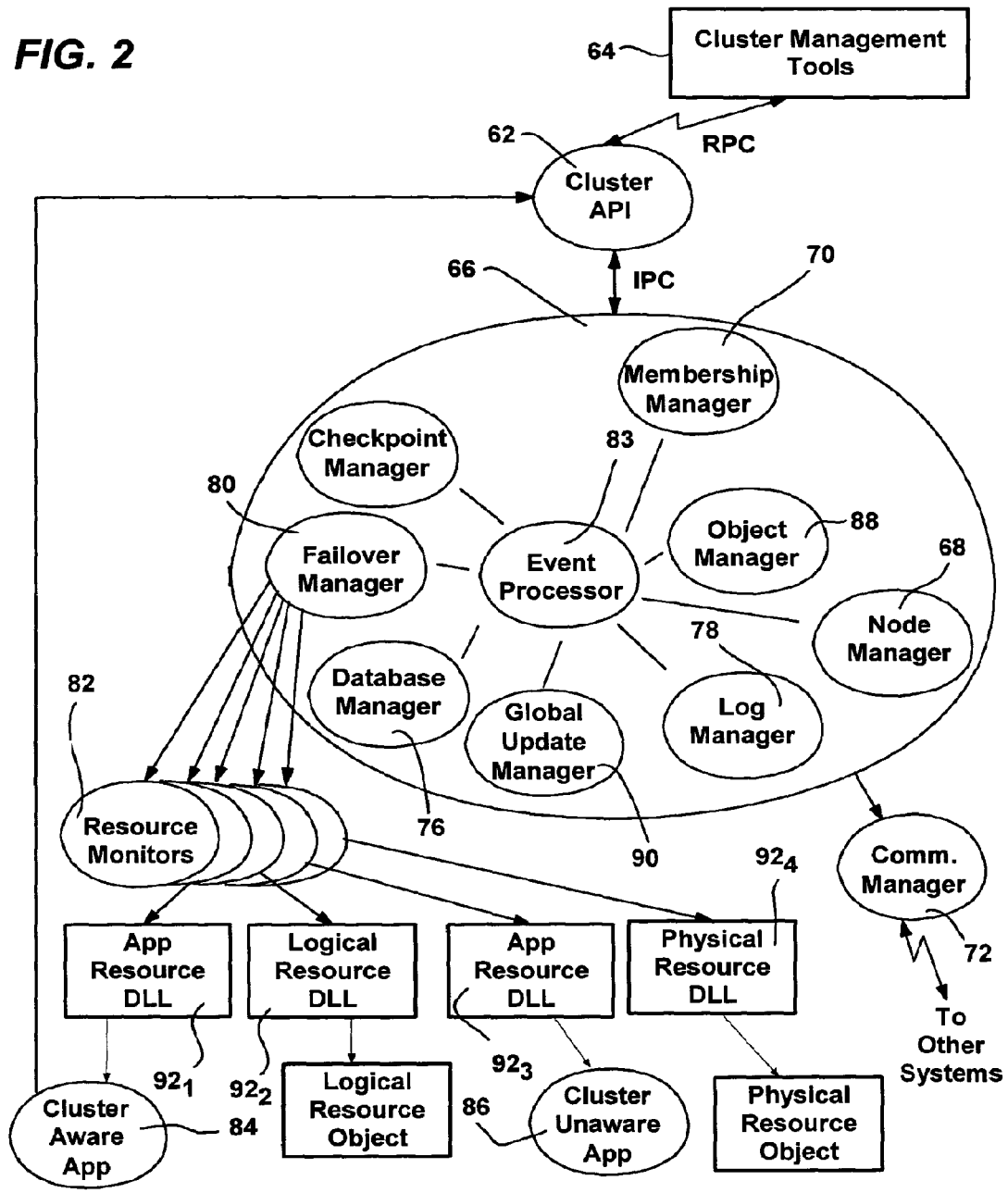
FIG. 2 is a representation of various components within the clustering service of a machine.

FIG. 2 provides a representation of cluster service components and their general relationships in each of the nodes $60_1$-$60_n$ (FIG. 3A) of a cluster 59. As shown in FIG. 2, to accomplish cluster creation and to perform other administration of cluster resources, nodes, and the cluster itself, a cluster application programming interface (API) 62 is provided. Applications and cluster management administration tools 64 call various interfaces in the API 62 using remote procedure invocations through RPC (Remote Procedure Calls) or DCOM (Distributed Component Object Model), whether running in the cluster or on an external system. The various interfaces of the API 62 may be considered as being categorized by their association with a particular cluster component, i.e., nodes, resources and the cluster itself.

An administrator typically works with groups, each group being a collection of resources (e.g., cluster application resources, names, addresses and so forth) organized to allow an administrator to combine resources into larger logical units and manage them as a unit. Group operations performed on a group affect all resources contained within that group. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Dependency trees are described in more detail in U.S. patent application Ser. No. 08/963,049 entitled "Method and System for Resource Monitoring of Disparate Resources in a Server Cluster," assigned to the same assignee as the present invention.

A cluster service 66 controls the cluster operation on a server cluster 59 (e.g., FIG. 3A), and is preferably implemented as a Windows NT® service. The cluster service 66 includes a node manager 68, which manages node configuration information and network configuration information (e.g., the paths between nodes $60_1$-$60_n$. The node manager 68 operates in conjunction with a membership manager 70, which runs the protocols that determine what cluster membership is when a change (e.g., node failure) occurs. A communications manager 72 (kernel driver) manages communications with other nodes of the cluster 59 via one or more network paths. The communications manager 72 sends periodic messages, called heartbeats, to counterpart components on the other nodes of the cluster 59 to provide a mechanism for detecting that the communications path is good and that the other nodes are operational. Through the communications manager 72, the cluster service 66 is essentially in constant communication with the other nodes $60_1$-$60_n$ of the cluster 59. In a small cluster, communication is fully connected, i.e., all nodes of the cluster 59 are in direct communication with all other nodes. In a large cluster, direct communication may not be possible or desirable for performance reasons.

Nodes $60_1$-$60_n$ in the cluster 59 have the same view of cluster membership, and in the event that one node detects a communication failure with another node, the detecting node broadcasts a message to nodes of the cluster 59 causing other members to verify their view of the current cluster membership. This is known as a regroup event, during which writes to potentially shared devices are disabled until the membership has stabilized. If a node does not respond, it is removed from the cluster 59 and its active groups are failed over ("pulled") to one or more active nodes. Note that the failure of the cluster service 66 also causes its locally managed resources to fail.

The cluster service 66 also includes a configuration database manager 76 which implements the functions that maintain a cluster configuration database on local storage devices $98_1$-$98_n$ (FIG. 4) such as a disk and/or memory, and configuration databases $100_1$-$100_3$ (FIG. 4) on each of the replica members $58_1$-$58_3$. The databases $100_1$-$100_3$ maintain cluster operational data, i.e., information about the physical and logical entities in the cluster 59, as described below. In one embodiment, the cluster operational data may be split into core-boot data and cluster configuration data, and is maintained in two cluster databases, as described in the copending U.S. patent application Ser. No. 09/277,503 entitled "Data Distribution in a Server Cluster," filed on Mar. 26, 1999, assigned to the same assignee as the present invention. As described therein, the core-boot data is stored in a database maintained on quorum replica members, while the cluster configuration data is stored in a database on a higher performance/lower cost storage mechanism such as a mirror set of storage elements. Note that the cluster software is aware that the core-boot data is replicated to multiple storage devices, and that the core-boot data has a log per storage device as described below. However, in such an embodiment, the cluster software views the mirror set storage as a single storage device and is generally not cognizant of the replication (which is maintained at a lower level). Thus, the cluster configuration information is viewed by the cluster software as a single database with a single log. The database manager 76 may cooperate with counterpart database managers of nodes in the cluster 59 to maintain certain cluster information consistently across the cluster 59. Global updates may be used to ensure the consistency of the cluster database in each of the replica members $58_1$-$58_3$ and nodes $60_1$-$60_n$.

A logging manager 78 provides a facility that works with the database manager 76 of the cluster service 66 to maintain cluster state information across a situation in which a cluster shuts down and a new cluster is later formed with no nodes necessarily being common to the previous cluster, known as a temporal partition. The logging manager 78 operates with the log file, preferably maintained in the replica members $58_1$-$58_3$, to unroll logged state changes when forming a new cluster following a temporal partition.

A failover manager 80 makes resource/group management decisions and initiates appropriate actions, such as startup, restart and failover. The failover manager 80 is responsible for stopping and starting the node's resources, managing resource dependencies, and for initiating failover of groups.

The failover manager 80 receives resource and node state information from at least one resource monitor 82 and the node manager 68, for example, to make decisions about groups. The failover manager 80 is responsible for deciding which nodes in the cluster 59 should "own" which groups. Those nodes that own individual groups turn control of the resources within the group over to their respective failover managers 80.

An event processor 83 connects the components of the cluster service 66 via an event notification mechanism. The event processor 83 propagates events to and from cluster-aware applications (e.g., 84) and to and from the components within the cluster service 66. An object manager 88 maintains various cluster objects. A global update manager 90 operates to provide a global, atomic and consistent update service that is used by other components within the cluster service 66. The global update protocol (GLUP) is used by the global update manager 90 to broadcast updates to each node $60_1$-$60_n$ in the cluster 59. GLUP generally comprises a standard global update message format, state information maintained in each node, and a set of rules that specify how global update should be processed and what steps should be taken when failures occur.

In general, according to the GLUP protocol, one node (e.g. $60_1$ of FIG. 4) serves as a "locker" node. The locker node $60_1$ ensures that only one global update is in progress at any given time. With GLUP, a node (e.g., $60_2$) wishing to send an update to other nodes first sends a request to the locker node $60_1$. When any preceding updates are complete, the locker node $60_1$ gives permission for this "sender" node $60_2$ to broadcast its update to the other nodes in the cluster 59. In accordance with GLUP, the sender node $60_2$ sends the updates, one at a time, to the other nodes in a predetermined GLUP order that is ordinarily based on a unique number assigned to each node. GLUP can be utilized to replicate data to the machines of a cluster 59, including at least some of the cluster operational data, as described below. A more detailed discussion of the GLUP protocol is described in the publication entitled "Tandem Systems Review" Volume 1, Number 2, June, 1985 pp. 74-84.

A resource monitor 82 runs in one or more processes that may be part of the cluster service 66, but are shown herein as being separate from the cluster service 66 and communicating therewith via RPC or the like. The resource monitor 82 monitors the health of one or more resources (e.g., $92_1$-$92_4$) via callbacks thereto. The monitoring and general operation of resources is described in more detail in the aforementioned U.S. patent application Ser. No. 08/963,049.

The resources (e.g., $92_1$-$92_4$) are implemented as one or more Dynamically Linked Libraries (DLLs) loaded into the address space of the Resource Monitor 82. For example, resource DLLs may include physical disk, logical volume (consisting of one or more physical disks), file and print shares, network addresses and names, generic service or application, and Internet Server service DLLs. The resources $92_1$-$92_4$ run in the system account and are considered privileged code. Resources $92_1$-$92_4$ may be defined to run in separate processes, created by the cluster service 66 when creating resources, or they may be run in a common process.

Resources expose interfaces and properties to the cluster service 66, and may depend on other resources, with no circular dependencies allowed. If a resource does depend on other resources, the resource is brought online after the resources on which it depends are already online, and is taken offline before those resources. Moreover, each resource has an associated list of nodes in the cluster 59 on which this resource may execute. For example, a disk resource may only be hosted on nodes that are physically connected to the disk. Also associated with each resource is a local restart policy, defining the desired action in the event that the resource cannot continue on the current node.

Nodes $60_1$-$60_n$ in the cluster 59 need to maintain a consistent view of time. A time function suitable for this purpose is available in the Windows® 2000 operating system, however in other implementations one of the nodes may include a resource that implements a time service.

From the point of view of other nodes in the cluster 59 and management interfaces, nodes in the cluster 59 may be in one of three distinct states, offline, online or paused. These states are visible to other nodes in the cluster 59, and thus may be considered the state of the cluster service 66. When offline, a node is not a fully active member of the cluster 59. The node and its cluster service 66 may or may not be running. When online, a node is a fully active member of the cluster 59, and honors cluster database updates, maintains heartbeats, and can own and run groups. Lastly, a paused node is a fully active member of the cluster 59, and thus honors cluster database updates and maintains heartbeats. Online and paused are treated as equivalent states by most of the cluster software, however, a node that is in the paused state cannot honor requests to take ownership of groups. The paused state is provided to allow certain maintenance to be performed.

Note that after initialization is complete, the external state of the node is offline. To join a cluster 59, following the restart of a node, the cluster service 66 is started automatically. The node configures and mounts local, non-shared devices. Cluster-wide devices are left offline while booting, because they may be in use by another node. The node tries to communicate over the network with the last known members of the cluster 59. When the node discovers any member of the cluster 59, it performs an authentication sequence wherein the existing cluster node authenticates the newcomer and returns a status of success if authenticated, or fails the request if not. For example, if a node is not recognized as a member or its credentials are invalid, then the request to join the cluster 59 is refused. If successful, the newcomer may be sent an updated copy of the shared database or databases. The joining node may use the one or more databases to find shared resources and to bring them online as needed, and also to find other cluster members. If a cluster is not found during the discovery process, a node will attempt to form its own cluster, by acquiring control of a quorum of the replica devices in accordance with one aspect of the present invention, as described below.

Once online, a node can have groups thereon. A group can be "owned" by only one node at a time, and the individual resources within a group are present on the node that currently owns the group. As a result, at any given instant, different resources within the same group cannot be owned by different nodes across the cluster 59. Groups can be failed over or moved from one node to another as atomic units. Each group has a cluster-wide policy associated therewith comprising an ordered list of owners. A group fails over to nodes in the listed order.

For example, if a resource (e.g., an application) fails, the failover manager 80 may choose to restart the resource, or to take the resource offline along with any resources dependent thereon. If the failover manager 80 takes the resource offline, the group is restarted on another node in the cluster 59, known as pushing the group to another node. A cluster administrator may also manually initiate such a group transfer. Both situations are similar, except that resources are gracefully shutdown for a manually initiated failover, while they are forcefully shut down in the failure case.

When an entire node in the cluster 59 fails, its groups are pulled from the failed node to another node. This process is similar to pushing a group, but without the shutdown phase on the failed node. To determine what groups were running on the failed node, the nodes maintain group information on each node of the cluster 59 in a database or the like (in-memory or persistent) to track which nodes own which groups. To determine which node should take ownership of which groups, those nodes capable of hosting the groups negotiate among themselves for ownership, based on node capabilities, current load, application feedback and/or the group's node preference list. Once negotiation of a group is complete, all members of the cluster 59 update their databases to properly reflect which nodes own which groups.

When a previously failed node comes back online, the failover manager 80 decides whether to move some groups back to that node, in an action referred to as failback. To automatically failback, groups require a defined preferred owner. There may be an ordered list of preferred owners in a cluster of more than two nodes. Groups for which the newly online node is the preferred owner are pushed from the current owner to the new node. Protection, in the form of a timing window, is included to control when the failback occurs.

Node Arbitration and Consistent Cluster Operational Data Via a Quorum of Independent Replicas In accordance with one aspect of the present invention, the information needed to form and operate a cluster, i.e., the cluster operational data, is replicated to a quorum replica set 57 of the replica members (e.g., $58_1$-$58_3$ of FIG. 3A). Such information generally includes node information, information regarding the replica members $58_1$-$58_3$ of the quorum replica set 57, and other critical information. A node of the cluster (e.g., $60_1$) needs to obtain exclusive ownership (control) of a quorum replica set 57 of replica members in order to form and maintain a cluster. Control of a quorum replica set establishes a cluster and guarantees that the cluster incarnation is unique, because only one node can have control over the quorum replica set 57 at any one time. Updates to this operational data are replicated to each member of the quorum replica set 57 by the node that has exclusive ownership thereof. Note that if another node wants to access some information in the quorum replica set 57, it does so through the node that owns the replica set.

To create a new cluster, a system administrator runs a cluster installation utility on a system (node) that then becomes a first configured member of the cluster 59. For a new cluster 59, a total replica set 106 of replica members is created, each member including a database (e.g., $100_1$, FIG. 4). As described below, to ensure that each replica member is consistent with the state of the previous cluster, a quorum replica set algorithm is executed to select the most updated replica member of the set, and propagate any needed (logged) information therefrom to other replica members. The administrator then configures any resources that are to be managed by the cluster software, possibly including other storage devices. In general, a first system forms a cluster as generally described below with reference to FIG. 6. At this time, a cluster exists having a single node (e.g., $60_1$), after which an installation procedure may be run to add more nodes and resources. Each added node (e.g., $60_2$) receives at least a partial copy of the current cluster operational data, (e.g., the cluster database $100_1$). This copy includes the information necessary to identify and access the members of the total replica set 106 and the identity of the other known member nodes of the cluster, (e.g., $60_1$-$60_n$). This information is stored on the added node's local storage, (e.g., $98_2$).

Figure 5:
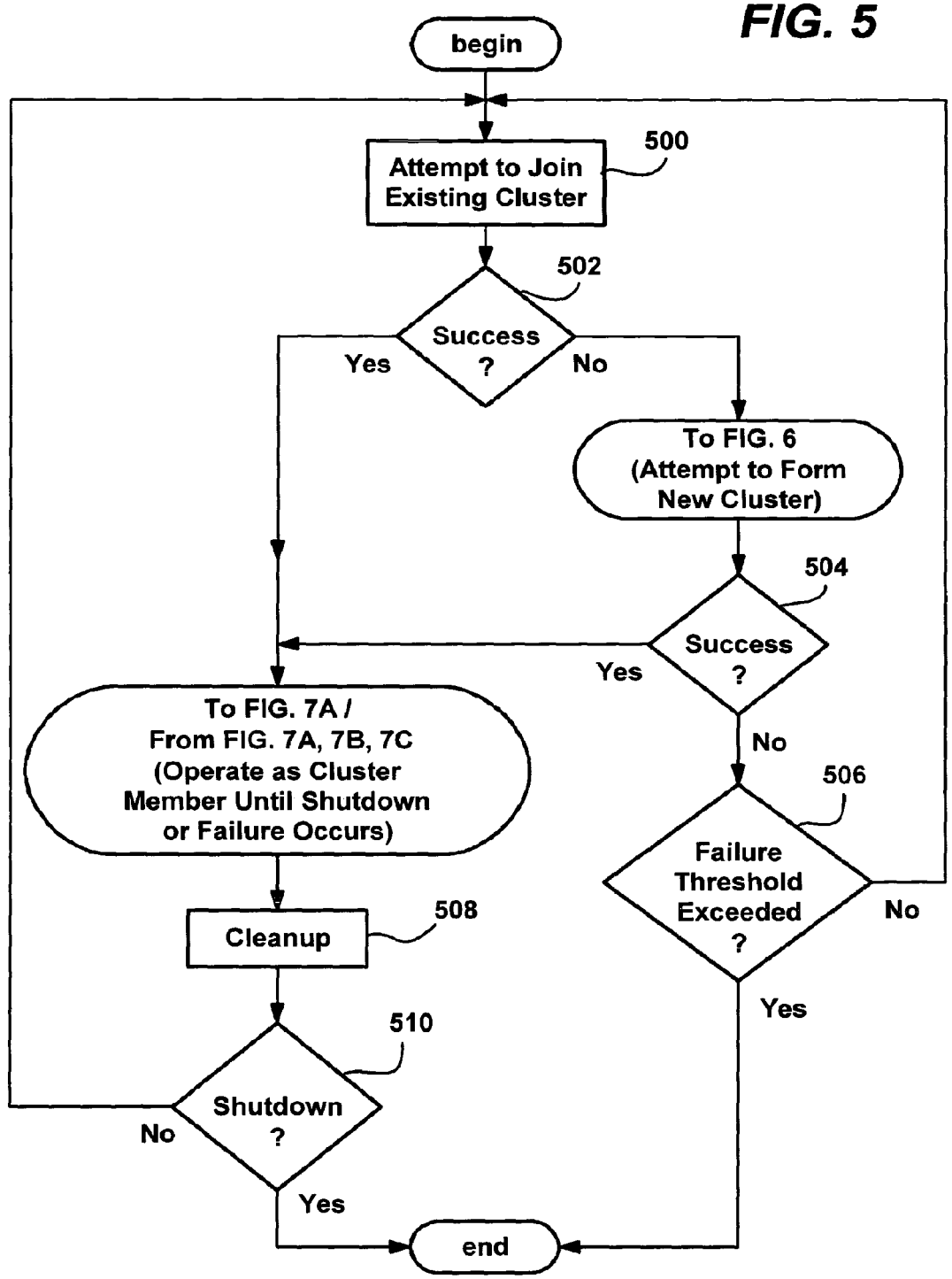
FIG. 5 is a flow diagram representing general initial steps taken by a node to join a cluster or form a new cluster.

More particularly, as shown in FIG. 5, beginning at step 500, a node that has been configured to be part of a cluster, but which is not currently participating in an operational instance of that cluster, first assumes that some instance of the cluster is operational and attempts to join that existing cluster, as described previously. If not successful as determined by step 502, the node will attempt to form a new instance of the cluster by arbitrating for control of a quorum (e.g., a majority) of the total replica set members, as described below with reference to FIGS. 6-11. If successful as determined by step 502, the node joins the existing cluster and performs some work as specified by the cluster, i.e., as set by an administrator, as described below with reference to FIGS. 7A-7C. The node continues to perform work until it is shut down, fails, or some event occurs, such as the node stops communicating with the cluster or a replica member fails, as described below.

Figure 4:
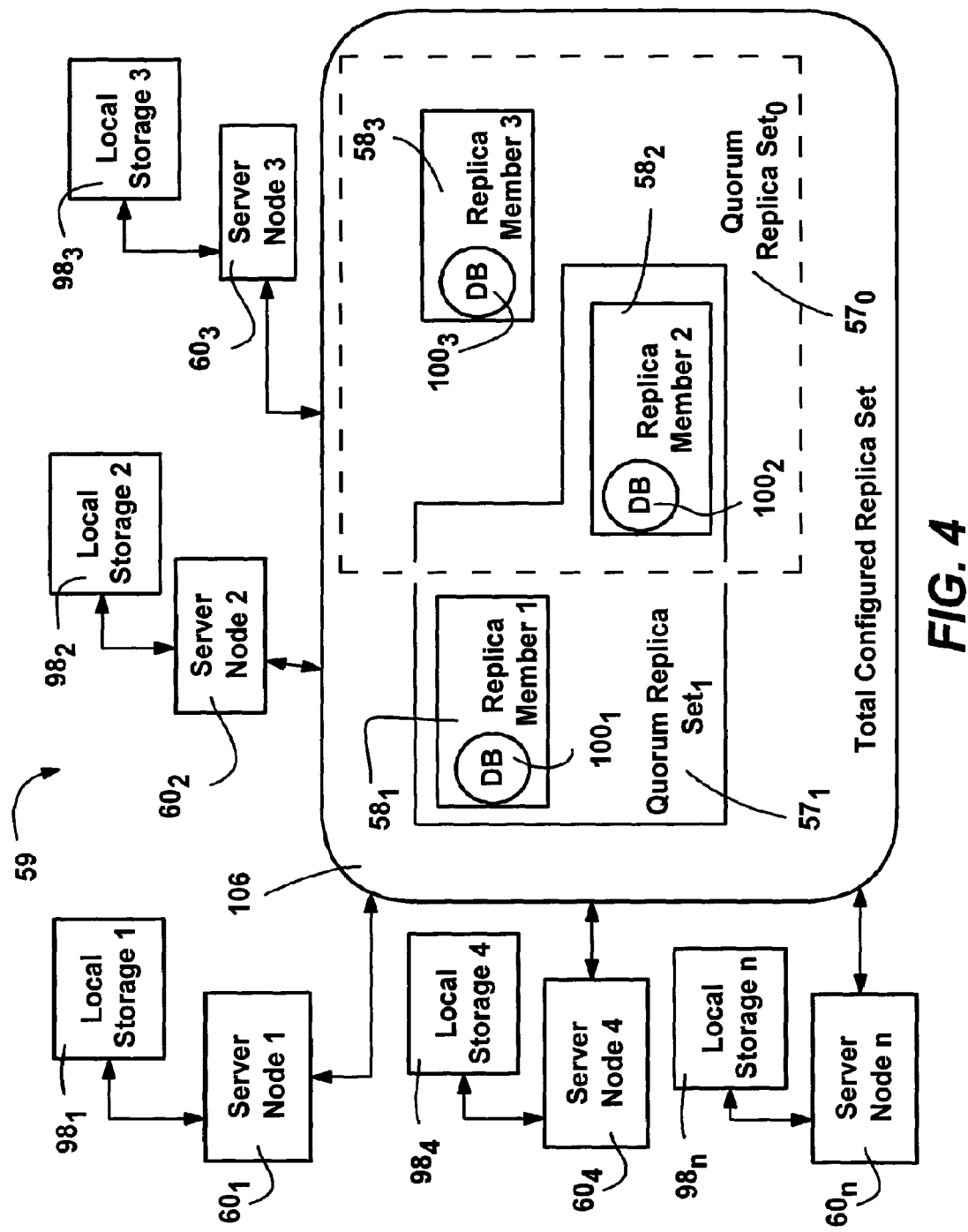
FIG. 4 is a block diagram representing a server cluster having a plurality of replica members therein for storing cluster operational data in accordance with one aspect of the present invention.

In accordance with one aspect of the present invention, to form a cluster when a plurality of replica members are configured, a node has to obtain access to a quorum of the replica members $58_1$-$58_n$, e.g., at least a simple majority of the total configured replica set 106. As described above, the replica members $58_1$-$58_3$ include the cluster operational data on respective databases $100_1$-$100_3$ (FIG. 4). The quorum requirement ensures that at least one replica member is common to the previous cluster, whereby via the common member or members and the quorum replica set algorithm, (described below), the cluster will possess the latest cluster operational data. The quorum further ensures that only one unique cluster may be formed at any given time. As a result, the node owning the quorum replica set possesses the information necessary to properly configure a new cluster following a temporal partition.

By way of example, FIG. 4 shows two quorum replica sets $57_0$ and $57_1$ which may be formed from the total number of replica members configured 106, (i.e., three in the present example). Replica Set$_0$ $57_0$, represented by the surrounding dashed line, was the prior quorum replica set used by the immediately prior cluster for recording cluster operational data, and included replica members $58_2$ and $58_3$. Some time later, a new cluster is formed with Replica Set$_1$ $57_1$ as the quorum replica set, which, as represented by the surrounding solid line, includes replica members $58_1$ and $58_2$. Since more than half (two or more in the present example) of the total members configured 106 are required to form a cluster, at least one replica member is common to any previous cluster. In the present example, the replica member $58_2$ is common to both replica sets, and thus maintains the correct cluster operational data from the prior cluster. Note that any permutation of the server nodes $60_1$-$60_n$ may have been operating in the previous cluster, as long as one node was present. Indeed, a significant benefit of the present invention is that at a minimum, only one node need be operational to form and/or maintain a cluster, which greatly increases cluster availability. In addition, even though multiple replica members (e.g., disks) are used to back up the cluster operational data to provide high availability, only a majority of the replica members is required to be functional in order to operate a cluster.

Figure 3B:
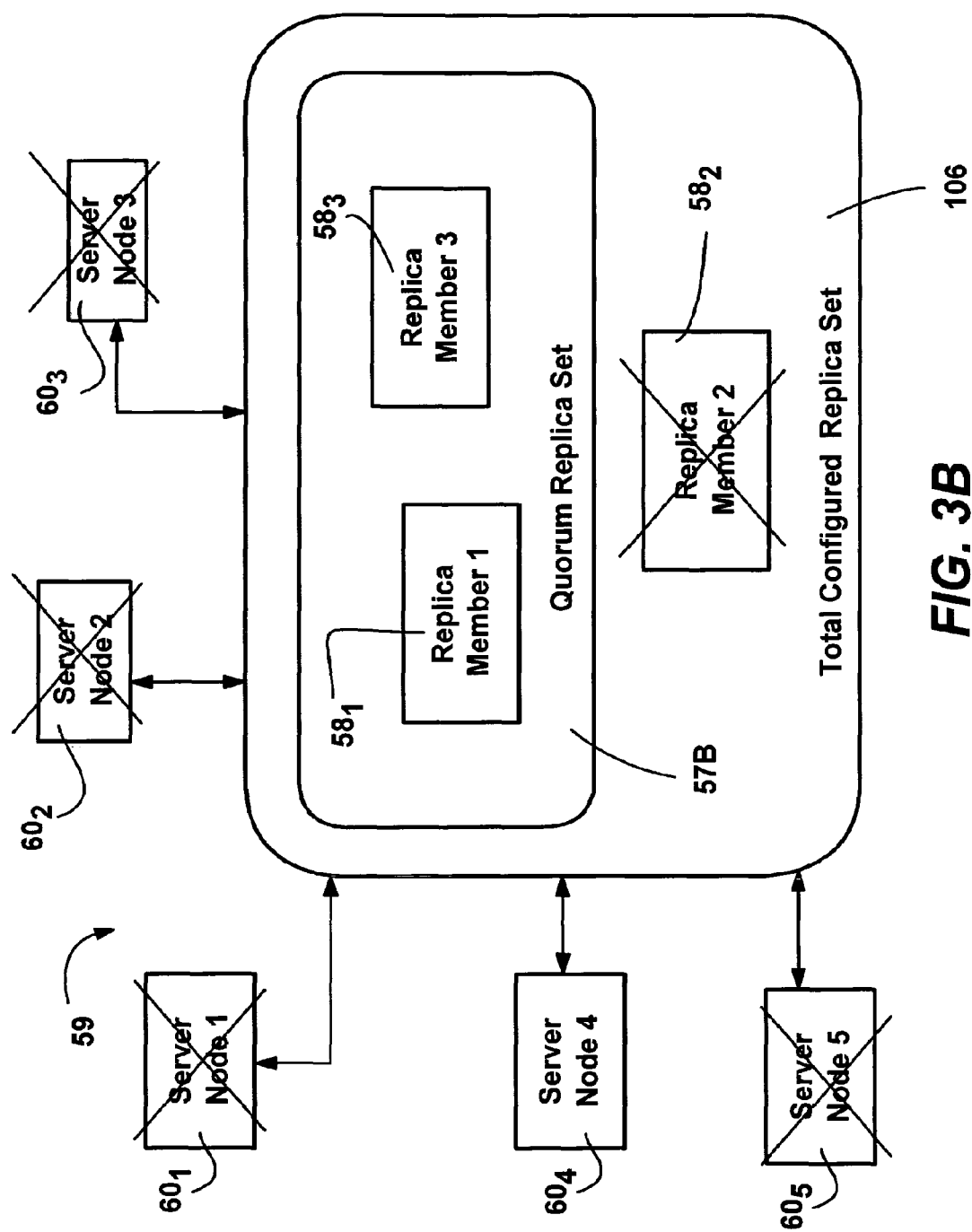
Figure 3C:
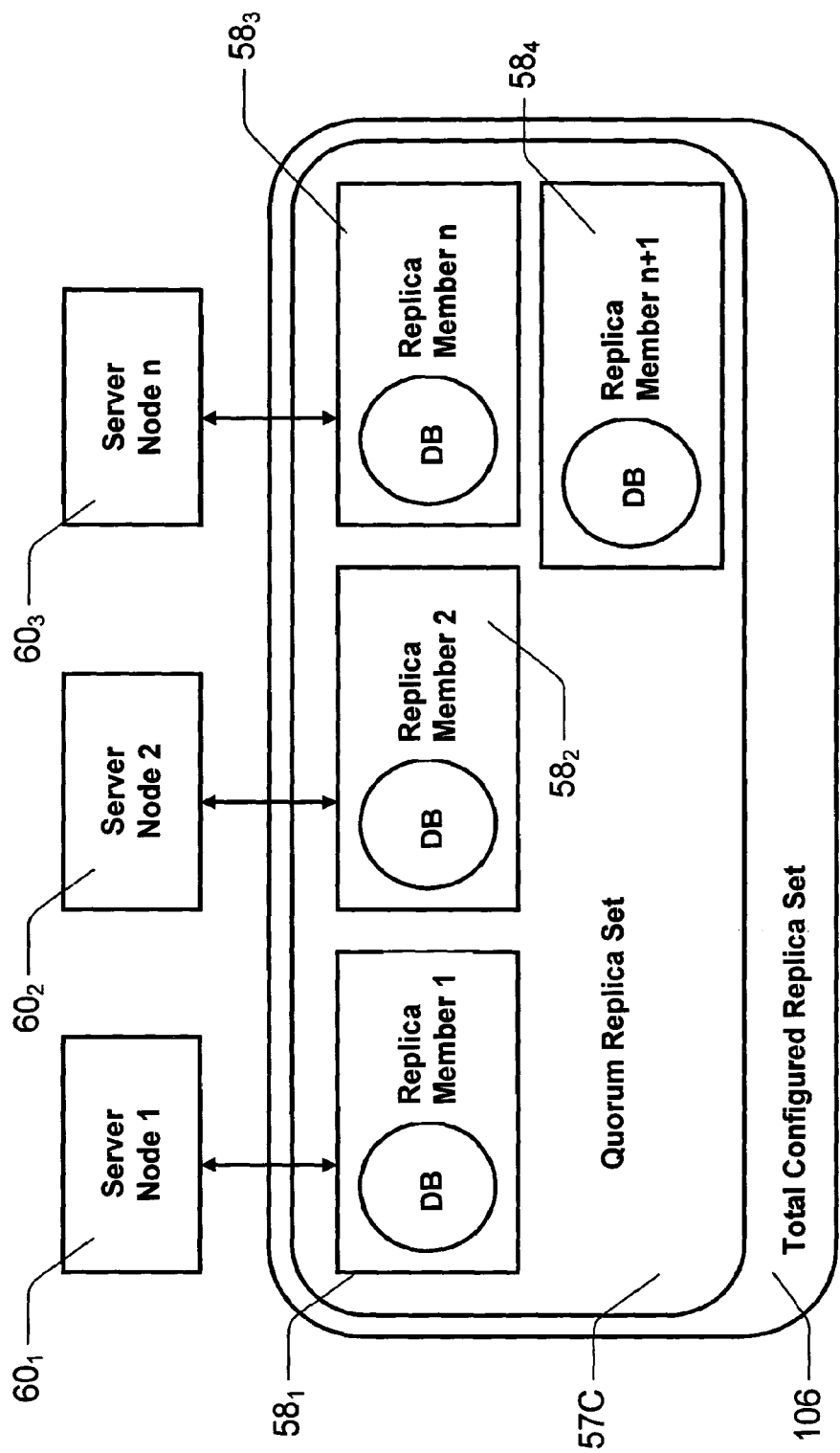
Figure 3D:
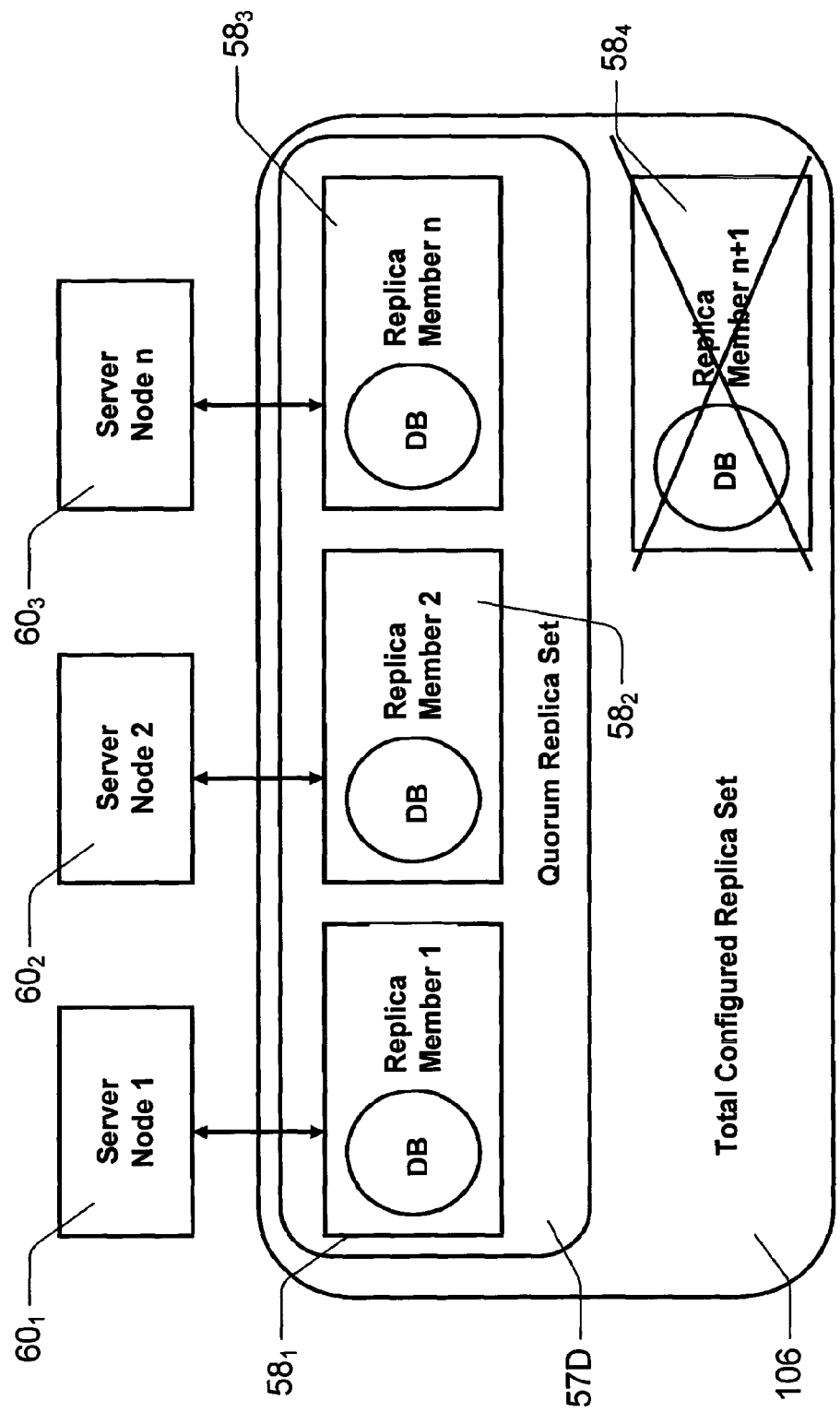

FIGS. 3A and 3B show how the present invention increases cluster availability. In FIG. 3A, a cluster is operating with eight total components comprising five nodes $60_1$-$60_5$ and a replica set $57_A$ having three replica members $58_1$-$58_3$ (out of three total replica members configured to work in the cluster). Some time later, as represented in FIG. 3B, only the node $60_4$ has survived, (the crossed-out components indicate failures), along with a modified quorum replica set $57_B$ comprising a majority two members $58_1$, and $58_3$ of the three possible replica members. Not only is the cluster capable of operating with a minority of nodes, (only one is needed regardless of the total available), but the cluster functions with a minority of total components (three of at least eight).

FIGS. 3C through 3E show a cluster and a quorum replica set comprised of both independent and local replica members. In FIG. 3C, the cluster 59 is operating with four total components comprising three nodes $60_1$-$60_3$ and a replica set $57_C$ having four replica members, three local replica members $58_1$-$58_3$ and one independent replica member $58_4$. The local replica members are integral to the nodes they are a part of and so the combination of each node+local replica member counts as one component.

Each of the three local replica members is typically integral to their respective nodes. That is each replica forms a part of the node and is controlled by the node. If the node fails then it is generally assumed that the replica fails as well. Each such node is considered a communicating node and tends to provide access to its local replica member for any other nodes in the cluster.

Some time later, as represented in FIG. 3D, the independent replica member $58_4$ has failed leaving only the local replica members $58_1$-$58_3$ surviving along with a modified quorum replica set $57_D$ comprising a majority three members $58_1$-$58_3$ of the four possible replica members.

In another failure condition, as represented in FIG. 3E, node $60_1$, along with its integral local replica member $58_1$, has failed. This failure leaves only two local replica members $58_2$-$58_3$ surviving along with independent replica member $58_4$ forming a modified quorum replica set $57_E$ comprising a majority three members $58_2$-$58_4$ of the four possible replica members.

Figure 6:
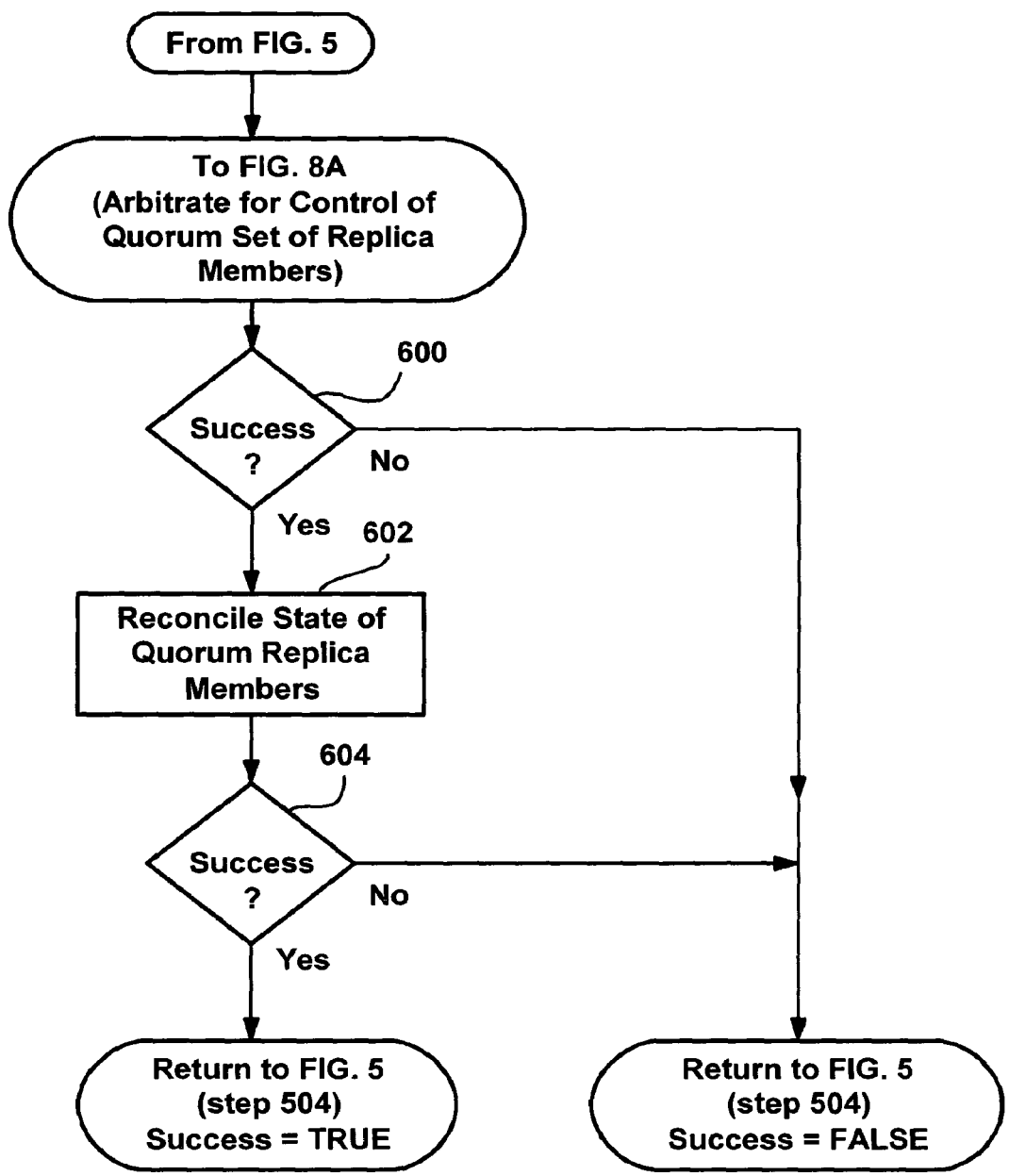
FIG. 6 is a flow diagram generally representing general logic when forming a cluster in accordance with one aspect of the present invention.

In keeping with the invention, any node may form a cluster following a temporal partition, regardless of the number of functioning nodes, since by effectively separating the cluster operational data from the nodes, there is no requirement that a majority of nodes be operational. Thus, for example, in FIG. 4, the node $60_3$ may have formed the latest cluster 59 by first having obtained exclusive control (described below) of the replica members $58_1$ and $58_2$ of the quorum replica set $57_1$. To this end, as shown in FIG. 6, the node attempting to form a cluster first arbitrates (via FIG. 8A) for control of a quorum replica set (e.g., $57_1$) of replica members from the total replica set 106 configured to operate in the cluster, as described below beginning at FIG. 8A, step 800.

More particularly, because only one node may have possession of the quorum replica set when a cluster is formed, and also because a node having exclusive possession thereof may fail, there is provided a method for arbitrating for exclusive ownership of the replica members, typically by challenging (or defending) for an exclusive reservation of each member. A method for releasing an exclusive reservation may also be provided. Arbitration may thus occur when a node first starts up, including when there is no cluster yet established because of a simultaneous startup of the cluster's nodes. Arbitration also occurs when a node loses contact with the owner of the quorum replica set, such as when the owner of the replica set fails or the communication link is broken, as described below. Arbitration for and exclusive possession of a single quorum device by two nodes are described in detail in the aforementioned U.S. patent application Ser. No. 08/963, 050.

In accordance with another aspect of the present invention, the arbitration/exclusive ownership process has been extended to accommodate a cluster of more than two nodes. Although the algorithm described herein is capable of arbitrating for control of a replica set with a plurality of members, it should be noted that the multiple node arbitration algorithm is applicable to clusters having a single quorum device as the resource. For example, in such an event, the "majority" can be considered as one member available out of a total configured set of one, and, although some simplification to the algorithm is possible when there is only one device in contention, the general principles are essentially the same.

In general, to obtain control over the members of the quorum replica set $57_1$, an arbitration process leverages a resource reservation mechanism such as the SCSI command set or the like in order for systems to exclusively reserve the (e.g., SCSI) replica members' resources and break any other system's reservation thereof. Control is achieved when a quorum of replica members is obtained by a node. A preferred mechanism for breaking a reservation is the SCSI bus reset, while a preferred mechanism for providing orderly mutual exclusion is based on a modified fast mutual exclusion algorithm in combination with the SCSI reserve command. One such algorithm is generally described in the reference entitled, "A Fast Mutual Exclusion Algorithm," Leslie Lamport, ACM Transactions on Computer Systems, 5(1), (February 1987), although such an algorithm needs to be modified (among other things) to make it work properly in an asynchronous system such as a cluster.

Figure 8B:
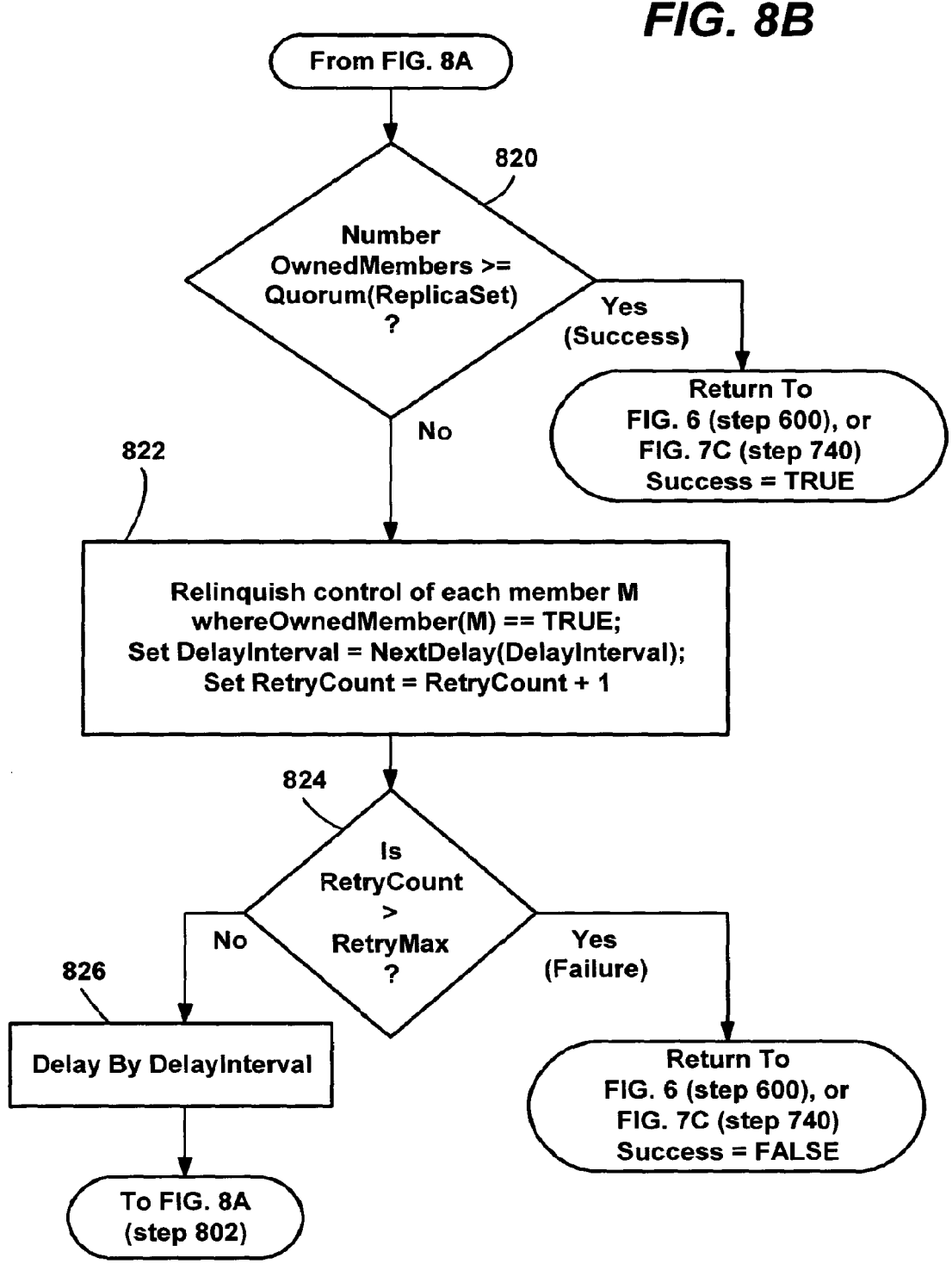
Figure 10:
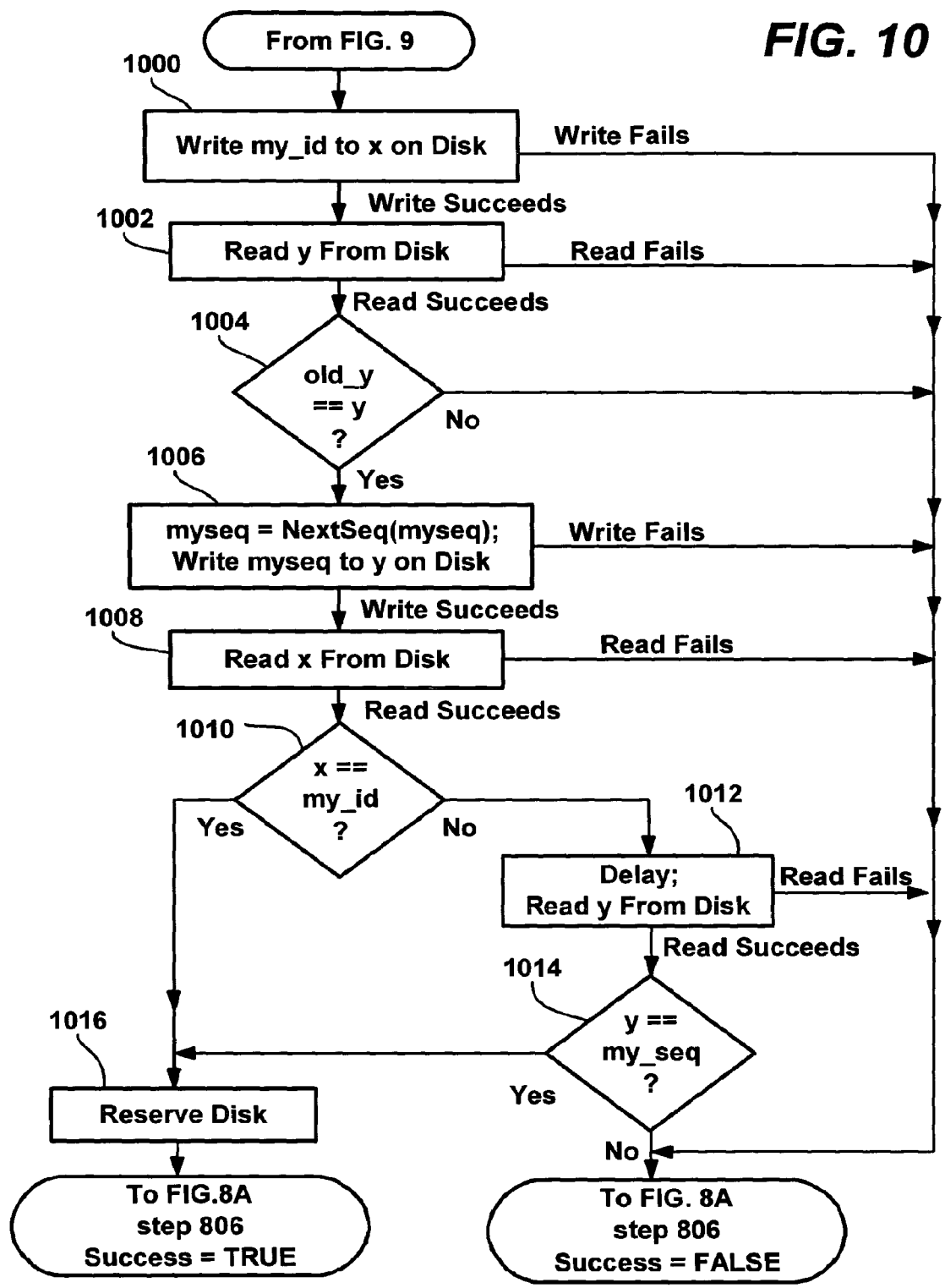

FIGS. 8A and 8B, in combination with FIGS. 9 and 10, provide general steps for arbitrating for control of a quorum of the members of a replica set. It should be noted that FIGS. 8A and 8B assume that the identity of at least a quorum of the members of the replica set are known to the nodes performing arbitration, and further, that a total order is imposed on the replica members, and this order is known to the nodes performing arbitration. As described above, such information is written to a node's local storage when the node is joined to the cluster.

Step 800 of FIG. 8A begins the process for arbitrating for the replica set by initializing some variables, e.g., setting a loop counter (RetryCount) to zero and a delay interval variable equal to an initial value. Similarly, step 802 initializes some additional variables, setting the current member (according to the known ordering) to the first member of the replica set, and zeroing a count that will be used for tracking the number of owned members against the quorum requirement. Step 802 also sets entries in an array that track which members are owned by the node to false, since no members are owned at this time. Step 804 then tests the current member against the order number of the last member in the total replica set, to determine whether arbitration has been attempted on each member in the total set of replica members. At this time, the first member is still the current member, and thus step 804 branches to arbitrate for this current member, as represented in the steps beginning at step 900 of FIG. 9.

FIG. 9 represents a suitable arbitration process for a single replica member, (e.g., $58_1$), although other arbitration mechanisms are possible. The arbitration process of FIG. 9 generally begins by first determining if a node owns the replica member $58_1$, and if so, whether that node is effectively dead (e.g., crashed or paused/operating very slowly, sometimes referred to as comatose). To this end, step 900 of FIG. 9 first sets a variable, (myseq), for this arbitration that is guaranteed to be unique to this cluster, e.g., the node's cluster-unique identifier in the high bits of the myseq variable plus a current time value in the low bits. Then, at step 902, the node (e.g., $60_1$) attempts to read a variable, y, from a specific location on the current replica member $58_1$.

A first possible outcome to the read request is that the read will fail (as detected at step 904) because another node (e.g., $60_2$) has previously placed (and not released) a reservation on the quorum member $58_1$. At this time, there is a possibility that the other node $60_2$ that has exclusive control of the quorum replica member $58_1$ has stopped functioning properly, and consequently has left the replica member $58_1$ in a reserved (locked) state. Note that the nodes $60_1$ and $60_2$ are not communicating, and thus there is no way for node $60_1$ to know why the communication has ceased, e.g., whether the other node $60_2$ has crashed or whether the node $60_1$ itself has become isolated from the cluster 59 due to a communication break. Thus, in accordance with another aspect of the present invention, the arbitration process includes a challenge-defense protocol to the ownership of the members of the quorum replica set $57_1$ that can shift representation of the cluster from a failed node $60_2$ to another node $60_1$ that is operational.

To accomplish the challenge portion of the process, if the read failed, at step 906, the challenging node $60_1$ first uses the SCSI bus reset command to break the existing reservation of the quorum replica member $58_1$ held by the other node $60_2$. Next, after a bus settling time (e.g., two seconds) at step 908, the node $60_1$ saves the unique myseq identifier to a local variable old_y and attempts to write the myseq identifier to the y-variable location on the replica member $58_1$. Note that the write operation may fail even though the reservation has been broken because another node may have exclusively reserved the replica member $58_1$ (via its own arbitration process) between the execution of steps 906 and 910 by the node $60_1$. If the write fails at step 912, the node $60_1$ knows that another node is competing for ownership, whereby the node $60_1$ backs off by failing the arbitration and appropriately returning with a "FALSE" success code. Note that the write may also fail if the replica member has failed, in which event it cannot be owned as a quorum member, whereby the "FALSE" return is also appropriate.

However, if the write was successful as determined at step 912, the arbitration process of the node $60_1$ continues to step 914 where the challenging node $60_1$ delays for a time interval equal to at least two times a predetermined delta value. As described below, this delay gives a defending node an opportunity to persist its reservation of the replica member $58_1$ and defend against the challenge. Because nodes that are not communicating cannot exchange node time information, the delta time interval is a fixed, universal time interval previously known to the nodes in the cluster, at present equal to a three-second arbitration time, and a bus-settling time of two seconds. Note, however that one bus settling time delay was already taken at step 908, and thus step 914 delays for double the arbitration time but only one additional bus settling time, e.g., eight more seconds. After this delay, step 920 again attempts to read the y-variable from the replica member $58_1$.

Returning to step 904, if the reading of the y-variable was successful, then no node had a reservation on the replica member $58_1$ and the local variable old_y is set to the y-variable (step 916) that was read. However, it is possible that the read was successful because it occurred just after another arbitrating node broke the exclusive reservation of a valid, operational owner. Thus, before giving the node $60_1$ exclusive control (ownership) of the replica member $58_1$, step 916 branches to step 918 to delay for a period of time sufficient to enable the present exclusive owner, (if there is one), enough time (e.g., the full two-delta time of ten seconds) to defend its exclusive ownership of the current member. After the delay, step 918 continues to step 920 to attempt to re-read the y-variable.

Regardless of the path taken to reach step 920, if the read at step 920 failed as determined by step 922, then the arbitration is failed because some node reserved the replica member $58_1$.

Alternatively, if at step 924 the member's y-variable that was read changed from its value preserved in the local old_y variable, then a competing node appears to be ahead in the arbitration process, and the node $60_1$ backs off as described below so that the other node can obtain the quorum. However, if the y-variable has not changed, it appears that no node is able to defend the replica member $58_1$ and that the node $60_1$ may be ahead in the arbitration, whereby at step 924 the arbitration process continues to step 1000 of FIG. 10.

Note that it is possible for a plurality of nodes to successfully complete the challenge procedure of FIG. 9 and reach step 1000 of FIG. 10. In accordance with one aspect of the present invention, a mutual exclusion algorithm is executed to ensure that only one of the plurality of nodes succeeds in completing the arbitration process. In accordance with the principles of a fast mutual exclusion algorithm, at step 1000 of FIG. 10, an attempt is made to write an identifier unique from other nodes to a second location, x, on the replica member $58_1$. Note that as shown in FIG. 10, for purposes of simplicity, any time a read or write operation fails, the arbitration is failed, and thus only successful operations will be described in detail herein. Then, steps 1002 and 1004 again test whether y's value on the replica member $58_1$ still equals the old_y variable, since it may have just been changed by another node, e.g., node $60_3$ wrote to y while the operation of writing the x value by the node $60_1$ was taking place. If changed, at least one other node is apparently contending for ownership, and thus step 1004 backs off, i.e., fails the arbitration process.

If y is still unchanged at step 1004, step 1006 generates a new unique myseq sequence identifier for the node $60_1$ into the y location on the replica member $58_1$, and if successful, continues to step 1008 where the value at the x location is read. If at step 1010 the x location still maintains the my_id value (written at step 1000), then this node $60_1$ has won the arbitration, reserves the disk at step 1016 and returns with a success return code of "TRUE." Alternatively, if at step 1010, the x location no longer maintains the ID of the node $60_1$, then apparently another node (e.g., $60_4$) is also challenging for the right to obtain exclusive control. However, it is possible that the other node $60_4$ has changed the x value but then backed off because the y-value was changed, (e.g., at its own steps 1002-1004), whereby the node $60_1$ is still the leader. Thus, after a delay at step 1012 to give the other node time to write to the y-location or back off, the y-value is read, and if the y value is changed at step 1014, then the arbitration was lost. Note that a node which wins the arbitration writes the y-location immediately thereafter as described below with reference to FIG. 11.

Conversely, if the y value is still equal to the unique sequence ID (myseq) of the node $60_1$ at step 1014, then this node $60_1$ has won the arbitration, and returns with the "TRUE" success return code. Note that the mutual exclusion mechanism of steps 1000-1014 (run by each competing node) ordinarily ensures that only one node may ever reach step 1016 to persist the reservation, because only the node having its ID in the y-location can enter this critical section, while the x-location is used to determine if any other nodes are competing for the y-location. However, there is a non-zero probability that more than one node will successfully complete the arbitration procedure, given arbitrary processing delays. This is because fast mutual exclusion depends on the delay at step 1012 being long enough to guarantee that the participants that evaluated the condition at step 1004 as true are able to write down their sequence number to the disk at step 1006. However, if an unexpected delay occurs between steps 1004 and 1006 that is larger than the delay of step 1012, then more than one node could have successfully complete the arbitration procedure. This unlikely problem is made even less likely by the fact that a node places a SCSI reservation on a replica set member after successfully completing arbitration, as will be discussed later with reference to FIG. 11.

Returning to FIG. 8A, step 806 evaluates the code returned for the current member from the single-member arbitration algorithm of FIGS. 8 and 9. If not successful, step 806 branches to step 808 to determine whether the failure to obtain control was caused by the member being owned by another node, or whether the member was inaccessible, e.g., crashed or not properly connected to the challenging node $60_1$. If owned by another node, step 808 branches to FIG. 8B to determine whether the challenging node $60_1$ already has a quorum, or should back off and relinquish any members controlled thereby as described below. If the failure occurred because the member was not accessible (as opposed to owned), step 808 branches to step 812 to repeat the process on the next member, as described below.

If at step 806 it is determined that the challenging node $60_1$ was successful in obtaining control of the replica member $58_1$, step 806 branches to step 810. At step 810, the array tracking the node's control of this member is set to "TRUE," the count used for determining a quorum is incremented, and the replica member $58_1$ is set to be defended by the node $60_1$ if the node $60_1$ is able to achieve control over a quorum of the members. Defense of an owned member is described below with reference to FIG. 11. Then, at step 812, the current member is changed to the next member (if any) and the process returns to step 804 to again arbitrate for control of each remaining member of the total replica set of configured replica members.

Step 820 of FIG. 8B is executed when the replica members have all been arbitrated (step 804 of FIG. 8A) or if an arbitrated replica member was owned by another node (step 808 of FIG. 8A) as described above. Step 820 tests whether the count of members owned by the challenging node $60_1$ achieved a quorum. If so, step 820 returns to its calling location with a "TRUE" success code whereby the next step in forming a cluster will ultimately take place at step 602 of FIG. 6, as described below.

If a quorum is not achieved, step 820 branches to step 822 to relinquish control of any replica members that the node $60_1$ obtained ownership over, recompute the delay interval, and increment the retry (loop) counter. Step 824 then repeats the process after the delay interval at step 826 by returning to step 802 of FIG. 8A, until a maximum number of retries is reached. Typically the delay calculation in step 822 uses a well-known "exponential backoff" as follows:

$$\text{BackoffTime} = \text{BackoffTime0} * (E^n) * \text{Rand}() + \text{BackoffTimeMin},$$

where BackoffTime0 is the maximum backoff time for the first try, E is a number greater than 1, typically 2 for convenience, n is the retry number (0 based), ^ represents exponentiation (raised to the power), BackoffTimeMin is the smallest practical backoff time, and Rand( ) is a function that returns a random number between 0 and 1.

If no quorum is achieved after retrying, the process ultimately returns to step 504 with a failure status. Steps 504 and 506 will repeat the attempt to join an existing cluster or start the formation attempt over again, until some threshold number of failures is reached, whereby some action such as notifying an administrator of the failure may take place.

It should be noted that FIGS. 8A and 8B describe a probabilistic algorithm. In general, the ordering requirement, the restart of the process upon failure to control a member, and the random exponential backoff, when taken together, provide some non-zero probability that one of a plurality of independent (non-communicating) arbitrating nodes will successfully gain control of a quorum of the members in the set. The probability may be adjusted by tuning various parameters of the algorithm. Note that the use of exponential backoff techniques in arbitration algorithms is well known to those skilled in the art, e.g. it is the basis for CSMA/CD networks such as Ethernet. Moreover, note that the probabilistic nature of the overall algorithm is different than the probability that more than one node will successfully complete the arbitration procedure, given arbitrary processing delays, as described above.

Returning to step 602 of FIG. 6, when a quorum is achieved, an attempt is made to reconcile the replica members so that the correct cluster operational data may be determined. As described above, a requirement on any mechanism for maintaining the cluster operational data is that a change made to the data by a first instance of a cluster be available to a second instance of the cluster that is formed at a later time. In other words, no completed update may be lost. In order to meet these requirements for a set of replica members, changes pertaining to the update are applied to a quorum of the replica members, and an update is not deemed to be complete until this is successfully accomplished, thereby guaranteeing that at least one member of any quorum set has the latest data. In general, one way to accomplish this goal is to use a distributed consensus algorithm, such as one similar to the algorithm generally described in the reference entitled, "*The Part-Time Parliament*," Leslie Lamport, *ACM Transactions on Computer Systems* 16, 2 (May 1998), 133-169. In order to reconcile the states of different members of a replica set, a quorum replica set algorithm, described below, is executed. In accordance with another aspect of the present invention, as part of the quorum replica set algorithm, a recovery process is initiated whenever a replica member becomes available and a majority of members are available. To determine the most updated member and thereby accomplish consistent reconciliation, an epoch number is stored on the log header of a log maintained on each replica member. The epoch on the log header is incremented during the recovery process and corresponds to the epoch that begins with that recovery process. In addition, every update is originally associated with an epoch number and a sequence number. These are stored on each replica member as part of the log record associated with this update. The epoch in the log records correspond to the epoch in which the update was made.

The failure of any read or write operation on a quorum replica set member during this recovery procedure is treated as a failure of the replica member, (although the operation may be optionally retried some number of times before declaring failure). A failed replica member is removed from the quorum replica set, as described below with reference to FIG. 18. The cluster may continue operating despite the failure of a member of a quorum replica set at any point, as long as the remaining set still constitutes a quorum. If the remaining set does not constitute a quorum, then the cluster must cease operating, at least with respect to allowing updates to the cluster operational data, as described below. If the quorum requirement is still met after a replica member failure, any update or reconciliation procedure that was in progress when the member failed continues forward unaltered, after the failed member has been removed from the quorum replica set. This procedure guarantees that all updates to the cluster operational data are sequentially consistent, that no committed update is ever lost, and that any cluster instance, which controls a quorum of the total replica set members, will have the most current cluster operational data.

If the reconciliation of the members at step 602 is determined to be successful at step 604, the process returns to step 504 of FIG. 5 with a "TRUE" success status, otherwise it returns with a "FALSE" status. As described above, based on the status, step 504 either allows the cluster to operate or restarts the join/formation attempt up to some threshold number of times.

Figure 7A:
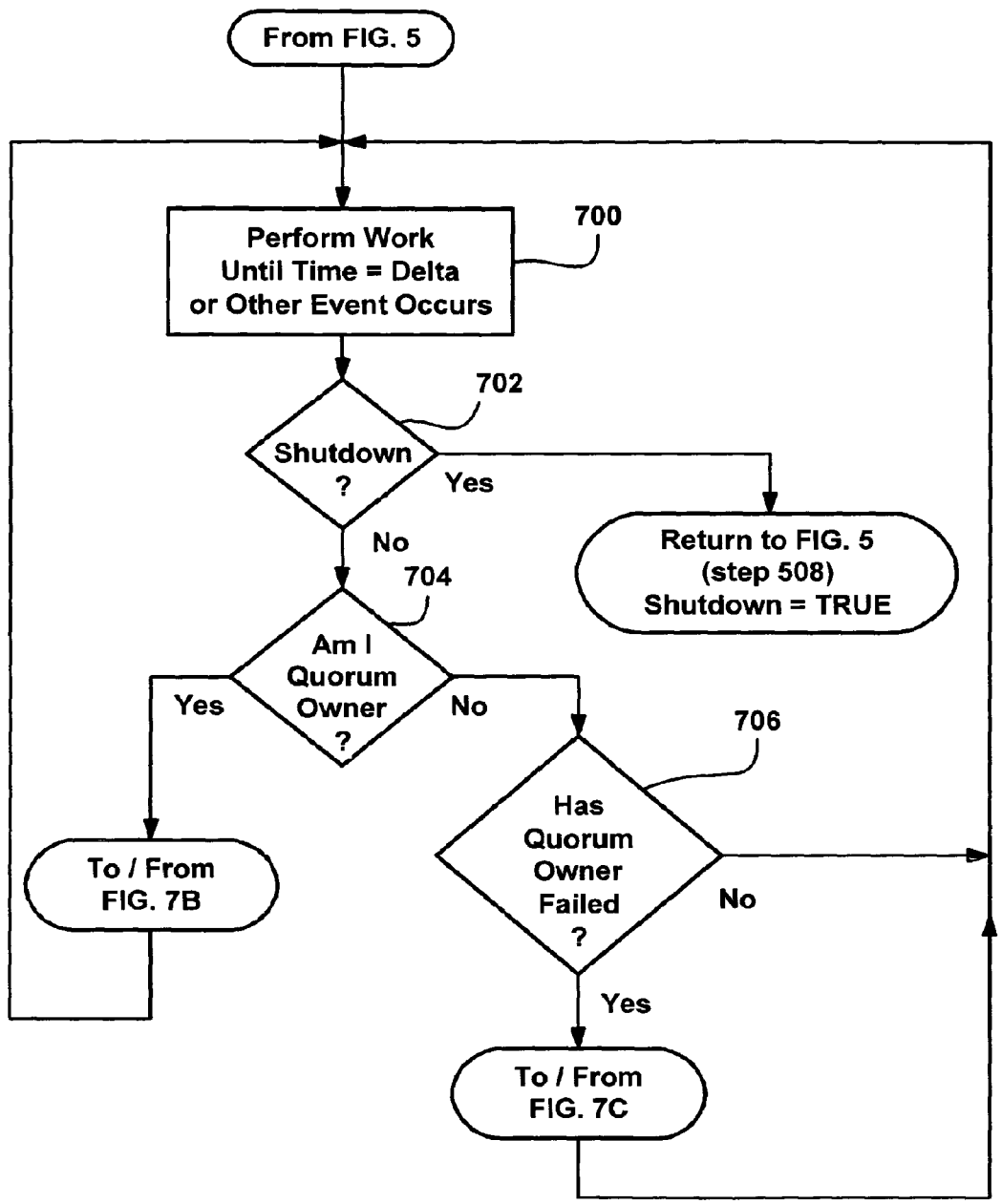

Step 700 of FIG. 7A represents the performing of work by the cluster. In general, the work continues until some event occurs or a time of delta elapses, where delta is the arbitration time (e.g., three seconds) described above. Preferably, the node continues to perform work and runs a background process when an event/time interval is detected. Events may include a graceful shutdown, a failure of a replica member, and a failure of a node. Step 702 tests if a shutdown has been requested, whereby if so, step 702 returns to step 508 of FIG. 5 with a TRUE shutdown status. Step 508 performs various cleanup tasks, and step 510 tests the shutdown status, ending operation of the node if TRUE.

If not a shutdown event, step 702 of FIG. 7A branches to step 704 where the node makes a decision based on whether the node is the owner of the quorum of replica members. If so, step 704 branches to step 720 of FIG. 7B, described below, while if not step 704 branches to step 706 where the quorum owner's communication with the node is evaluated. If the quorum-owning node is working, step 706 returns to step 700 to resume performing work for the cluster. Otherwise, step 706 branches to step 740 of FIG. 7C, as described below.

Figure 7B:
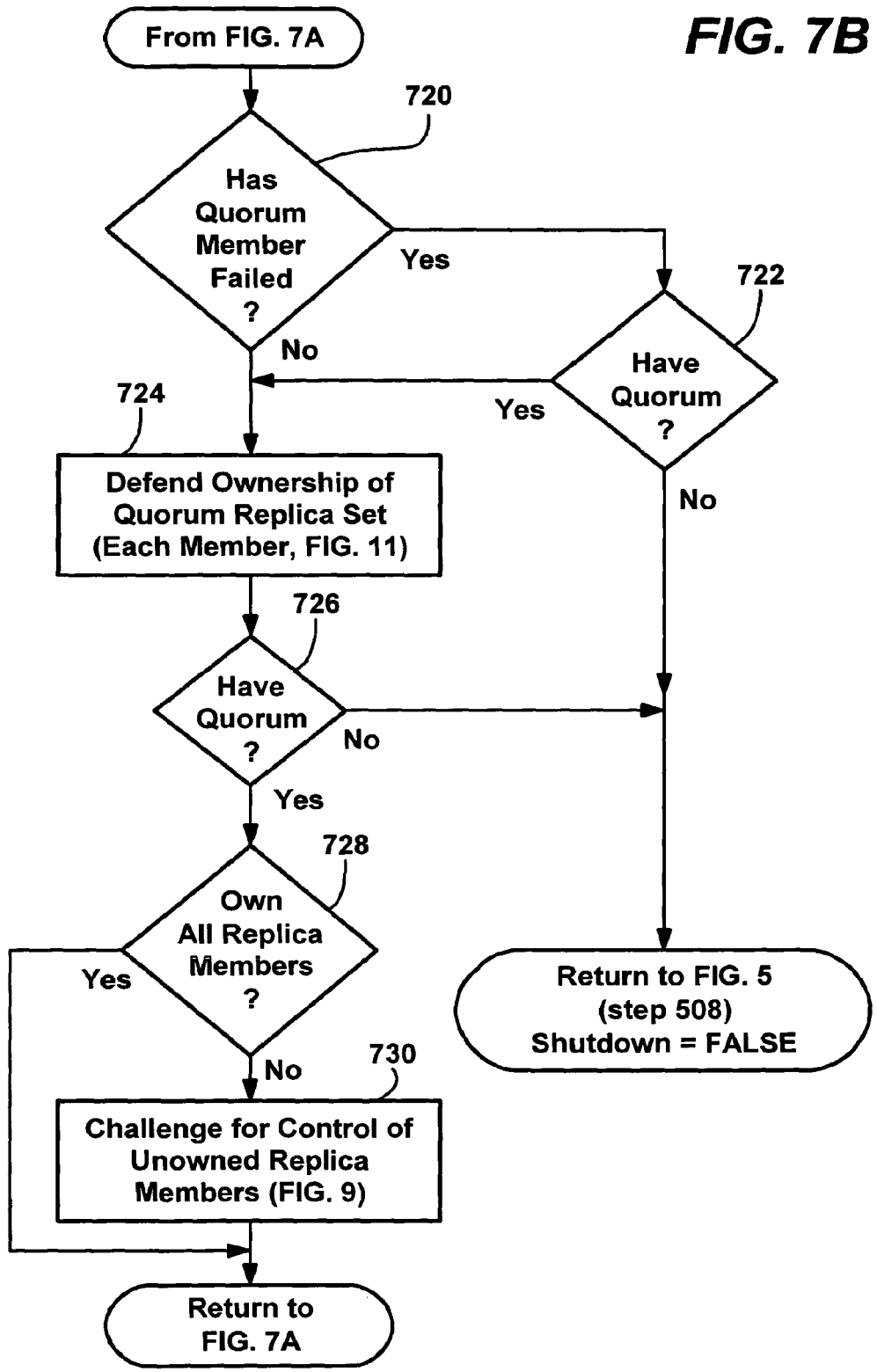

Turning to FIG. 7B, when a node e.g., $60_2$ represents the cluster, at step 720 the node tests whether an event corresponded to a failure of one or more of the replica members. If so, step 722 is executed to determine if the node $60_2$ still has control of a quorum of replica members. If not, step 722 returns to step 508 of FIG. 5 with a "FALSE" shutdown status whereby the cleanup operation will take place and the cluster join/formation process will be repeated for this node $60_2$. However if the node $60_2$ still has a quorum of members, step 722 branches to step 724 to defend ownership of each of the members, as described below. Note that the defense of the members (FIG. 11) is essentially performed on each member in parallel.

Figure 11:
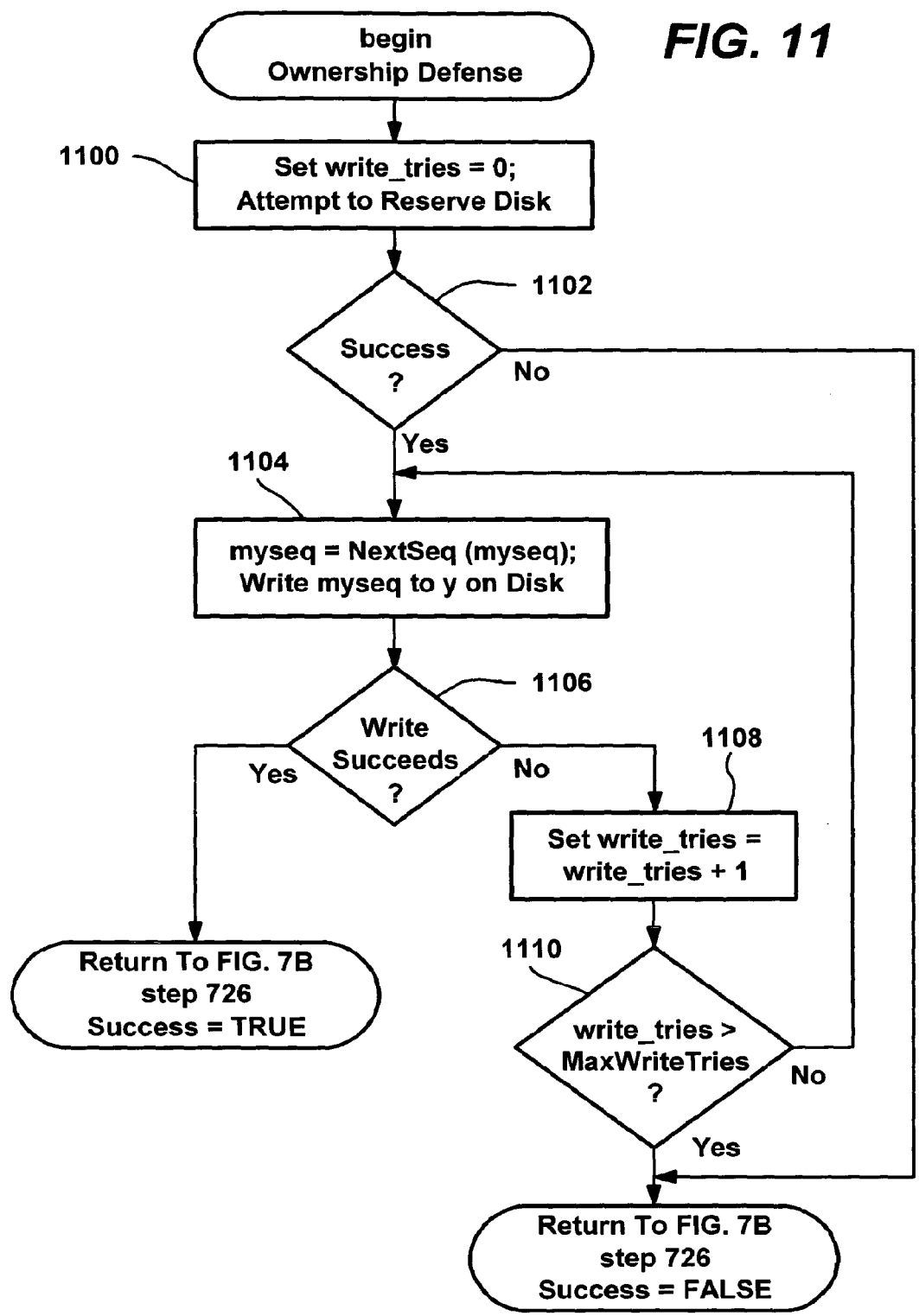
FIG. 11 is a flow diagram generally representing steps taken by a node representing the cluster to defend its ownership of a replica member.

As shown at step 1100 of FIG. 11, to defend each of the owned replica members, the node $60_2$ first sets a loop counter for a number of write attempts to zero, and then attempts to exclusively reserve that member, e.g., via the SCSI reserve command. If unsuccessful, another node has won control of this disk, whereby the node $60_2$ re-evaluates at step 726 of FIG. 7B whether it still possesses a quorum. If the node has lost the quorum, the node $60_2$ will ultimately return to step 508 of FIG. 5 and repeat the join/formation process.

If successful in reserving the disk, step 1104 is next executed where a new myseq value is generated for this node $60_2$ and an attempt is made to write to write the y-variable used in the arbitration process, as described above. The y-variable is essentially rewritten to cause other nodes that are monitoring the y-value after breaking the previous reservation to back off, as also described above. If the write succeeds, the replica member was successfully defended, and the process returns to step 726 of FIG. 7B with a "TRUE" success status. If the write failed, steps 1108 and 1110 cause the write attempt to be repeated some maximum number of times until the process either successfully defends the replica member or fails to do so, whereby the node needs to re-evaluate whether it still has a quorum, as described above. Note that an added benefit to using the SCSI reservation mechanism is that if a former owning node malfunctions and loses control of a member, it is prevented from accessing that member by the SCSI reservation placed by the new owner. This helps prevent against data corruption caused by write operations, as there are very few times that the members of the quorum replica set will not be exclusively reserved by a node (e.g., only when a partition exists and the reservation has been broken but not yet persisted or shifted).

Returning to step 726 after attempting to defend the members, if the node $60_2$ no longer has a quorum, the node returns to step 508 of FIG. 5 to cleanup and then repeat the join/formation process. Conversely, if the node still possesses a quorum of the members, step 728 is next executed to test whether the node $60_2$ that represents the cluster owns all the members of the total replica set 106 of configured members. If so, step 728 returns to step 700 of FIG. 7A. However if not all the members are owned, for reliability and robustness, the node representing the cluster attempts to obtain control of as many of the operational replica members as it can. Thus, at step 730, the node attempts to gain control of any member, M, for which OwnedMember(M)==FALSE, using the single member arbitration algorithm of FIGS. 9 and 10 described above. If there are multiple members that are not owned, the node may attempt to gain control of them in any order, or in parallel.

FIG. 7C represents the steps taken by a node (e.g., $60_1$) that is not in control of the quorum replica set (step 704 of FIG. 7A) and that is no longer communicating (step 706 of FIG. 7A) with the node that was in control of the quorum replica set. First, FIG. 7C calls the process (beginning at FIG. 8A) that arbitrates for control of the replica members of the total replica set. If a quorum is not achieved as ultimately evaluated at step 740, step 742 is executed to determine if the node $60_1$ is now communicating with the quorum owner. Note that ownership may have changed. If connected at step 742, the node $60_1$ returns to FIG. 7A to perform work for the cluster, otherwise the node returns to step 508 of FIG. 5 to cleanup and restart the joining, formation process as described above.

Alternatively, if at step 740 the node successfully acquired control over a quorum of replica members, step 744 is executed to reconcile the quorum members and form the cluster as described above. If successful in reconciling the members, the node $60_1$ returns to FIG. 7A to perform work for the cluster it now represents, including executing the steps of FIGS. 13-24 as appropriate, otherwise the node returns to step 508 of FIG. 5 to cleanup and restart the joining, formation process as described herein.

In alternative implementations, not all of the cluster operational data need be maintained in the replica members $58_1$-$58_3$, only the data needed to get the cluster up and running, as described in the aforementioned copending U.S. Patent Application entitled "Data Distribution in a Server Cluster." In one such alternative implementation, the replica members maintain this "core-boot" data, and also maintain information regarding the state of the other cluster operational data, (e.g., configuration information about the applications installed on the cluster and failover policies). The state information ensures the integrity of the other cluster operational data, while the other storage device or devices (e.g., a mirror set of storage elements) that store this data provide a relatively high-performance and/or lower cost storage for this additional cluster configuration information, with high reliability. In any event, as used herein, the replica members $58_1$-$58_3$ maintain at least enough information to get a cluster up and running, but may store additional information as desired.

Note that a quorum need not be a simple majority, but may, for example, be some other ratio of operational members to the total number, such as a supermajority (e.g., three of four or four of five). However, a primary benefit of the present invention is to provide availability with the minimum number of components, and such a supermajority requirement would tend to reduce availability.

Instead, cluster availability may be increased by requiring only a simple majority while using a larger number of devices. For example, three replica members may be configured for ordinary reliability, in which two disks will have to fail to render the cluster unavailable. However, the more that reliability is desired, the more replica members may be used, (at a cost tradeoff), e.g., three of five failures is less likely than two of three, and so on. Note that SCSI limitations as to the number of replica members and their physical separation need not apply, as described in U.S. patent application Ser. No. 09/260,194 entitled "Method and System for Remote Access of Network Devices," assigned to the same assignee as the present invention.

The Quorum Replica Set Algorithm

While having a set of multiple replica members increases cluster availability and reliability over a single quorum device, having a replica set requires providing consistency across the members of the replica set. This consistency needs to be maintained even though individual replica members can fail and recover at various times.

In accordance with another aspect of the present invention, to keep a replica set consistent in view of replica failures and recoveries, (and also following a temporal partition), a quorum replica set (QRS) algorithm is provided that among other things, performs a recovery process whenever a change to a replica set occurs, (that is, any time a formerly unavailable replica member becomes available). The QRS algorithm also prevents updates when less than a quorum of replica members is available. To this end, as part of the QRS algorithm, any time a write occurs to a replica member, (described below with respect to FIGS. 20-22), the success of that write determines whether the replica member is available or has failed. If failed, the remaining available set is checked for a majority, and no updates are allowed unless there is a majority.

The QRS algorithm is capable of being run on any node that is capable of representing the cluster via ownership of the quorum replica set 57. The QRS algorithm may be run during startup as replica members are detected, e.g., to bring those members online, and is also run during normal execution, such as by the node that possesses the quorum replica set 57, to ensure that replica members that come online or go offline are properly dealt with, and to ensure that data updates only occur when a quorum of configured members exists. For purposes of simplicity, the QRS algorithm will be primarily described with respect to its operation after a cluster has already been formed.

The QRS algorithm includes three properties. A first property is that configuration information updates that are applied to a majority of the members of a replica set will never be undone or lost despite the subsequent failure and recovery of replica set members and/or nodes executing the QRS algorithms. A second property is that an update that was recorded to some of the replica members but not committed in a previous recovery, or an update that was made without the knowledge of a previously committed update in a later epoch, will not get committed during recovery. A third property is that an update is reported to have succeeded if and only if the update was applied to a quorum of the replica members. Thus, if an update was in progress when a failure occurred, but had not yet been applied to a quorum of the replica members, then its fate cannot be known until recovery is complete. Such an update may be either committed or discarded during the recovery procedure. When an update is committed to at least the quorum, the update is reported to the cluster as having been successfully committed. Such reports (commit notifications) are generated in the same order in which the updates occur.

In order to ensure replica consistency, the QRS algorithm uses a log (a standard database technique) that logs the updates in records on each replica member, including three variables associated with the logged information. For example, in the three-member configured replica set generally represented in FIGS. 12A-12D, each replica member (e.g., 0, 1 and 2) includes a respective log $120_0$-$120_2$. In each log, a first variable is a replica epoch number, $122_0$-$122_2$, respectively, which is a number stored in a header $124_0$-$124_2$ of the log on each replica. The replica epoch number, also referred to herein as a current replica epoch, is associated with a recovery session as described below, and always moves in one direction (e.g., increases by at least one during the recovery process).

A second variable used by the QRS algorithm is an update epoch number. The update epoch number is stored with each logged record to associate that update record with the current replica epoch value at the time the update record was logged. In FIGS. 12A-12D, the log sequence number is represented by the box in each record (e.g., $Rec_{1,0}$) under the italicized letter "E."

A third variable is a log sequence number, that tracks the relative sequence of each logged update record with respect to other logged update records. In FIGS. 12A-12D, the record epoch is represented by the box in each record (e.g., $Rec_{1,0}$) under the italicized letter "S." After a successful recovery, the sequence numbers are guaranteed to be the same for the logs on every replica member that is part of the currently available set of replica members. In particular, it must not be possible for two different update records that were applied by two different cluster instances to have the same update epoch.sequence number. Note that in addition to the update epoch number and log sequence number, each record also will typically (e.g., except for certain NULL data instances) contain the update data that describes the update.

The QRS algorithm will be described herein with reference to the general flow diagrams of FIGS. 13-24 and the above-described replica epoch, update epoch and sequence number variables. One part of the QRS algorithm is directed to handling replicas that are configured for cluster operation, but were unavailable for some reason, and then become available for operation. For example, having another replica member become available may cause a quorum of replica members to be achieved, (where there previously was less than a majority of members available), whereby updates then become possible. Another part of the QRS algorithm operates during a requested data update. Only when a majority of replica members have committed an update is an update reported as having been successful. Alternatively, reads and updates may be prevented from even being attempted if the QRS algorithm has detected that a majority of replica members are not available. In addition, an update attempt may fail because a replica member has failed, in which event a majority may no longer be available and further data updates need to be prevented.

Figure 13:
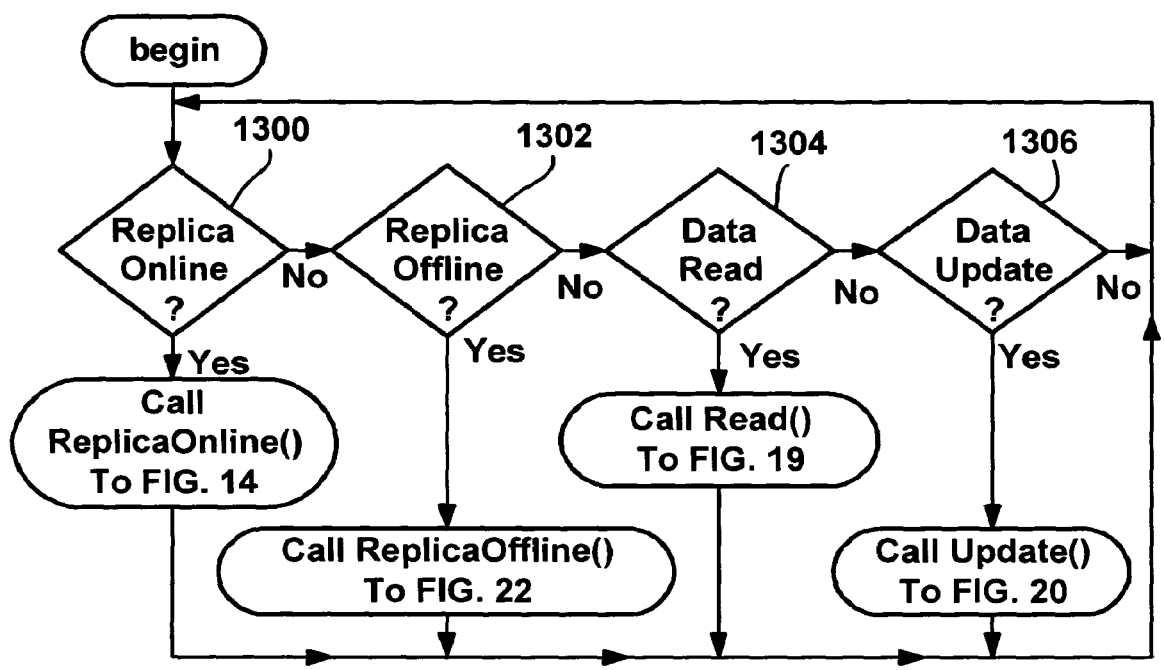
FIG. 13 is a flow diagram generally representing possible actions taken while a cluster is operating, including actions taken when replica members become available, fail, are read from or are updated.

FIG. 13 logically represents these related parts of the QRS algorithm. For example, as shown in FIG. 13, via step 1300, when a new replica member becomes available to the quorum replica set, a Replica Online process (beginning at FIG. 14) is executed. If instead a new replica member becomes unavailable to the quorum replica set, via step 1302, a Replica Offline process (FIG. 22) is executed. Alternatively, when a data read is being requested, step 1304 calls a read process to handle it, while when a data update is being requested, step 1306 calls an update process to handle the update request. Note that for simplicity, FIG. 13 shows a process looping forever to handle a replica member becoming available/unavailable or a data read/update. However, as can be readily appreciated, instead of executing such a loop, such detections are typically event driven in response to an appropriate event.

Figure 14:
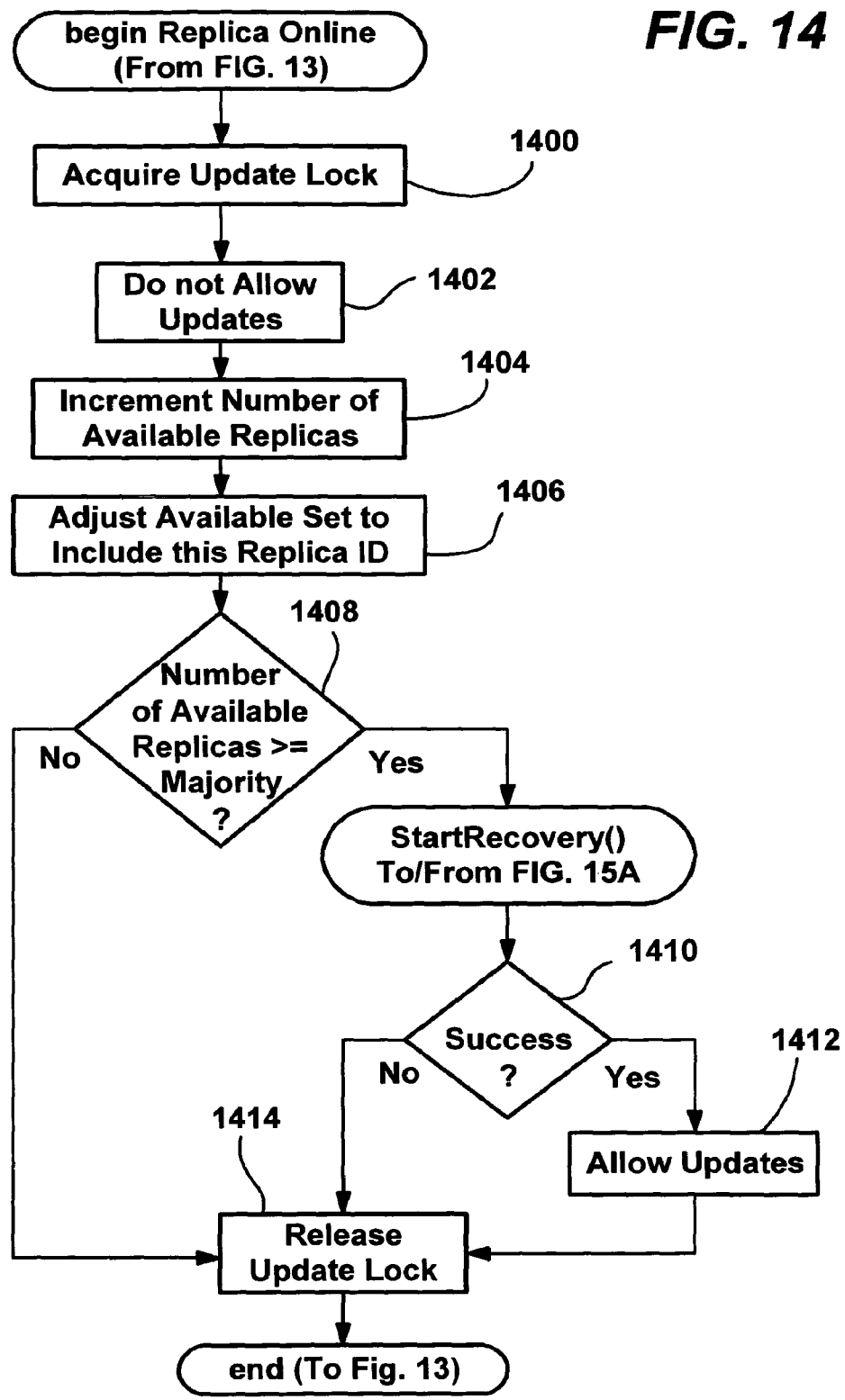
FIG. 14 is flow diagram generally representing steps taken by the quorum replica set algorithm when a replica member becomes available for operation in a quorum replica set in accordance with one aspect of the present invention.

FIG. 14 represents the QRS algorithm when a new replica member becomes available to the quorum replica set. As can be appreciated, this can be detected in many ways, such as by occasionally polling for a replica member, via plug-and-play type detection or via similar event notification. Note that FIG. 14 handles typical situations wherein the newly available replica member is already configured for operation in the cluster, (i.e., is already known to the cluster and thus one of the total possible), but was previously unavailable to the cluster nodes. For example, unavailability can happen if a replica member is disconnected for some reason, including inadvertently (e.g., accidentally unplugged) or intentionally (e.g., for maintenance) reasons, whereby FIG. 14 operates when such a replica member is reconnected.

Figure 20:
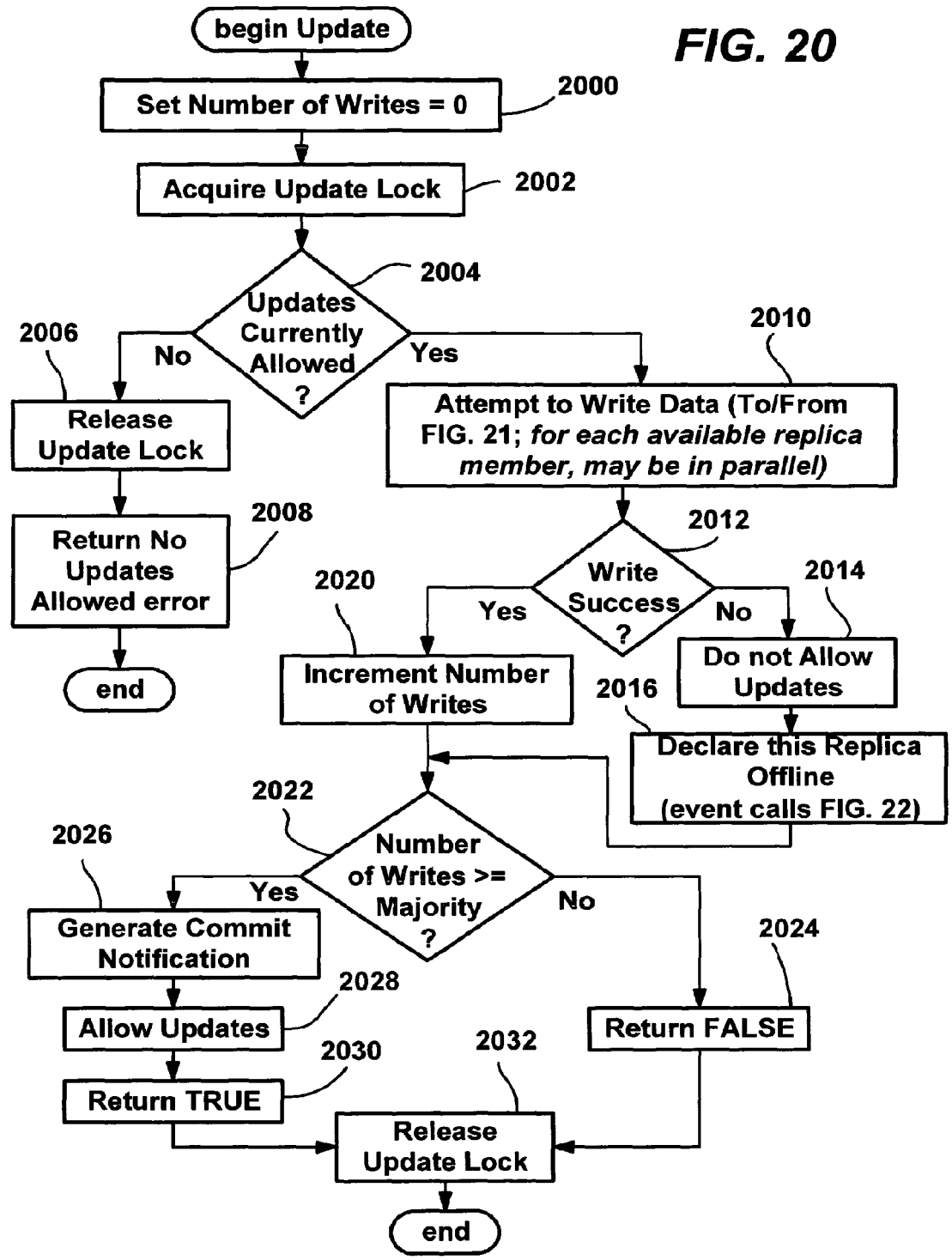
FIGS. 20 and 21 are flow diagrams generally representing steps taken by the quorum replica set algorithm to update replica members' logs in accordance with one aspect of the present invention.

FIG. 14 represents a replica becoming available, and begins at step 1400 wherein an update lock is acquired. The update lock prevents possibly conflicting processes that are running at the same time from changing global variables, e.g., the process of FIG. 14 may have to wait to acquire the lock if the update process of FIG. 20 is running (and thus possesses the update lock). Note that the update lock provides a simplified scheme for serializing updates and reads, however other, more sophisticated schemes may provide better performance, e.g., by enabling concurrent reads and/or concurrent writes to different data elements, and as such, these alternative schemes may be employed.

Step 1402 prevents updates from occurring during operation of the replica online process, such as by setting an update variable to FALSE. For example, as will be described below, the update process of FIG. 20 exits if updates are not allowed. Note that the replica online process of FIG. 14 will re-enable updates (at step 1412) if certain conditions, described below, are met.

Step 1404 increments a count of the number of available replicas, to reflect the detection of the newly-available replica that triggered operation of FIG. 14. Step 1406 adds an identifier of this replica to a set that maintains which replicas are currently available. Then, step 1408 represents the test for whether a quorum (e.g., majority) has been achieved based on the actual available count versus the number required for a majority, (which is known to the cluster nodes). If there is no majority, step 1408 branches ahead to step 1414 to release the update lock, after which the replica online process ends. Note that via the above-described step 1402, updates are precluded in this situation.

Figure 15A:
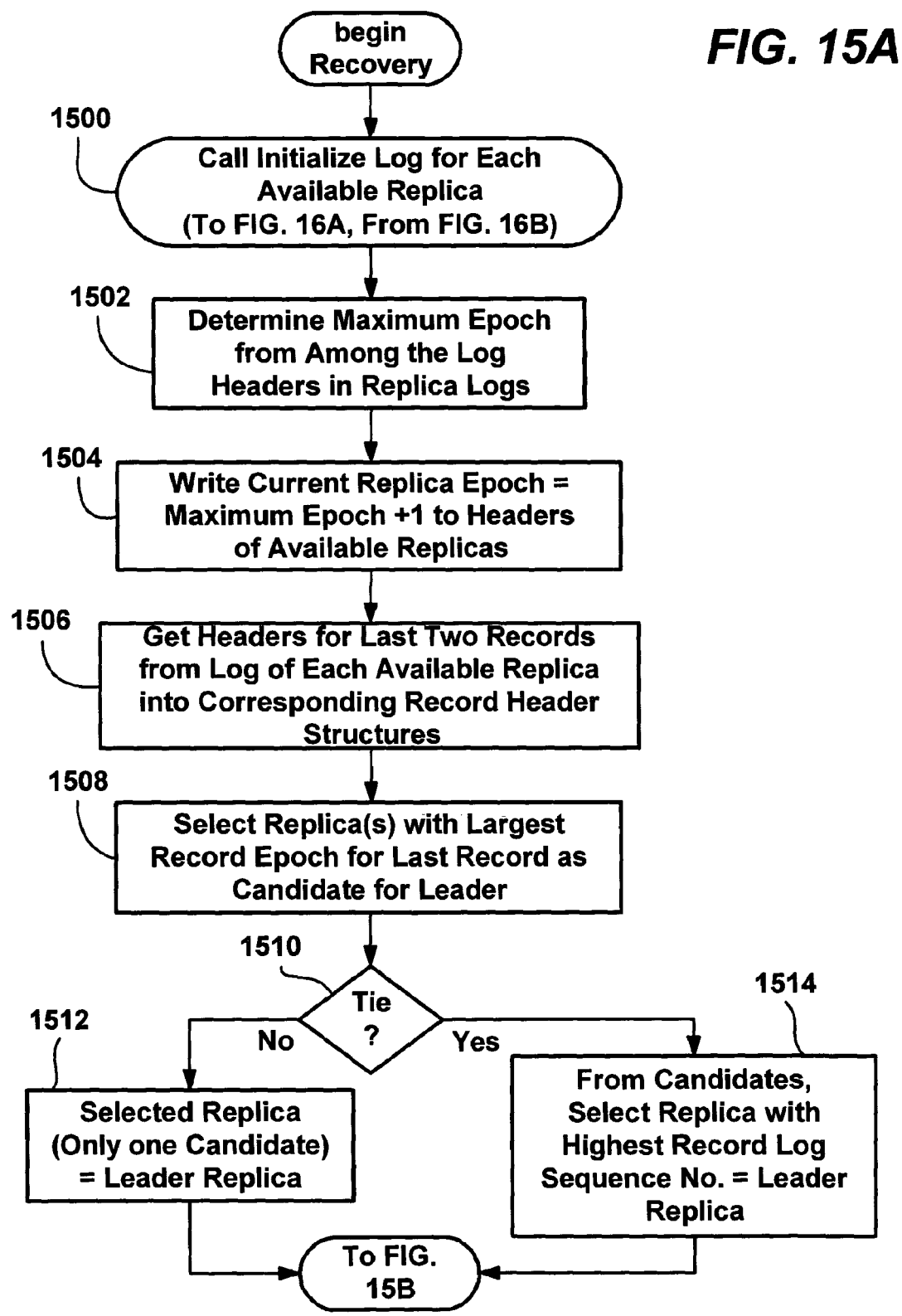

If however a majority of replicas are available (step 1408), then a recovery process is started, as generally represented via FIGS. 15A-15B. The recovery part of the QRS algorithm is thus executed when a majority of replica members are available from those that are configured for cluster operation. In general, the recovery process operates to make the replica members consistent with one another, so that possession by a node of any majority of replica members ensures that the latest changes are known to the cluster in any given quorum replica set. Note that although not shown in FIGS. 15A and 15B for purposes of simplicity, if an operation fails at an appropriate place, for example, a write to log, opening of a log, propagating a record to a log, or the like, recovery is aborted (via FIG. 18, described below) and a FALSE status is returned to FIG. 14 as the recovery status to indicate the lack of success. Further note that not shown in each possible instance, this inherent abort-on-failure situation (FIG. 18) applies when appropriate with respect to FIGS. 16 and 17, which are part of the recovery process.

Following recovery, step 1410 of FIG. 14 will test for success, and if success status is FALSE, regardless of where in the recovery process it was generated, step 1410 will prevent updates, essentially by bypassing step 1412 (which if executed would re-enable updates) and instead branching ahead to step 1414 to release the update lock. Step 1412 is thus only executed to re-enable updates if the recovery process was successful. Note, however, that it is alternatively feasible for a cluster to allow updates as long as a majority of replicas is still available, e.g., there is no reason to halt updates when a majority exists before a new replica member is detected but that new replica fails during recovery, as long as a majority still exists afterward. For simplicity, only successful operations will be described hereinafter in the recovery process, except as otherwise noted.

FIG. 15A begins by first calling an initialize process of FIG. 16 that initializes the above-described log of each available replica. More particularly, FIG. 16 tests whether a log-opened variable equals TRUE, indicating the replica is already initialized. If not initialized (the variable is set FALSE in FIG. 18 or FIG. 22 when a replica goes offline, as described below), indicating that the replica member is offline, initialization is attempted to make the replica member available.

If the replica is not already initialized at step 1600, then the log file is opened at step 1602. If the log is not new, then it is mounted via steps 1606, 1608 and 1610, by reading the log header (e.g., as a variable) into the owning node's local storage, verifying the validity of the log records (by evaluating checksums maintained with each record, or the like), and then setting a sequence number (e.g., as a variable) in the owning node's local storage equal to the sequence number of the last valid record in the log. Note that if the read at step 1606 fails, step 1607 aborts the recovery and takes this replica offline as described below with reference to FIG. 18. Further, note that if the read at step 1606 is successful, the log of each quorum replica set member is replayed via step 1608 during initialization, to ensure that the replica member's data is self-consistent. Any partially written records are discarded (undone). Following step 1610 (which also can have a read failure), the process then advances to step 1630 (entry Point 2) of FIG. 16B, which sets the "log-opened" variable to TRUE for this log. Step 1632 sets a recovery log header variable maintained in node local storage for this particular replica equal to the log header variable.

If the log was just created, then it is initialized via steps 1612, 1614 and 1616, including initializing its local replica epoch and sequence variables to zero, and writing the epoch data to the replica log header. The process then advances to step 1620 (entry Point 1) of FIG. 16B.

At step 1620 of FIG. 16B, a starter record is prepared for the log on the replica, with a record header epoch equal to the local log header epoch variable (initialized to zero), the local record header sequence equal to the log header sequence variable (initialized to zero), and NULL record data. Step 1622 attempts to write this record to the log. If the write fails, step 1624 calls the abort recovery process of FIG. 18, described below. If successful, the local log header sequence variable is incremented (for the next update). As described above, once the log for this replica member is initialized, the "log-opened" variable is set to TRUE for this log at step 1630, and step 1632 sets a recovery log header variable maintained in node local storage for this particular replica equal to the log header variable. The process then returns to step 1502 of FIG. 15A.

Figure 16A:
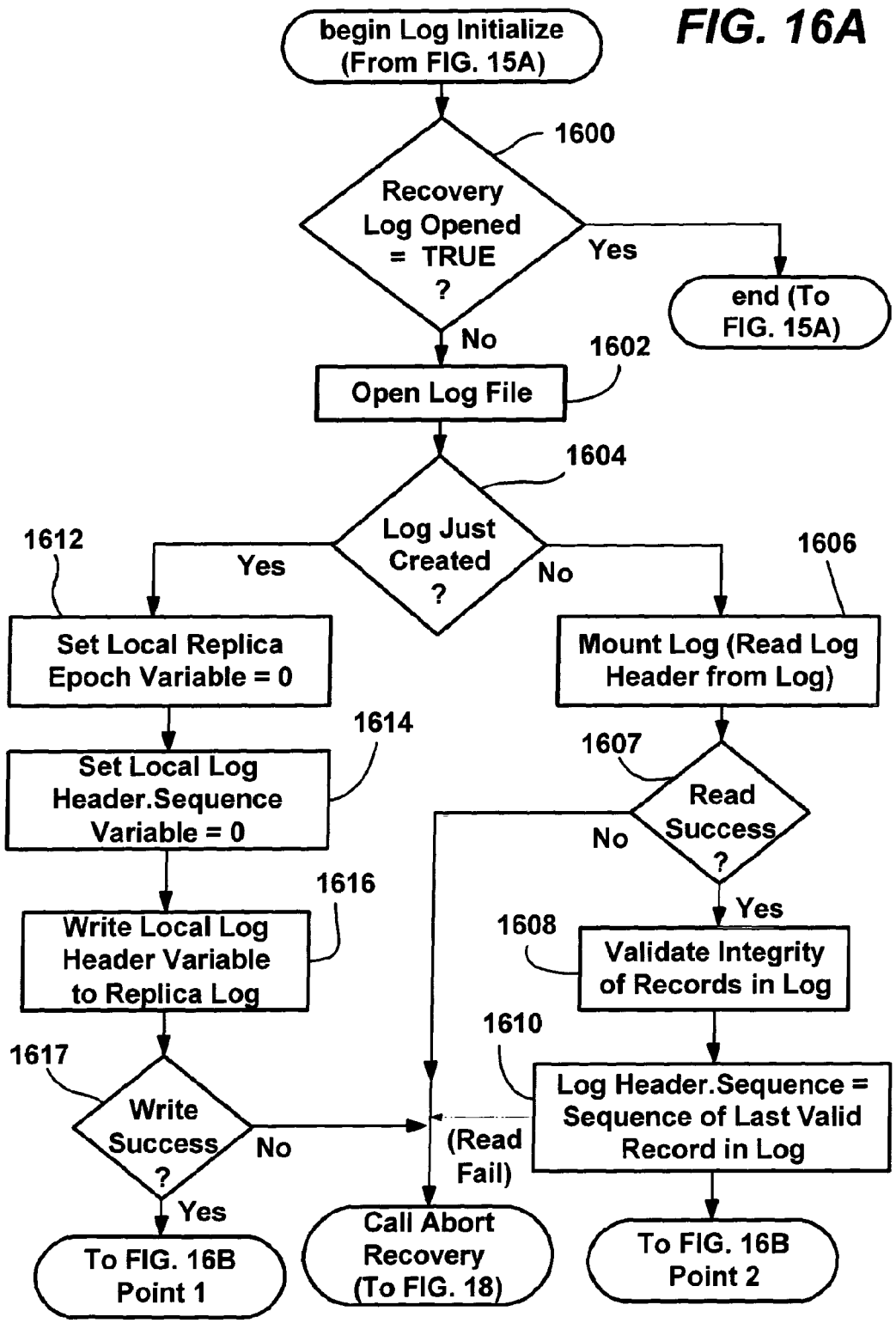

Step 1502 of FIG. 15A is thus executed following the various log initialization operations of FIGS. 16A-16B. Based upon the epoch numbers recorded in the header of each of the available replicas, a maximum epoch number is determined at step 1502. A current replica epoch is established by adding one to the maximum at step 1504, and the current replica epoch is written to the log headers on all the replicas in the availability set such that they are updated to the current replica epoch. Note that although not specifically shown, a write failure results in the abort recovery process of FIG. 18 being executed.

Step 1506 represents the reading of the last two valid records (one record if only one record exists, e.g., the starter record) from the log of each available replica. Again, although not specifically shown, a read failure results in the abort recovery process of FIG. 18 being executed.

At step 1508, from among the replicas, the replica (or replicas) having a last record with the highest update epoch number is chosen as a candidate for leader. If at step 1510 only one replica has the highest epoch number in its last record, there is only one candidate for the leader replica, and it is selected as the leader at step 1512. In the event of a tie in record epochs, at step 1514, a leader is selected from the leader candidates based on the highest log sequence number in its last record. In other words, the leader is a replica member having in its last record an epoch.sequence number greater than or equal the maximum epoch.sequence number of the last record on the available replicas. Note that if two or more candidates replicas have the same sequence number, any one of those can serve as the leader replica since each have the same last record, however another tiebreaker may be used based on some other criteria if desired. For example, if an epoch.sequence tie exists, the replica with the log having the lowest log identifier becomes the leader replica. Further, if all available replicas each the same epoch and sequence number for their respective last record, then no propagation of records (FIG. 15B) is needed, and these steps can be avoided. In the present example, for purposes of explanation, it is assumed that this is not the situation at this time.

Once a leader replica is selected, the recovery process continues to FIG. 15B, to propagate any needed records from the leader to other replicas. At step 1520, the last record in the replica log of the leader replica is retagged with the current replica epoch.

Step 1522 selects a replica that is not the leader for updating. Based on the last two records therein (previously read via step 1502), the records that are needed to update that non-leader replica relative to the leader replica are determined at step 1524. These records, referred to as the set of records to update, or recordset, will be propagated to the selected non-leader replica via the process of FIG. 17. In other words, the necessary records from the leader replica (greater than or equal to the Epoch.Sequence of the second last record on a non-leader replica) are propagated from the leader replica to the other replicas.

During the propagation, the last two records on the non-leader replicas need to be examined with respect to the records being propagated by the leader replica, because the last record may correspond to an update that was made to this replica but that was not committed to a majority of the replicas and now conflicts with an update committed in a later epoch, while the second last record may have been retagged in a previous unsuccessful recovery session. This part of the QRS algorithm, shown in FIG. 17, essentially determines whether to discard or retag the records in the selected non-leader replica by comparing the first two records in the recordset sent by the leader replica against the last two records on that selected non-leader replica. Thereafter, any remaining records in the recordset sent by the leader replica are applied to the selected non-leader replica to make it consistent.

More particularly, step 1700 of FIG. 17 first tests whether there is any second to last record on the selected non-leader replica. If not, step 1700 branches to step 1702 where the last record is evaluated (at least the starter record will exist) against the first record in the set of propagated records. If the records are not the same, at step 1704 the last record in the non-leader is replaced (atomically) with the first record in the propagated recordset from the leader. At step 1706, the remaining records in the recordset propagated from the leader replica are applied, whereby this selected non-leader replica is consistent. Although not specifically shown, as mentioned above, if any read or write failures occur, the recovery process is aborted via FIG. 18, described below.

If instead step 1700 determines that the second to last record on the selected non-leader replica exists, then step 1700 branches to step 1710 where the second to last record in the selected non-leader replica is evaluated against the first record of the leader's propagated recordset. If the same, step 1710 branches to step 1712 to evaluate the last record of the selected non-leader replica against the second record of the leader's propagated recordset. If these are not the same, then the last record of the non-leader replica is atomically replaced by the second record of the leader's propagated recordset at step 1714. Any remaining propagated records are then applied via step 1716. If instead step 1712 determines that the epoch and sequence for the records match, step 1712 branches to step 1718 wherein any remaining propagated records are then applied.

Returning to step 1710, if the second to last record in the selected non-leader replica is not the same as the first record of the leader's propagated recordset, step 1710 branches to step 1720 where the last record of the non-leader replica is discarded. Step 1722 then replaces the second to last record of the non-leader replica with the first record in the leader's propagated recordset, and then step 1724 applies any remaining propagated records from the leader's propagated record-set to the selected non-leader replica.

The process of FIG. 17 ultimately returns to step 1526 of FIG. 15B, such as to determine whether another non-leader replica needs to be updated. If so, step 1528 selects that non-leader replica as the selected non-leader replica, and the process of FIG. 17 is similarly executed therefor. Note that steps 1522 to 1528 are generally represented as showing the propagation of the leader's records to each of the non-leader replicas to one non-leader replica at a time. However, as can be readily appreciated, some or all of these propagation-related steps may be performed to multiple non-leader replicas in parallel.

When the non-leader replicas have been made consistent with the leader replica, step 1530 is performed to report (generate the commit notifications for) the successful committing of the last record transmitted from the leader replica. For efficiency, such commit notifications only have to be generated for records propagated since the last recovery.

At this time, recovery is complete, and step 1532 returns to step 1410 of FIG. 14 where the success of the recovery process is evaluated. If successful, step 1412 is executed to allow updates, and the replica online (including recovery) process completes by releasing the update lock (step 1414).

Figure 18:
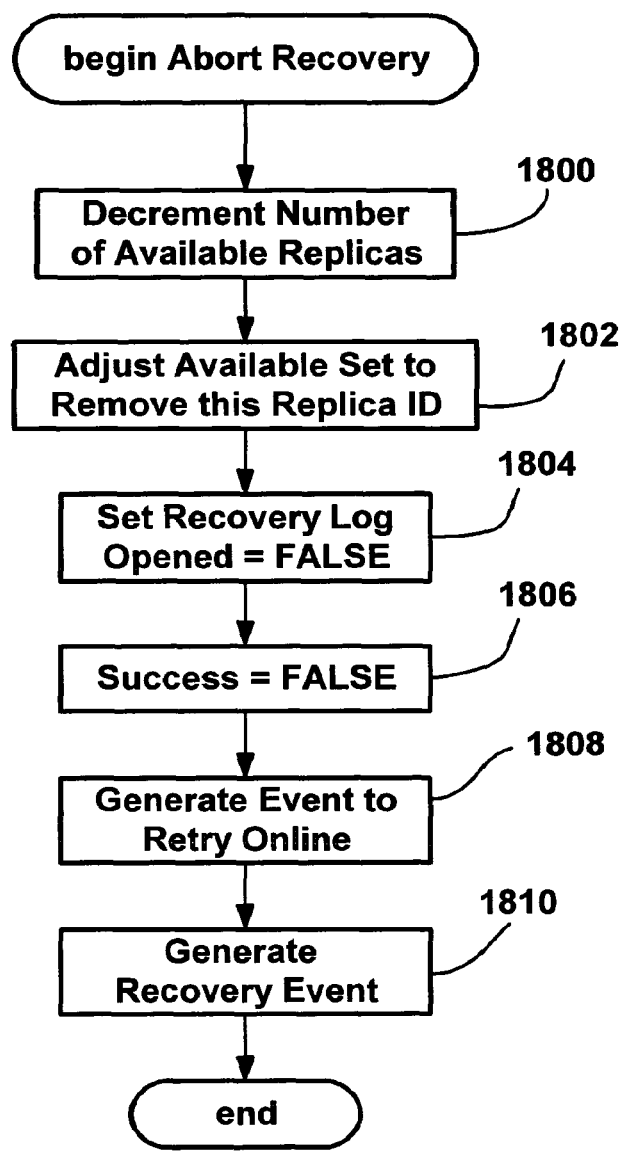
FIG. 18 is flow diagram generally representing steps taken by the quorum replica set algorithm when a replica member becomes unavailable for operation during the recovery process in accordance with one aspect of the present invention.

As mentioned above, if any read or write failure to a replica occurs during the recovery process, the abort recovery process of FIG. 18 is called with the identity of that replica. This function is called with the replica id of the bad replica if the recovery process fails. Note that the update lock is held when this function is invoked. At step 1800, a count of the number of available replicas is decremented, and step 1802 removes the identifier of this replica from the set that tracks which replicas are currently available, to reflect that this replica is no longer available. Step 1804 forces the log to be initialized again when the replica subsequently comes online by setting the "log opened" variable to FALSE for this replica. As described above, this variable is evaluated at step 1600 of FIG. 16, prior to initialization. A variable indicative of success (evaluated at step 1410 of FIG. 14) may also be set at step 1806 to indicate that recovery failed. Step 1808 then generates an event that will ordinarily cause other processes in the system to try and get this replica member online again, check for its integrity, and so forth. Step 1810 generates another event, a recovery event, which will restart recovery if a majority of replica members is present. Generating this recovery event guarantees that if this replica does not recover or come online, the recovery process will be retried again as long as majority of replicas exists. Note that it is alternatively feasible to have FIG. 18 test for whether a majority of replica members is consistent, and if so, to not consider the recovery to have completely failed (which requires a restart of the recovery process.

Figure 19:
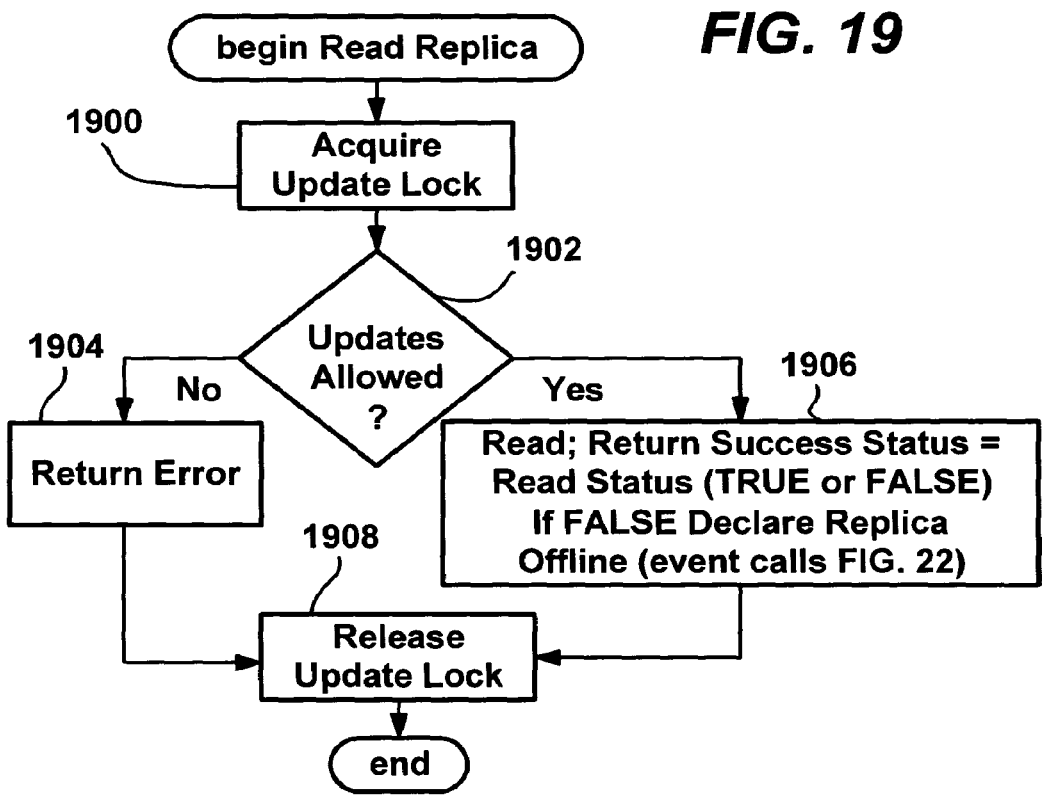
FIG. 19 is flow diagram generally representing steps taken by the quorum replica set algorithm to read a replica member's log in accordance with one aspect of the present invention.

FIG. 19 represents a replica record read operation (of one replica member) consistent with the QRS algorithm. Note that this is a replica read in ordinary operation, i.e., not during the replica online/recovery process. If one-copy serializability is desired (a property which guarantees that concurrent execution of transactions on replicated data is equivalent to a serial execution on non-replicated data), such reads are not allowed until a majority of replicas is available.

In FIG. 19, read operations acquire the update lock at step 1900, and prevent read operations at any time that updates are not allowed via step 1902. An attempt to read while updates are not allowed is considered an error via step 1904. If the read attempt is allowed, step 1906 attempts to read the requested recordset and returns a status value equal to the success or failure of the read attempt. Note that if a read failure occurred, this replica is taken offline as described below with respect to FIG. 22, and this read can be retried on another member if a quorum still exists. Before returning to the process that requested the read, the read operation releases the update lock at step 1908. FIG. 20 represents a replica update (write) request handled in conjunction with the QRS algorithm and its properties. At step 2000, a counter that tracks the number of successful writes is initialized to zero, and at step 2002, the update lock is acquired as described above. Step 2004 then tests whether updates are currently allowed. As described above, updates are not allowed unless a quorum of consistent replica members is available. If not allowed, step 2004 branches to step 2006 where the update lock is released, and an error is returned via step 2008.

Figure 21:
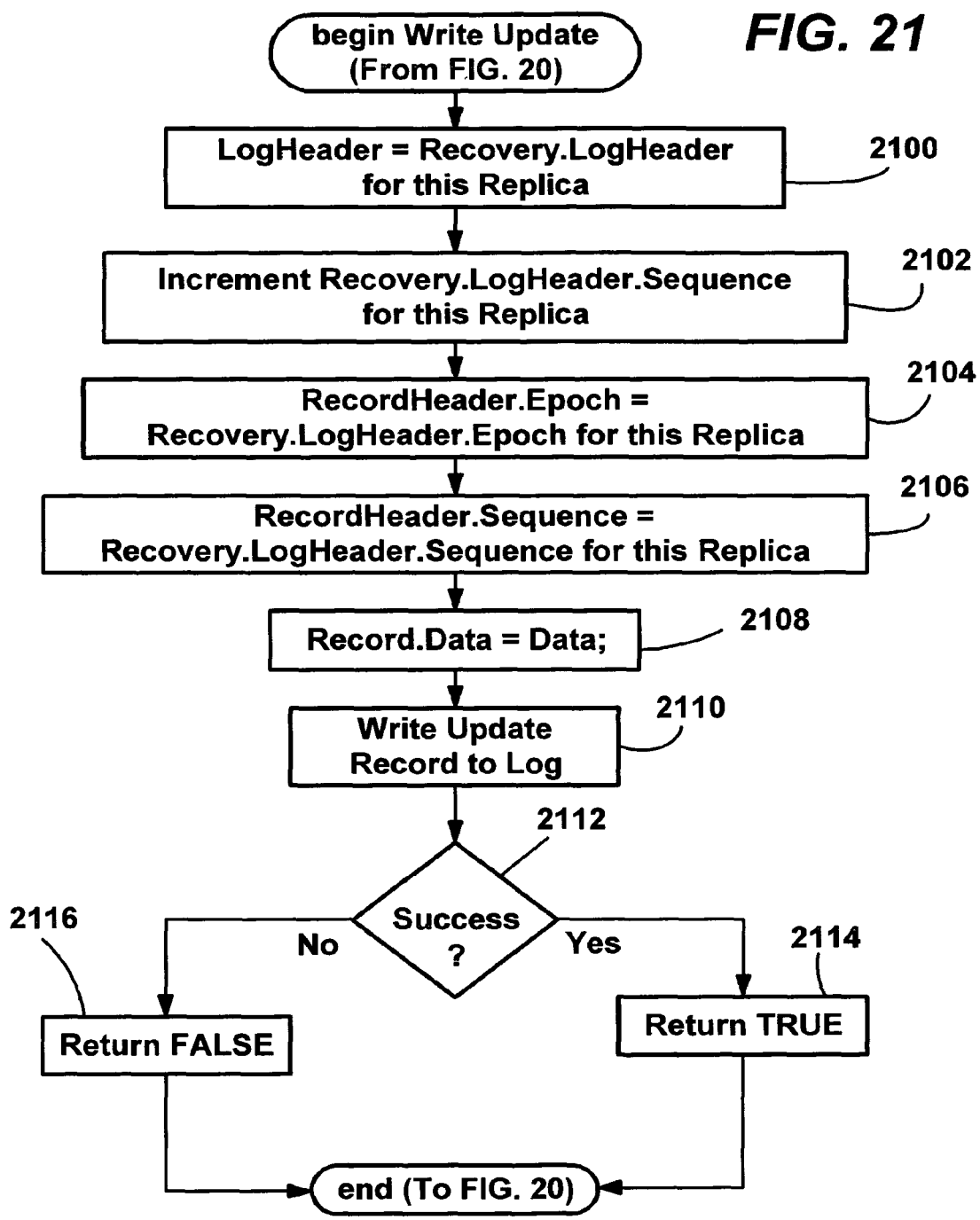

If updates are allowed, step 2004 instead branches to step 2010 wherein an attempt to make the update is made, e.g., a data write attempt, to each available replica member. FIG. 21 represents the actions taken on each replica member in the write update attempt. Note that the write attempts may be made in parallel.

At step 2100 of FIG. 21, the log header variable of the replica member is set to equal the recovery log header variable for this replica (consistent with step 1632 described above), and the sequence number variable is increased at step 2102. To build the update record, the epoch number for the record is set to equal the epoch number stored in the local node's log header for this recovery epoch, as described above. Similarly, the sequence number for the record is set to equal the just-incremented sequence number stored in the log header. Lastly, the record's data field is set to include the data that is to be written at step 2108. Note that any checksums or the like can be calculated and added to the record at this time. When ready, an attempt to write the record is made at step 2110.

Step 2112 evaluates whether the write was successful. Note that although not shown, any writes to the replica member are not to be cached but instead written through to the disk. If the record is successfully written (and flushed) to the disk, a TRUE status is returned (to step 2012 of FIG. 20) as the status of the operation. If either the write (or any flush operation) was not successful, then FALSE is returned (to step 2012 of FIG. 20) as the status.

Steps 2012 through 2020 of FIG. 20 work with the returned write status from each replica, and thus are executed for each of the replicas. Step 2012 evaluates the write status for a given replica. If not successful, updates (to any replica) are prevented via step 2014, and the particular replica on which the write failed is declared offline at step 2016, e.g., by generating an offline event or the like that will cause the offline process of FIG. 22 to be called. The process for handling an offline replica is described below with respect to FIG. 22, however at this time it should be pointed out that among other things, when a replica goes offline, the offline handling process re-enables updates if a majority of replicas are still available. For a write that was successful, the write counter is incremented at step 2020.

When a write status has been returned from FIG. 21 for each replica, step 2022 compares the number of successful writes in the counter against the majority number that is required for a quorum. If a majority was not successfully written, then a FALSE status is returned as the update status via step 2024 to the process that requested the update. Note that when step 2024 is executed, updates are not allowed (via step 2014. The update lock is released via step 2032.

If instead at step 2022 a majority was successfully written, step 2026 is executed which reports that this record was successfully committed. Step 2028 re-enables further updates since a majority of writes were known to be successful. A TRUE is returned via step 2030, and the update lock is released via step 2032.

Figure 22:
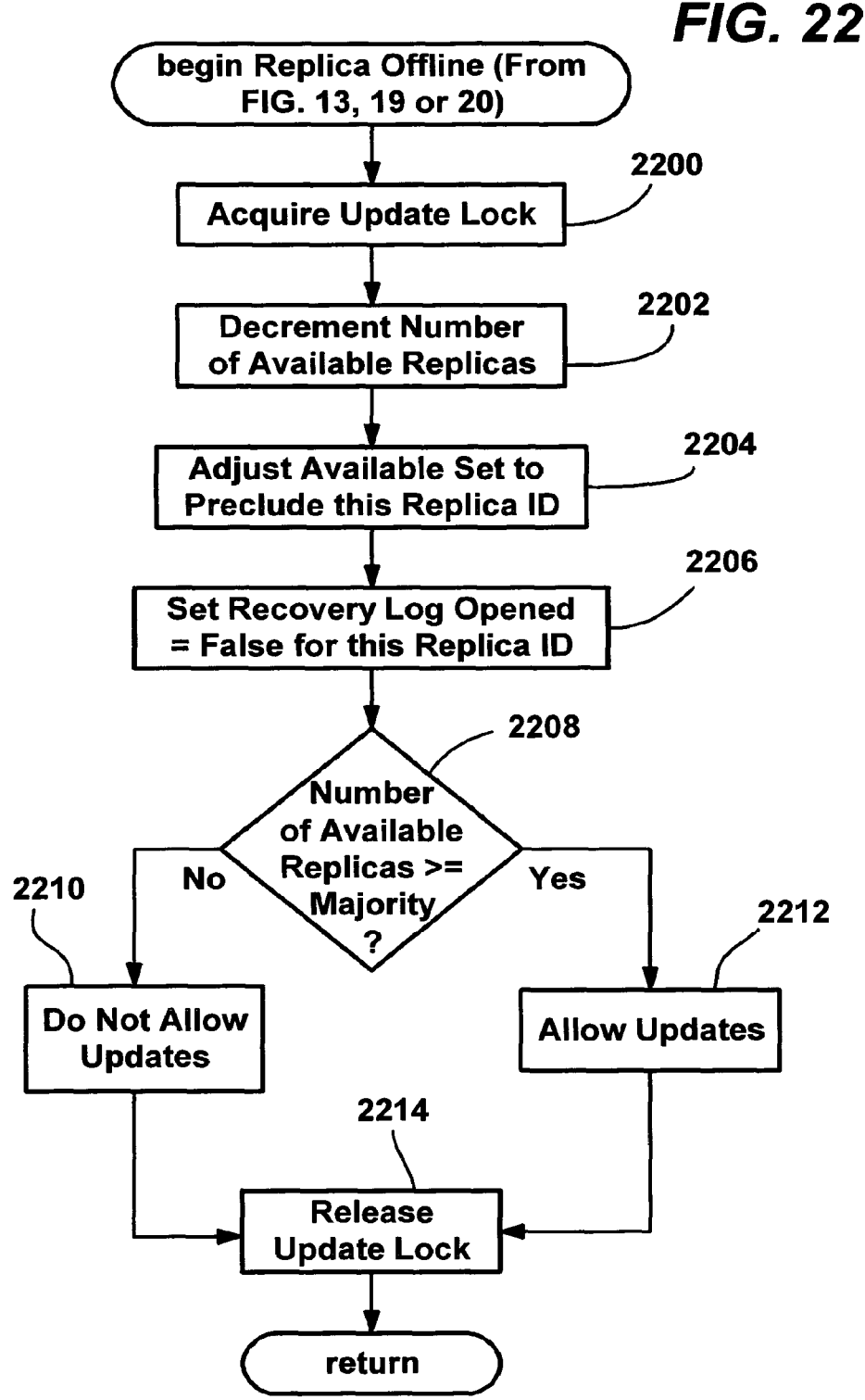
FIG. 22 is flow diagram generally representing steps taken by the quorum replica set algorithm when a replica member becomes unavailable for operation in a quorum replica set in accordance with one aspect of the present invention.

FIG. 22 represents the offline process executed when a replica has become unavailable. Note that the described offline process is executed for each unavailable replica rather than handling multiple unavailable replicas at once, although such a process is feasible. Further, note that as described above, a replica can be declared unavailable because of a failed write via step 2016, or a failed replica member can be detected in some other manner (e.g., via a failed read, as described above). In any event, the offline process begins at step 2200 wherein the update lock is acquired to prevent possibly conflicting processes running at the same time from changing global variables.

Step 2202 decrements a count of the number of available replicas, and step 2204 removes the identifier of this replica from the set that tracks which replicas are currently available, to reflect that this replica is no longer available. Note that steps 2202 and 2204 are essentially counter to the steps 1404 and 1406 that are described above for when a replica becomes available. Step 2206 forces the log variable in the recovery structure to be initialized again when the replica subsequently comes online by setting a variable or the like for this replica. As described above, this variable is evaluated at step 1600 of FIG. 16, prior to initialization.

Step 2208 represents the test for whether a quorum (e.g., majority) still exist based on the count that remains versus the number required for a majority. If there is not a majority, step 2208 branches to step 2210 to disable updates. If there is a majority, step 2208 instead branches to step 2212 to allow updates. After either step, the offline process continues to step 2214 to release the update lock, after which the replica offline process ends.

Figure 12A:
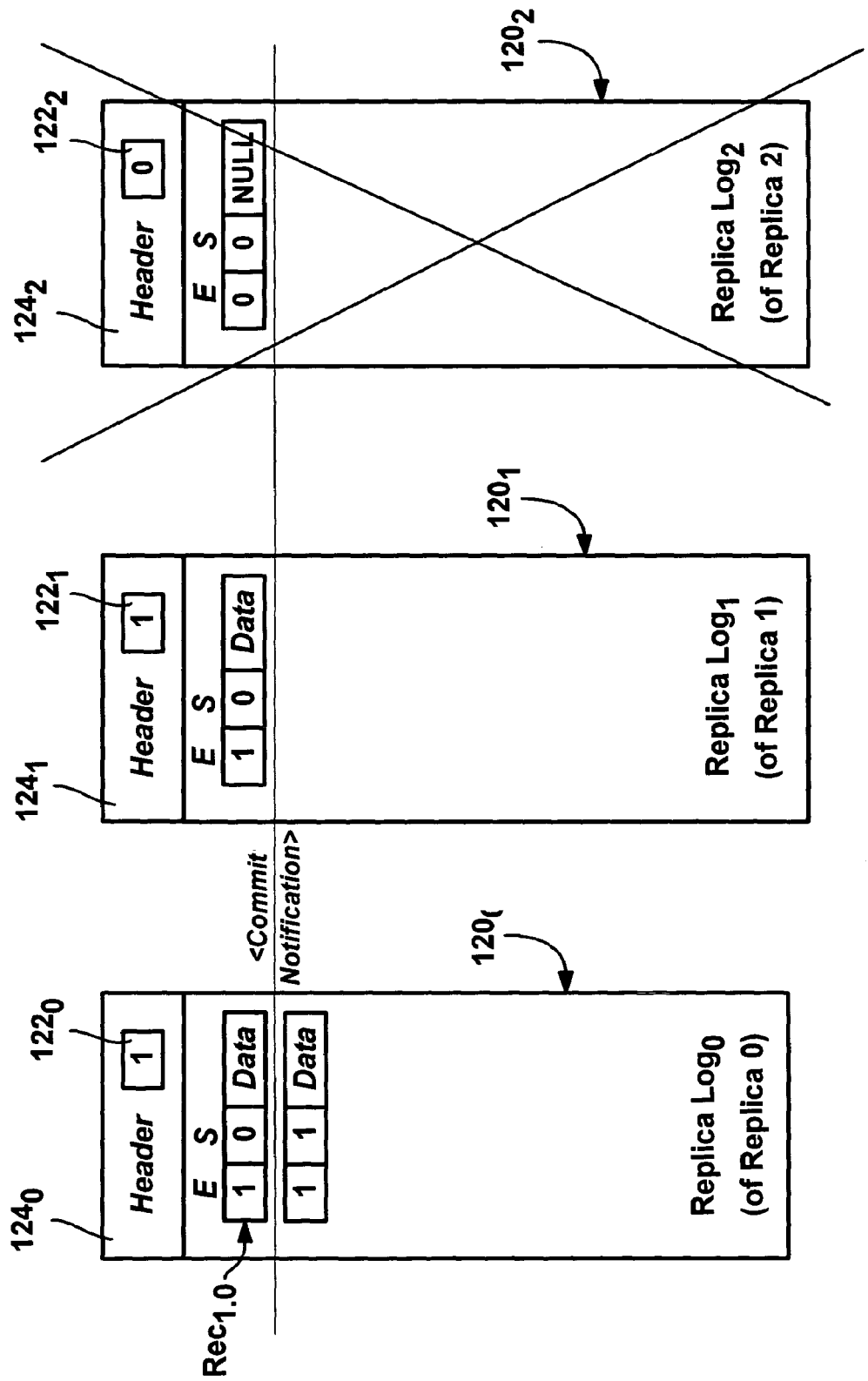
FIGS. 12A-12D are block diagrams representing changes to logs of quorum replica set members over time, including examples of how the quorum replica set algorithm ensures consistency of replica members in accordance with one aspect of the present invention.

Returning to FIGS. 12A-12D, an example will now be provided of the general operation of the QRS algorithm as described above. In FIG. 12A, two replica members (0, 1) are available from a configured set of three replica members (0, 1, 2), wherein the logs $120_0$-$120_2$, replica epochs $122_0$-$122_2$ and headers $124_0$-$124_2$ of each have the replica member number as a subscript. Note that in FIGS. 12A-12D, the large diagonally crossed lines indicate the unavailability of whichever replica member is crossed-out.

In FIG. 12A, the current replica epochs $122_0$ and $122_1$ in respective headers $124_0$ and $124_1$ are both at 1. As also shown in FIG. 12A, update 1.0 has been logged in both replica logs $120_0$ and $120_1$, and thus this update is considered successfully committed. Update 1.1 has not been committed to a majority, and thus is not reported as being successfully committed. In the present example, at this time, assume that the node controlling the replica members dies or shuts down unexpectedly, whereby the update 1.1 is not recorded to a majority of replicas and is thus not reported as having successfully committed.

Figure 12B:
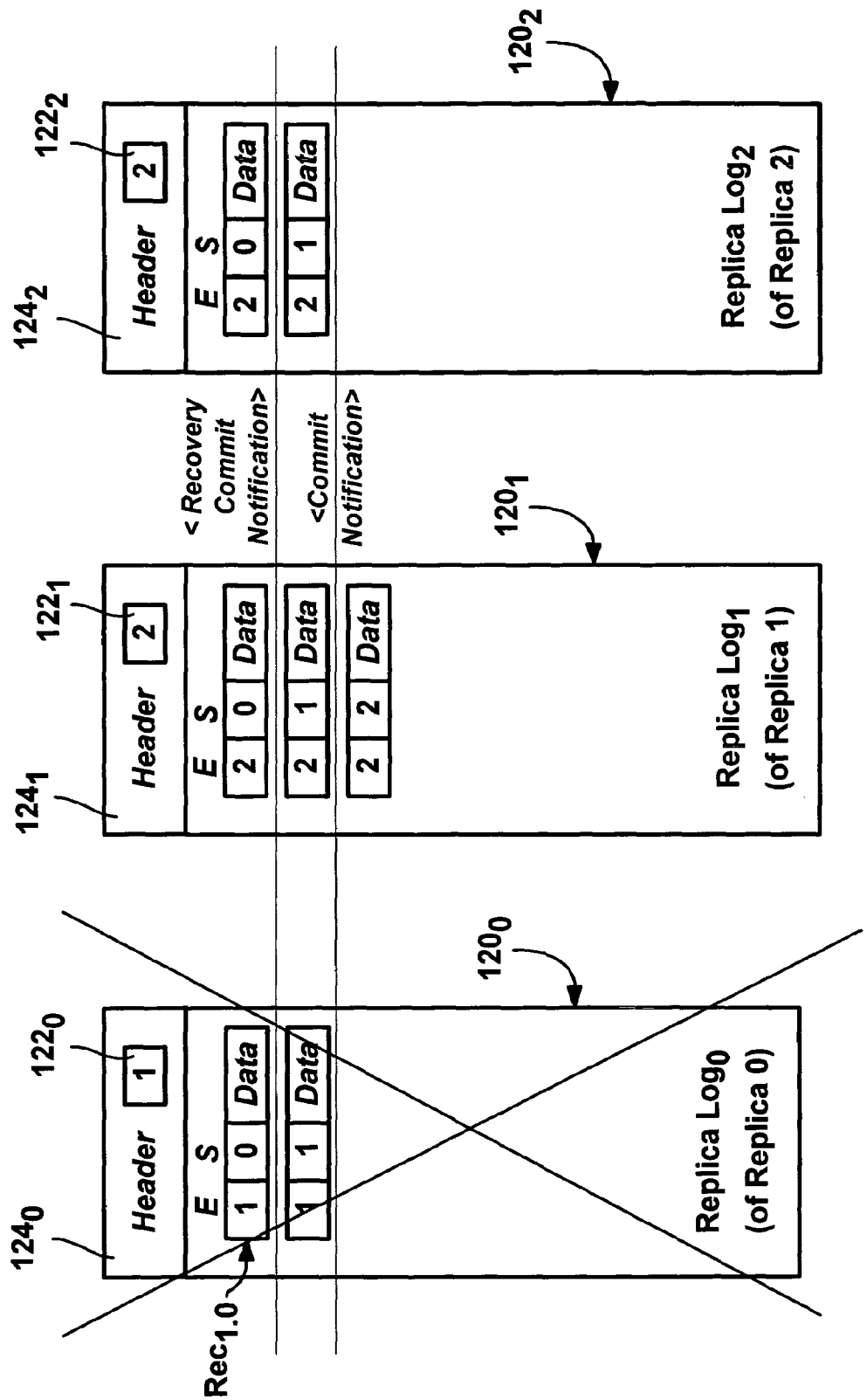

FIG. 12B represents the next replica epoch, wherein replica members 1 and 2 are now available to provide the majority. In FIG. 12B, replica members 1 and 2 and have their replica epochs $122_1$ and $122_2$ in respective headers $124_1$ and $124_1$ both set to 2, since the largest previous epoch number (as shown in FIG. 12A) in any record was 1. In addition, as described above, replica 1 is chosen as the leader replica, since prior to recovery, replica 1 had a record therein with a record epoch equal to 1, whereas replica 2 had only the starter record. As also shown in the changes from FIG. 12A to FIG. 12B, during recovery, the record of replica 1 (1.0 in FIG. 12A) is retagged to 2.0, and this record is propagated to replica member 2. The starter record is replaced as described above with respect to FIG. 17, after which the recovery process considers the update successful.

As also represented in FIG. 12B, while later operating, replica members 1 and 2 both commit a record, record 2.1, to their respective logs $120_1$ and $120_2$. Because this record was successfully written (flushed) to a majority of total configured members, the update is considered successful, as described above with respect to FIGS. 20 and 21. Still later an update record 2.2 is written to replica member 1 but not to replica member 2, as in this example, the node owning and controlling the replica member dies or shuts down unexpectedly. Again, since this update was not recorded to a majority, the change corresponding to this update record is not acknowledged as having been committed.

Figure 12C:
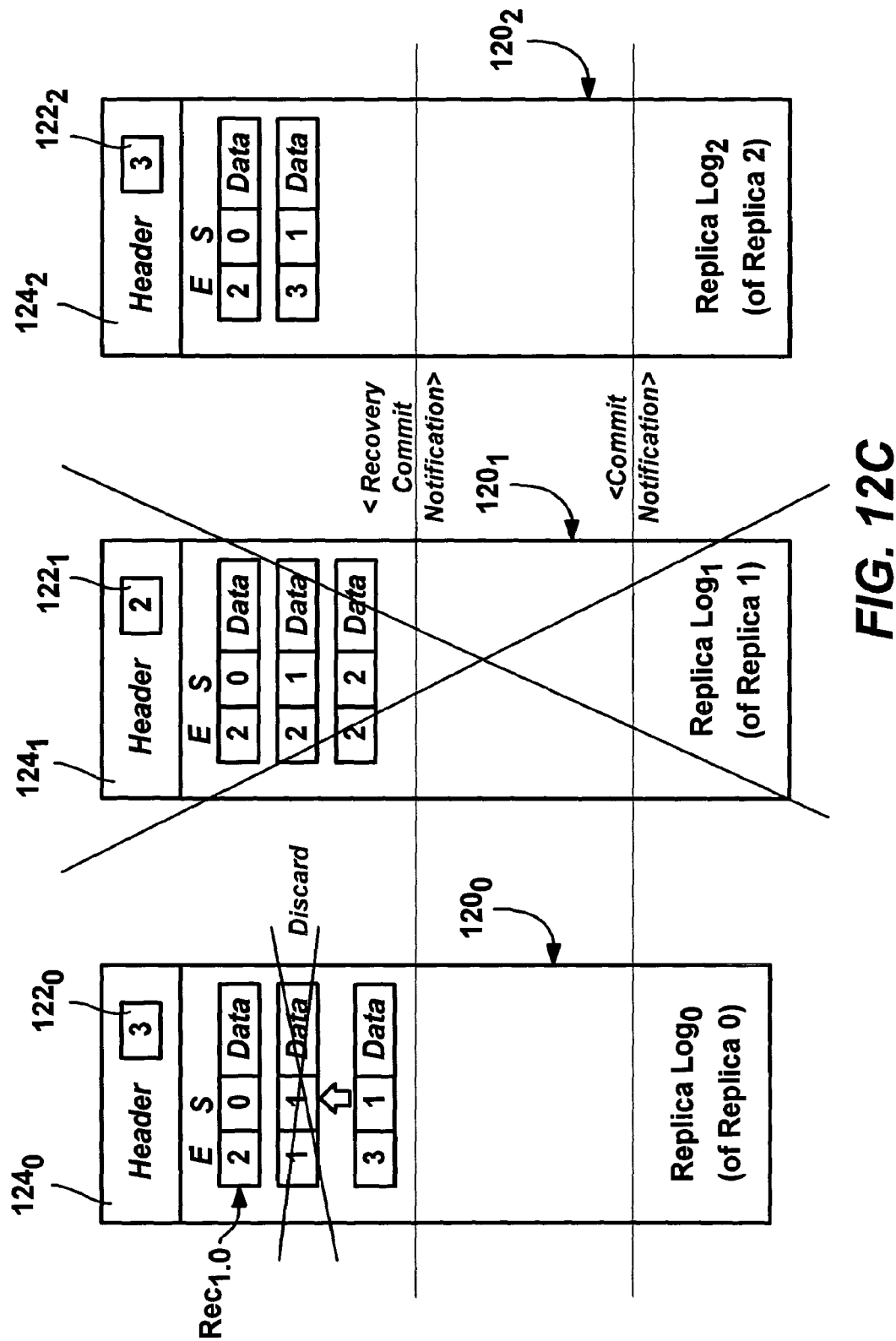

Sometime later, as generally represented in FIG. 12C, replica member 0 comes online, whereby the replica majority is achieved via members 0 and 2, and recovery is initiated via the online process as described above. In this next replica epoch, replica 0 and 2 have their replica epochs $122_0$ and $122_2$ in respective headers $124_0$ and $124_0$ both set to 3, since the largest previous epoch number in any record (record 2.1 in replica 2) was 2 (as apparent from FIG. 12B). In addition, as described above, replica 2 becomes the leader, since it had the record therein with a record epoch equal to 2, whereas replica 0's largest record epoch number was a 1. As also shown in the changes from FIG. 12B to FIG. 12C, during recovery, the record 1.1 of replica 0 is discarded, because this last record was determined (via FIG. 17, described above) to have not been committed to the quorum replica set prior to propagated (retagged) record 3.1 of replica 2 having been committed. Replica record 3.1 thus overwrites this record in the log $120_0$, and the recovery process reports the update as being successfully committed. In the example, replica member 0 then goes offline without any other updates having occurred.

Figure 12D:
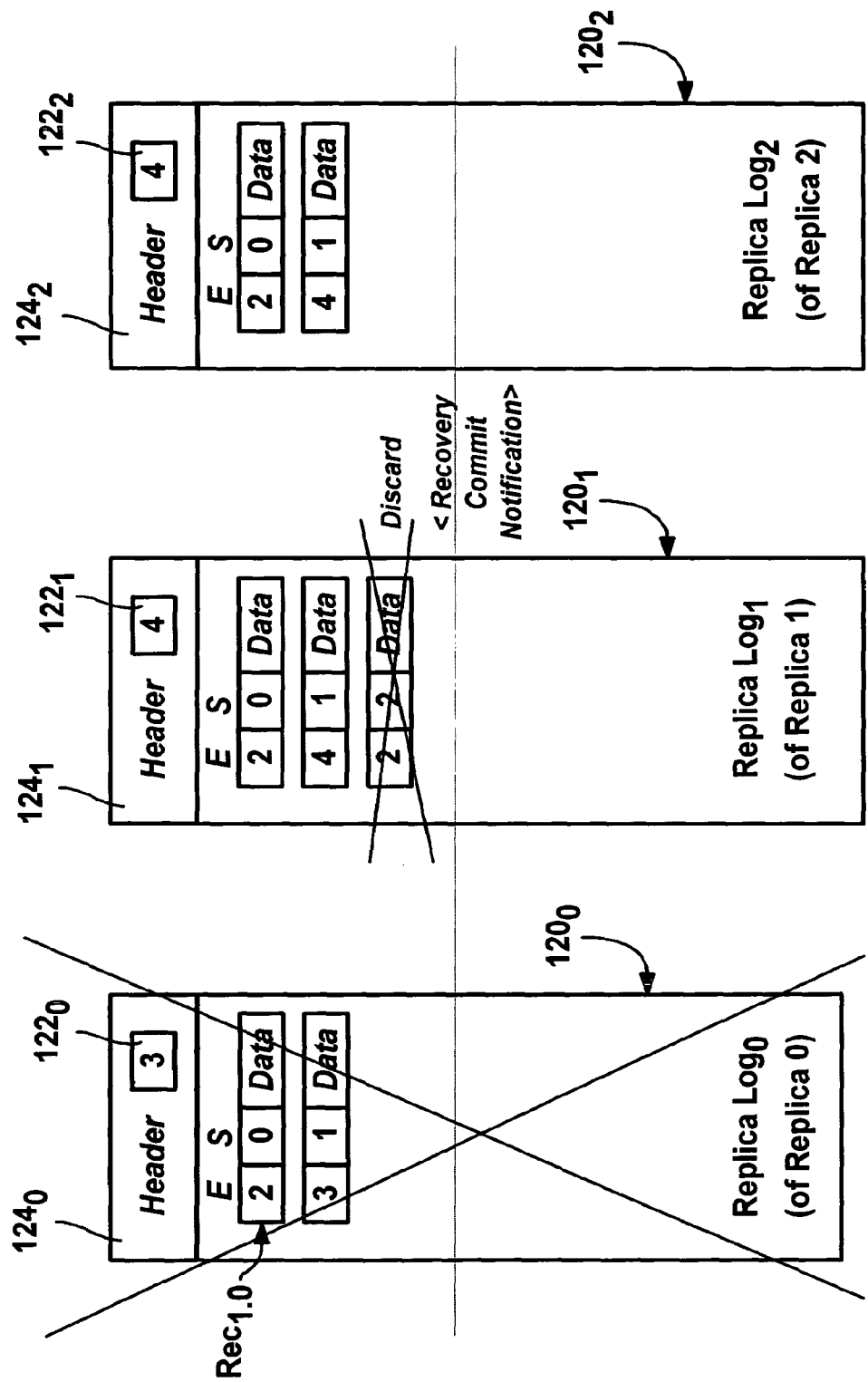

In the last part of the example, generally represented in FIG. 12D, replica member 1 comes online, whereby the replica quorum is now achieved via members 1 and 2, and recovery is initiated. In this next replica epoch, replica 1 and 2 have their replica epochs $122_1$ and $122_2$ both set to 4, since the recovery process determines that the largest previous epoch number in any record was 3. In keeping with the present invention, replica 2 is chosen as the leader, since it had the record therein with a record epoch equal to 3, whereas replica 1's largest record epoch number was a 2. As also shown in FIG. 12D, during recovery, the second-to-last record 2.1 of replica 1 is kept and retagged to 4.1, while the last record, 2.2, is discarded as being not having been committed prior to a subsequent record having been committed. As can be readily appreciated, regardless of which replica fails and/or when it fails, the QRS algorithm ensures that no record which is successfully committed is ever lost. At the same time, the QRS algorithm ensures that records that were not committed to a majority are not kept if a subsequent update was committed first. Lastly, reports of successfully committed updates (commit notifications) are generated in the same order in which the updates occur.

The above description and accompanying examples are directed to handling replica members becoming available or unavailable when the total configured replica set is constant. However, the QRS algorithm can also handle the situation wherein new, previously unknown replica members are added to the total configured replica set, or when previously configured members are removed from the total configured replica set.

As can be readily appreciated, changing the number of replica members in the total configured replica set changes the majority requirement, which if done incorrectly could cause a significant problem. When adding replica members, care must be taken to ensure that in the event of a cluster or replica member failure during the addition process, a subsequent majority cannot be allowed without at least one member present from the prior epoch. For example, it cannot be possible to change from a two of three requirement to a three of five requirement prior to making the new replicas consistent, otherwise data could be lost. By way of example, if a first quorum set is operating with only replica members A and B available out of a total configured replica set of A, B and C, replica member C is inconsistent. If new replica members D and E are then added, and the majority requirement becomes three of five, forming a new cluster with only replica members C, D and E cannot be allowed, unless at least one of C, D and E are first updated to include A and B's data.

Also, when adding a replica member and thus changing the majority requirement, the change needs to be done such that a majority can later be achieved regardless of failures. For example, if only two replicas (A, B) are available out of three replicas (A, B and C) configured, and the number of the total configured replica set is increased to four by the addition of replica member D, then three replicas will be needed for a majority. If however, after increasing the majority requirement the cluster and the replica D fail while making D consistent, then only A and B may be available, which will not achieve a quorum.

Figure 23:
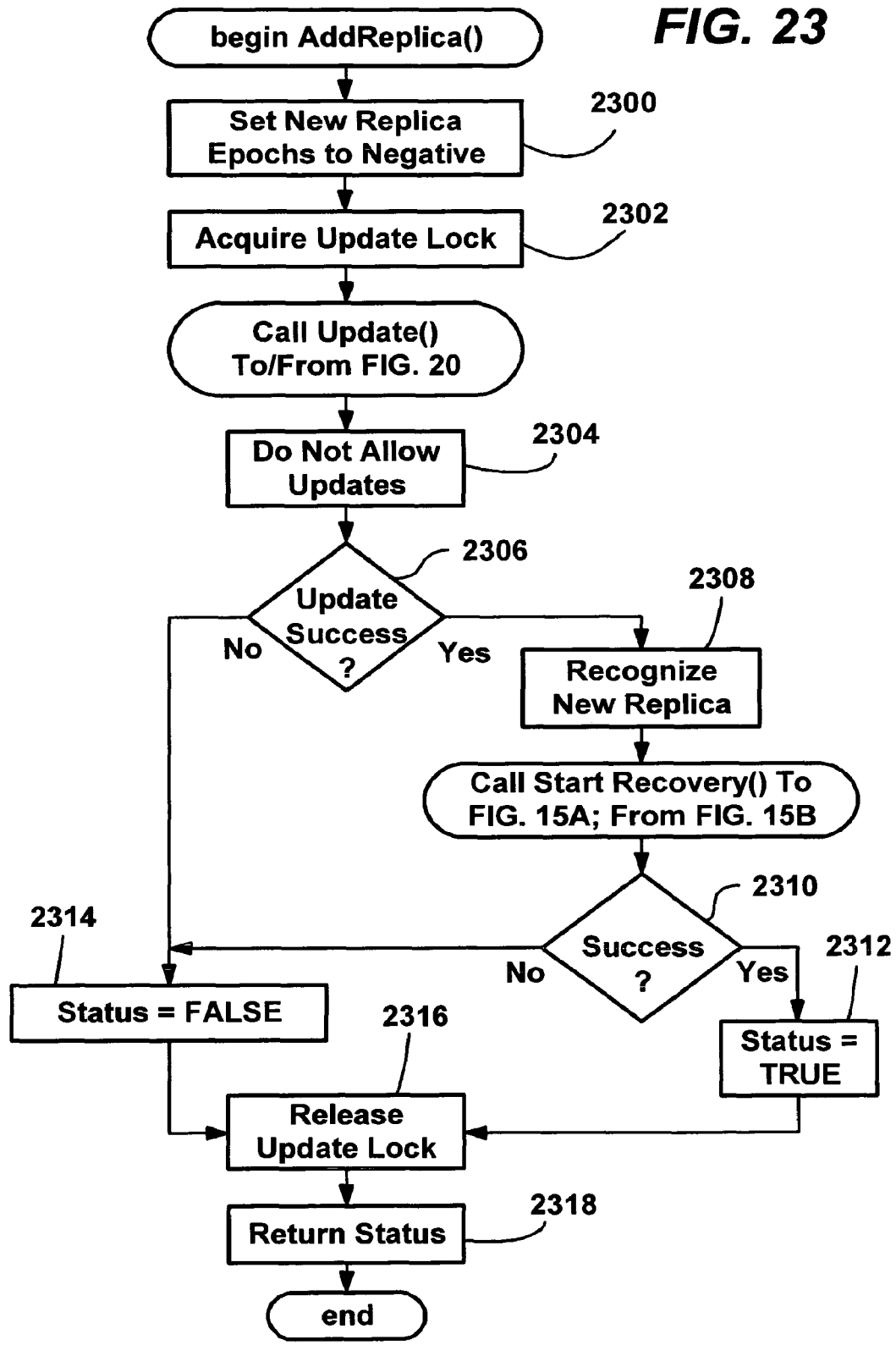
FIG. 23 is flow diagram generally representing steps taken by the quorum replica set algorithm when a new replica member is added to the configured set of total possible available replica members in accordance with one aspect of the present invention.

FIG. 23 describes the addition of a new replica member (or members) to the total configured replica set in a manner that handles failures. Before a new replica is added, however, at step 2300 its local header information (metadata) is written to be worse than any real replica so that it will never be selected as a leader, e.g., its replica and update epochs are set to negative values (e.g., to −1, −1). Note that to speed up the recovery process, it is feasible to lazily copy data to the new replica before it is actually added to the quorum replica set, however its replica and update epoch metadata will remain at −1, −1 until changed in actual recovery.

At step 2302, the update lock is acquired, and the update process (of FIG. 20, described above) is called to make a change to the quorum configuration information maintained in the replica set, namely to record that a new replica is being added to the total configured replica set. At step 2304, further updates are prevented, until re-enabled as described above. If the update was successful, as evaluated at step 2306, the new replica is recognized (is brought online) at step 2308, (similar to the online process described above with respect to FIG. 14). If the update failed, a recovery event is issued, which among other this will re-enable updates if a majority of configured replicas is available, as described above.

If the update is successful (step 2306) and the replica is now online (step 2308), then the above-described recovery process (of FIGS. 15A-15B) is started to make the new replica member consistent with the set. If recovery is successful at step 2310, then the status is set to TRUE at step 2312, the update lock is released at step 2316, and the status returned (step 2318).

If either the update failed (step 2306) or recovery failed (step 2310), the status is set to FALSE at step 2314. The update lock is then released at step 2316, and the status returned (step 2318). Note that if the update was not successful, this change might get committed to the current majority during the next recovery. If so, recovery can keep track of this special update, and reenter recovery. Further, note that failure during the writing of the epoch metadata (−1, −1) will leave the new replica in an uninitialized state, so it will never be visible to the cluster. Still further, note that failure during the update may leave the system in a state where some of replicas are aware of the new member or members, while others are not. If during subsequent recovery a replica member that is aware of a new member is operating in the quorum set, the new member information will get propagated, and the new member will be included and made consistent. If no member of a new quorum replica set is aware of the new member, an extra member will be visible but will be ignored by the cluster since it will not be part of the total configured replica set.

Figure 24:
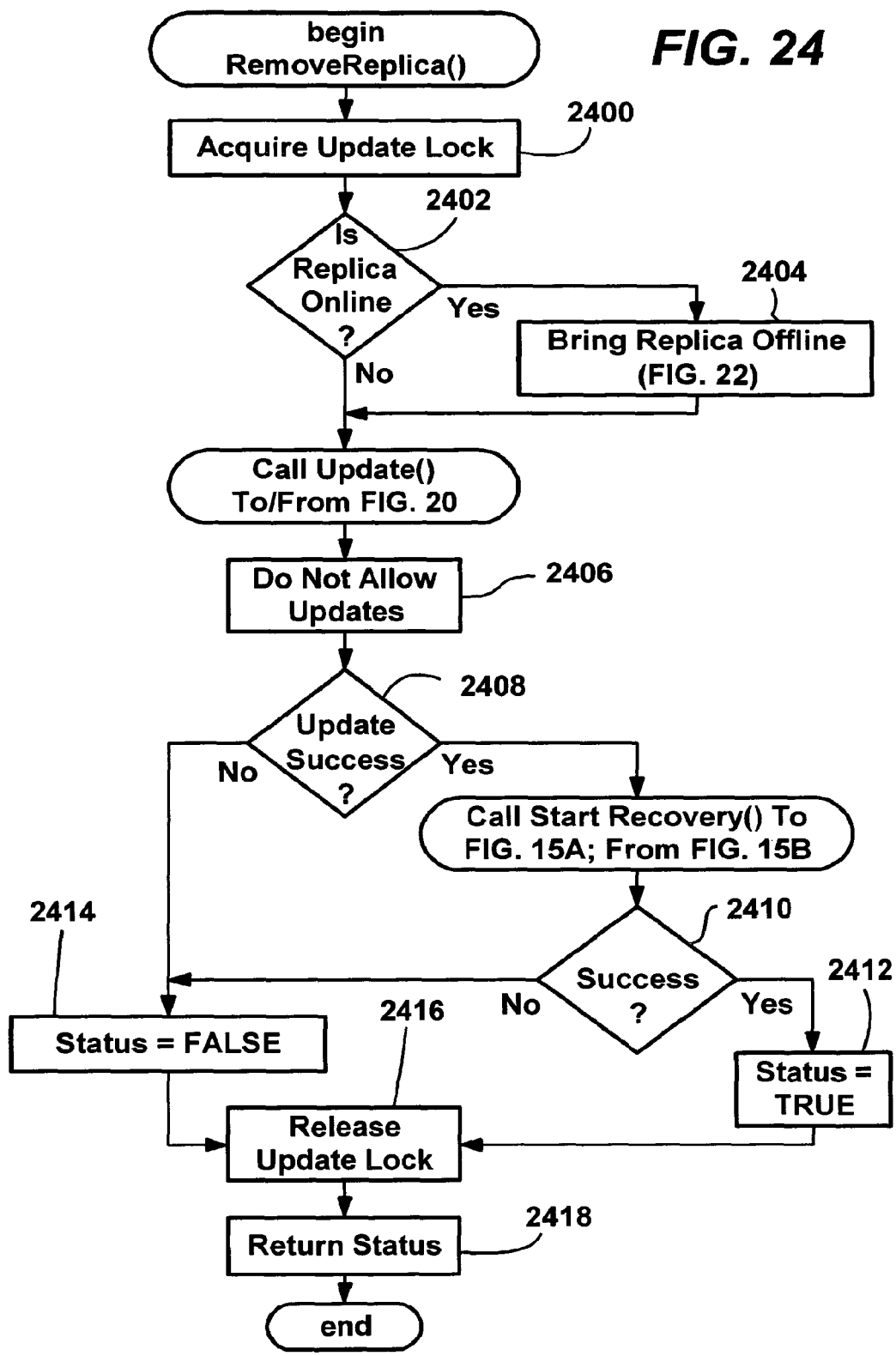
FIG. 24 is flow diagram generally representing steps taken by the quorum replica set algorithm when a replica member is removed from the configured set of total possible available replica members in accordance with one aspect of the present invention.

When removing (decommissioning) a replica member from the total configured replica set, care similar to that described above is taken to ensure that the problems above are not encountered in the event of failures, namely that data is not lost, and that a majority can still be achieved after removal. FIG. 24 describes the removal of a replica member (or members) from the total configured replica set in a manner that handles failures. At step 2400, the update lock is acquired, and at step 2402 the replica is tested for whether it is part of the available set, i.e., is online. If so, step 2402 branches to step 2404 which takes the replica offline.

Next, the update process (of FIG. 20, described above) is called to make a change to the quorum configuration information maintained in the replica set, that is, to record that a replica is being removed from the total configured replica set. One reason that the update may fail is that bringing the replica member offline causes the majority to be lost. However, if the update was successful, the recovery process will be correct, since the change will be on the old majority of replicas and consequently will be on a new majority of replicas.

At step 2406, further updates are prevented, until re-enabled as described above. If the update was successful, as evaluated at step 2408, then the above-described recovery process (of FIGS. 15A-15B) is started to ensure that the remaining replica members are consistent in the set. If recovery is successful at step 2410, then the status is set to TRUE at step 2412, the update lock is released at step 2416, and the status returned (step 2418).

If either the update failed (step 2408) or recovery failed (step 2410), the status is set to FALSE at step 2414. The update lock is then released at step 2416, and the status returned (step 2418). Note that if the update was not successful, this change might get committed to the current majority during the next recovery. If so, recovery can keep track of this special update, and can reenter recovery.

As can be seen from the foregoing detailed description, there is provided a method and system for increasing the availability of a server cluster while reducing its cost. By requiring a server node to own a quorum of replica members in order to form or continue a cluster, and maintaining the consistency of the replica members, integrity of the cluster data is ensured.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
maintaining a cluster that includes cluster operational data and an independent replica that comprises a storage device that maintains the cluster operational data, that is not an element of any node of the cluster, that is not directly attached to the any node of the cluster, that is controlled by only one node of the cluster at a time, where the maintaining the cluster comprises the independent replica being exclusively controlled by the one node of the cluster based on the one node of the cluster obtaining or maintaining the exclusive control according to a node arbitration process that is configured for first reading a variable from the independent replica and, after a challenge period, second reading the variable from the independent replica, where the obtaining or the maintaining is based on the first reading and the second reading resulting in a same value,
and where the independent replica is configured to be online in the cluster regardless of which of the any nodes are operational in the cluster.

2. The method of claim 1 further comprising operating the cluster in response to one of the nodes of the cluster possessing a majority of independent replicas of the cluster.

3. The method of claim 1 wherein the maintaining does not include a requirement for a majority of the nodes of the cluster be operational.

4. The method of claim 1 wherein the any node of the cluster is configured to operate with zero, one, and a plurality of local replicas that each comprise a storage device and that are each integral to the any node of the cluster.

5. The method of claim 4 wherein other nodes of the cluster communicate with the zero or more local replicas via the any node of the cluster.

6. The method of claim 1 wherein the cluster is configured to function with any number of independent replicas without requiring any local replicas, where each independent replica and local replica comprises a copy of operational data of the cluster.

7. The method of claim 1 wherein the cluster is configured to operate with only independent replicas and without any local replicas.

8. At least one computer-readable media storing computer-executable instructions that, when executed by the computer cause the computer to perform actions comprising: maintaining a cluster that includes cluster operational data and an independent replica that comprises a storage device that maintains the cluster operational data, that is not an element of any node of the cluster, that is not directly attached to the any node of the cluster, that is controlled by only one node of the cluster at a time, where the maintaining the cluster comprises the independent replica being exclusively controlled by a one node of the cluster based on the one node of the cluster obtaining or maintaining the exclusive control according to a node arbitration process that is configured for first reading a variable from the independent replica and, after a challenge period, second reading the variable from the independent replica, where the obtaining or the maintaining is based on the first reading and the second reading resulting in a same value,
- and where the independent replica is configured to be online in the cluster regardless of which of the any nodes are operational in the cluster.

9. The at least one computer-readable media of claim 8, the actions further comprising operating the cluster in response to one of the nodes of the cluster possessing a majority of independent replicas of the cluster.

10. The at least one computer-readable media of claim 8 wherein the maintaining does not include a requirement for a majority of the nodes of the cluster be operational.

11. The at least one computer-readable media of claim 8 wherein the cluster further includes a local replica that comprises a storage device that is integral to one node of the cluster.

12. The at least one computer-readable media of claim 11 wherein other nodes of the cluster communicate with the zero or more local replicas via the any of the cluster.

13. The at least one computer-readable media of claim 8 wherein the cluster is configured to include any number of independent replicas.

14. The at least one computer-readable media of claim 8 wherein the cluster is configured to operate with only independent replicas and without any local replicas.

15. A system comprising:
- a computer and at least one program module together configured for performing actions comprising maintaining a cluster that includes cluster operational data and an independent replica that comprises a storage device that maintains the cluster operational data, that is not an element of any node of the cluster, that is not directly attached to the any node of the cluster, that is controlled by only one node of the cluster at a time, where the maintaining comprises the independent replica being exclusively controlled by the one node of the cluster based on the one node of the cluster obtaining or maintaining the exclusive control according to a node arbitration process that is configured for first reading a variable from the independent replica and, after a challenge period, second reading the variable from the independent replica, where the obtaining or the maintaining is based on the first reading and the second reading resulting in a same value,
- and where the independent replica is configured to be online in the cluster regardless of which of the any nodes are operational in the cluster.

16. The system of claim 15, the actions further operating the cluster in response to one of the nodes of the cluster possessing a majority of independent replicas of the cluster.

17. The system of claim 15 wherein the maintaining does not include a requirement for a majority of the nodes of the cluster be operational.

18. The system of claim 15 wherein the cluster further includes a local replica that comprises a storage device that is integral to one node of the cluster, and wherein other nodes of the cluster communicate with the local replica via the one node of the cluster.

19. The system of claim 15 wherein the cluster is configured to include any number of independent replicas.

20. The system of claim 15 wherein the cluster is configured to operate with only independent replicas and without any local replicas.

* * * * *